US008108671B2

(12) United States Patent
Risan et al.

(10) Patent No.: US 8,108,671 B2
(45) Date of Patent: *Jan. 31, 2012

(54) METHOD AND SYSTEM FOR CONTROLLING PRESENTATION OF COMPUTER READABLE MEDIA ON A MEDIA STORAGE DEVICE

(75) Inventors: Hank Risan, Santa Cruz, CA (US); Edward Vincent Fitzgerald, Santa Cruz, CA (US)

(73) Assignee: Music Public Broadcasting, Inc., Santa Cruz, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/861,226

(22) Filed: Aug. 23, 2010

(65) Prior Publication Data

US 2010/0318809 A1 Dec. 16, 2010

Related U.S. Application Data

(63) Continuation of application No. 10/772,026, filed on Feb. 3, 2004, now Pat. No. 7,870,385.

(51) Int. Cl.
*H04L 29/06* (2006.01)
*H04L 9/32* (2006.01)
*G06F 11/30* (2006.01)
*G06F 12/14* (2006.01)
*G06F 21/00* (2006.01)

(52) U.S. Cl. ........ 713/165; 713/173; 713/175; 713/189; 713/193; 705/57

(58) Field of Classification Search ................... None
See application file for complete search history.

(56) References Cited

U.S. PATENT DOCUMENTS

| 6,772,340 | B1* | 8/2004 | Peinado et al. ............... 713/168 |
| 6,950,941 | B1* | 9/2005 | Lee et al. ..................... 713/193 |
| 6,993,509 | B2* | 1/2006 | Vidich et al. .................. 705/51 |
| 2003/0225701 | A1* | 12/2003 | Lee et al. ....................... 705/57 |
| 2005/0192815 | A1 | 9/2005 | Clyde |

FOREIGN PATENT DOCUMENTS

WO     WO-03/096340     11/2003

* cited by examiner

*Primary Examiner* — Shin-Hon Chen

(57) ABSTRACT

A method of controlling presentation of content on a media storage device is described. The method is comprised of verifying the presence of a media presentation mechanism and a usage compliance mechanism on a computer system operated by a recipient to whom the media storage device is distributed. The usage compliance mechanism includes a file system filter driver for controlling data reads associated with the computer readable media. The media presentation mechanism is communicatively coupled with the usage compliance mechanism. The present method further includes the file system driver performing a first decryption of the computer readable media. The present method further includes the media presentation mechanism performing a second decrypting of the computer readable media concurrent with presenting the computer readable media to the recipient.

56 Claims, 24 Drawing Sheets

METHOD AND SYSTEM FOR CONTROLLING PRESENTATION OF COMPUTER READABLE MEDIA ON A MEDIA STORAGE DEVICE

CROSS REFERENCE TO RELATED APPLICATIONS

The present patent application is a continuation of U.S. patent application Ser. No. 10/772,026, filed Feb. 3, 2004 now U.S. Pat. No. 7,870,385, entitled "Method And System For Controlling Presentation Of Computer Readable Media On A Media Storage Device," by Hank Risan et al., assigned to the assignee of the present application and incorporated in its entirety herein.

FIELD OF THE INVENTION

The present invention relates to electronic media. More particularly, the present invention relates to preventing unauthorized reproduction and/or distribution of media disposed on a media storage device.

BACKGROUND OF THE INVENTION

One of the problems faced in attempting to effectively control media files on a media storage device, (a compact disk (CD) or a digital versatile disk (DVD)), in a secure and controlled manner is that current media storage devices typically need to be compatible with both home media storage device players, (e.g., a CD, digital versatile disk (DVD) or other player), and with media storage device drives which may be connected to a computer system. Many of these home media players/drives were designed in 1982, and the media storage device needs to be backwards compatible with those players/drives.

Media storage device drives are essentially data transducers, meaning they convert bit stream data into electronic waveform that is output, (e.g., as an analog waveform or harmonic waveform), to speakers and/or other devices to render sound. Computer media storage device drives can also output the bit stream data digitally in a computer readable format. In many instances, the material contained in a media storage device is copyright protected material.

A media storage device coupled with a computer system can be problematic for copyright holders because in addition to its transducing abilities, it may also be: A) a morphogenic system, meaning that a user can take digital data, reorganize the data, and morph it into other forms on the computer; and/or B) a replicator system, meaning that it can also copy, capture, store, or reproduce the digital data. Thus, a user can make unauthorized copies of the digital media and distribute it in an uncontrolled manner. A disadvantage to the uncontrolled distribution of digital media is that there is currently no effective means to provide compensation to the owner (e.g., record company, lyricist, musician, software developer, etc.) if it is copyrighted material. Studies estimate revenue losses in the billions due to unauthorized copying and inaccurate reporting of royalties.

The data format of a media storage device, (e.g., a CD), was designed in 1982 and it was not designed with any security in mind. This is because it was designed to be effective media for data transduction, and as such, did not include provisions for effective copyright protection or Digital Rights Management (DRM). In many instances, all that is needed is a click of the mouse to strip the DRM protection off the media storage device, and the media file becomes available for reproduction and distribution. Alternative means to defeat copyright protection of media files can be as easy as using a magic marker technique. In this technique, a user marks the outer track on a media storage device, (e.g., a CD), with a permanent marker, (e.g., a Sharpie). When the computer tries to read the first track, it fails, and by default, then reads the next track, usually where the music begins.

Further, DRM protection methods implemented as a stand alone device, meaning that the DRM and copy protection resides in software that resides on the disk, are also problematic. This is because when circumvention of the DRM on the media storage device occurs, little if anything can be done because the DRM controls are also bypassed. There may not be any communication with the computer or the Internet.

Software DRM solutions are additionally problematic for CDs and DVDs because they frequently do not provide DRM compliance, and it is foreseen that software solutions will not provide DRM protection in the future, particularly with the introduction of new computer operating systems and new media formats. These types of software DRM solutions are difficult to morph into a secure format once operating systems change.

In many instances, demo media files are being copied and released prior to release of the actual media file. Often, unauthorized copies of protected media files, (e.g., CDs and/or DVDs) are being released before of after the release of the media file itself. In some instances, the unauthorized copies are outselling legally produced media files.

Applications are readily available via the Internet for the express purpose of producing an exact audio copy of media files on a media storage device. One example is Exact Audio Copy, a freeware software program freely available on the Internet which produces an exact audio copy in .wav file format. Using Exact Audio Copy, circumventing existing protection can be accomplished without modification to the existing technology. The Exact Audio Copy application bypasses the multisession data tracks and goes directly to the audio tracks. This can be accomplished by loading the Exact Audio Copy onto a computer, inserting a CD, and pressing a button to two to copy the audio tracks.

Additionally, there are "ripping" applications, readily available via the Internet, that read the redbook, which enables the ripping application to access the table of contents, and the ripping application goes to the audio tracks where it can "rip" the audio or video file.

Further, many of the media player/recorder applications are designed to capture and record incoming media files in a manner that circumvents controls implemented by a media player application inherent to an operating system, (e.g., QuickTime for Apple, MediaPlayer for Windows™, etc.,) or downloadable from the Internet, (e.g., RealPlayer, or LiquidAudio), or those provided by webcasters, (e.g., PressPlay), for controlling unauthorized recording of media files. Also, many digital recording devices, (e.g., mini-disc recorders, MP3 recorders, and the like), can be coupled to a digital output of a computer system, (e.g., a USB port, a S/Pdif out, and the like), to capture the media file.

As a result, copyrighted digital media can be readily stored and/or transformed using a computer system. This copyrighted media can then be copied and distributed in an unauthorized manner, thus preventing the copyright holder from collecting royalties.

A further enhancement in computer functionality can be realized by communicatively coupling computers together to form a network. Within a network environment, computer systems enable users to exchange files, share information stored in common databases, combine or pool resources, communicate via electronic mail (e-mail), and access information on the Internet. Additionally, computers connected to a network environment, (e.g., the Internet), provide their users access to data and information from all over the world.

There are many different types of network environments that can be implemented to facilitate sharing of data between computer systems. Some of the various network environment types include Ethernet, client-server, and wired and/or wireless network environments. A common utilization of a network environment type is for file sharing, such as in a P2P network or point-to-point network. Most P2P networks rely on business models based upon the transfer and redistribution of copyrighted material, (e.g., audio files), between computers coupled to a network, (e.g., the Internet). A P2P network allows a user to acquire the copyrighted material from a computer, a web site source, or a music broadcaster, and store and share the material with other users throughout the network, in some instances acting as a web site source or a music broadcaster.

It is also common for users sharing files in an uncontrolled manner to use freely distributed or commercially available media player applications to experience, (e.g., listen, view, and/or watch, the shared files). In many instances, these media player applications also provide for downloading the media file from a P2P network or from licensed web broadcasters, saving it locally, and then upload the media file onto an unlawful P2P or similar network and/or consumer recording devices.

Additionally, many of the computers, web sites, and web broadcasters that share copyrighted material commonly do not control or monitor the files being exchanged between computers. Often, when web sites attempt to control or restrict the distribution of copyrighted material, (e.g., audio files), users seeking to circumvent controls or restrictions can, in many cases, simply utilize the recording functionality of a media player application and save the copyrighted material, rename the particular audio file, and upload the renamed file, rendering attempts to control or restrict its distribution moot.

Current methods for controlling presentation of computer readable media on media storage devices are inadequate. More specifically, current methods of sharing music files do not provide adequate file distribution controls or proper accountability with regard to licensing agreements and/or copyright restrictions associated with shared copyrighted material. It is therefore desired to prevent unauthorized access to digital media to prevent copying and distribution of the media in an uncontrolled manner. It is also desired to prevent recording applications, such as Total Recorder, Sound Forge, and numerous others, that are adapted to establish a connection with a kernel level driver operable within an operating system to capture and redirect the media file to create an unauthorized reproduction of a media file. It is also desired to prevent recording applications from accessing a kernel-mode media device driver and making unauthorized copies of copyrighted material through some available network, (e.g., wireline, wireless, P2P, etc.), or through a communicative coupling. It is further desirable to prevent access to a kernel based media device driver by a recording application for the purpose of making unauthorized copies of media files from or to alternative sources, (e.g., CD players, DVD players, removable hard drives, personal electronic and/or recording devices such as MP3 recorders, and the like).

SUMMARY OF THE INVENTION

Accordingly, a need exists for a method and system that controls presentation of a computer readable media on a media storage device. Embodiments of the present invention satisfy the above mentioned needs.

In one embodiment, a method for controlling presentation of a computer readable media on a media storage device is described. In one embodiment, the method is comprised of verifying the presence of a media presentation mechanism and a usage compliance mechanism on a computer system operated by a recipient to whom the media storage device is distributed. The usage compliance mechanism includes a file system filter driver for controlling data reads associated with the computer readable media. The media presentation mechanism is communicatively coupled with the usage compliance mechanism. The present method further includes the file system driver performing a first decryption of the computer readable media. The present method further includes the media presentation mechanism performing a second decrypting of the computer readable media concurrent with presenting the computer readable media to the recipient.

In another embodiment, a system for controlling presentation of content on a media storage device is described. In one embodiment, the system is comprised of a usage compliance mechanism comprising a file system filter driver for controlling data reads associated with the computer readable media and for performing a first decryption of the computer readable media. The system further includes a media presentation mechanism communicatively coupled with the usage compliance mechanism for performing a second decryption of the computer readable media concurrent with presenting the computer readable media. The system further includes a detecting component for detecting the presence of the usage compliance mechanism and the secure player application on a computer system. The system further includes an authorizing component for authorizing a recipient of the media storage device to experience the computer readable media provided the usage compliance mechanism is installed on the computer system.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
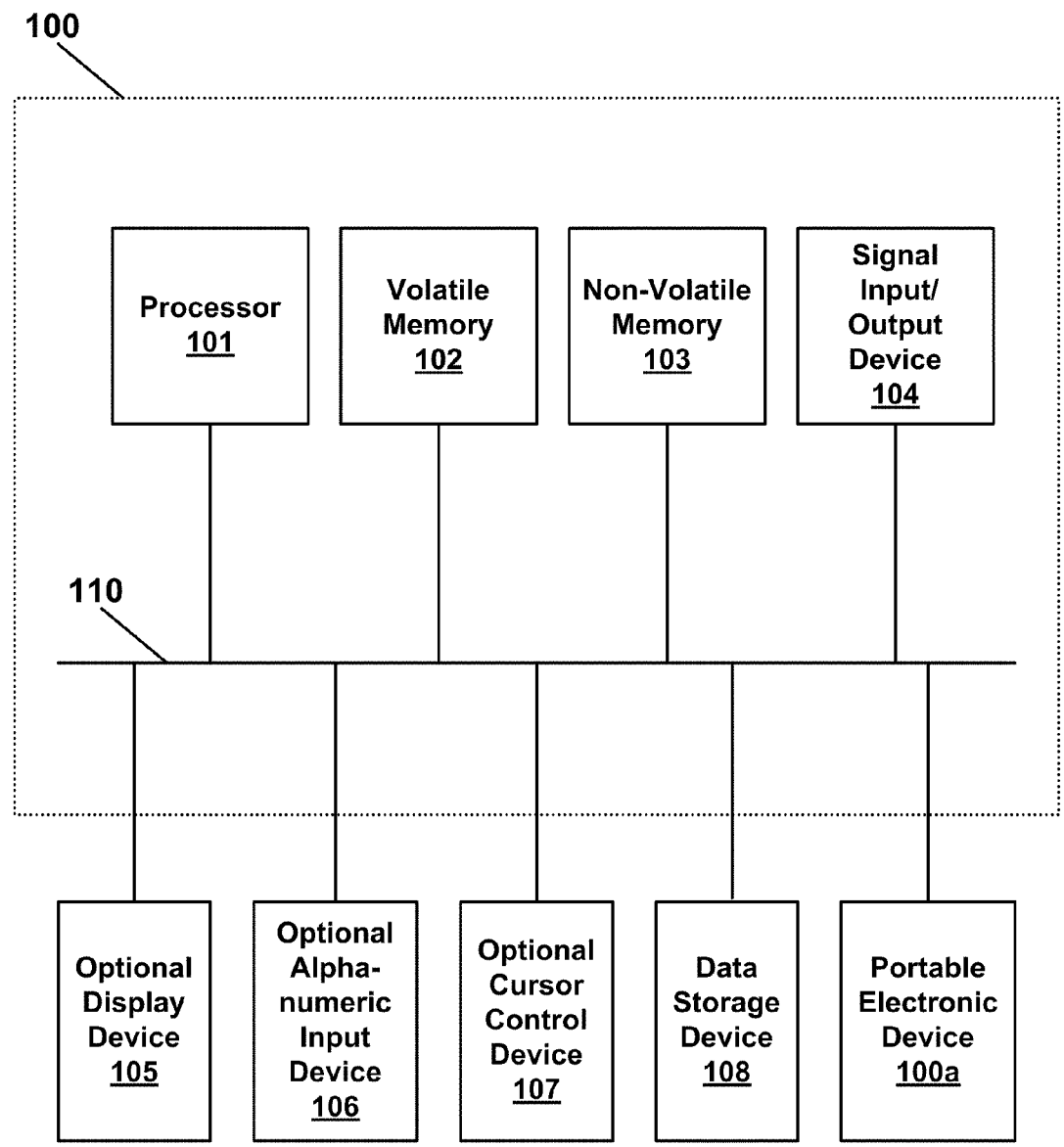
FIG. 1 is a block diagram of an exemplary computer system that can be utilized in accordance with an embodiment of the present invention.

Reference will now be made in detail to embodiments of the invention, examples of which are illustrated in the accompanying drawings. While the invention will be described in conjunction with embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, to one of ordinary skill in the art, the present invention may be practiced without these specific details. In other instances, well known methods, procedures, components, and circuits have not been described in detail as not to unnecessarily obscure aspects of the present invention.

Some portions of the detailed description which follows are presented in terms of procedures, logic blocks, processing, and other symbolic representations of operations on data bits within a computing system or digital memory system. These descriptions and representations are the means used by those skilled in the data processing art to most effectively convey the substance of their work to others skilled in the art. A procedure, logic block, process, etc., is herein, and generally, conceived to be a self-consistent sequence of steps or instructions leading to a desired result. The steps are those involving physical manipulations of physical quantities. Usually, though not necessarily, these physical manipulations take the form of electrical or magnetic signals capable of being stored, transferred, combined, compared, and otherwise manipulated in a computing system or similar electronic computing device. For reasons of convenience, and with reference to common usage, these signals are referred to as bits, values, elements, symbols, characters, terms, numbers, or the like, with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that discussions of the present invention refer to actions and processes of a computing system, or similar electronic computing device that manipulates and transforms data. The data is represented as physical (electronic) quantities within the computing system's registers and memories and is transformed into other data similarly represented as physical quantities within the computing system's memories or registers, or other such information storage, transmission, or display devices.

In the following description, for purposes of explanation, numerous specific details are set forth in order to provide a thorough understanding of the present invention. To one skilled in the art, the present invention may be practiced without these specific details. In other instances, well-known structures and devices are shown in block diagram form in order to avoid obscuring the present invention.

Embodiments of the present invention are discussed primarily in the context of a stand-alone computer system, or a network of computer systems such as a network of desktop, workstation, laptop, handheld, and/or other portable electronic device. For purposes of the present application, the term "portable electronic device" is not intended to be limited solely to conventional handheld or portable computers. Instead, the term "portable electronic device" is also intended to include many mobile electronic devices. Such mobile devices include, but are not limited to, portable CD players, MP3 players, mobile phones, portable recording devices, satellite radios, portable video playback devices (digital projectors), personal video eyewear, and other personal digital devices. Additionally, embodiments of the present invention are also well suited for implementation with theater presentation systems for public and/or private presentation in theaters, auditoriums, convention centers, etc.

FIG. 1 is a block diagram illustrating an exemplary computer system 100 that can be used in accordance with embodiments of the present invention. It is noted that computer system 100 can be nearly any type of computing system or electronic computing device including, but not limited to, a server computer, a desktop computer, a laptop computer, or other portable electronic device. Within the context of embodiments of the present invention, certain discussed processes, procedures, and operations can be realized as a series of instructions (e.g., a software program) that reside within computer system memory units of computer system 100 and are executed by a processor(s) of computer system 100. When executed, the instructions cause computer system 100 to perform specific actions and exhibit specific behavior which is described in detail herein.

Computer system 100 of FIG. 1 comprises an address/data bus 110 for communicating information, one or more central processors 101 coupled to bus 110 for processing information and instructions. Central processor(s) 101 can be a microprocessor or any alternative type of processor. Computer system 100 also includes a computer usable volatile memory 102, (e.g., random access memory (RAM), static RAM (SRAM), dynamic RAM (DRAM), synchronous dynamic RAM (SDRAM), double data rate RAM (DDR RAM), etc.), coupled to bus 110 for storing information and instructions for processor(s) 101. Computer system 100 further includes a computer usable non-volatile memory 103, (e.g., read only memory (ROM), programmable ROM (PROM), electronically programmable ROM (EPROM), electrically erasable PROM (EEPROM), flash memory (a type of EEPROM), etc.), coupled to bus 110 for storing static information and instructions for processor(s) 101. In one embodiment, non-volatile memory 103 can be removable.

System 100 also includes one or more signal generating and receiving devices (e.g., signal input/output device(s) 104) coupled to bus 110 for enabling computer 100 to interface with other electronic devices. Device 104 can include wired and/or wireless communication functionality. For example, in one embodiment, device 104 is a serial communication port, but can alternatively be one of a number of well known communication standards and protocols, (e.g., a parallel port, an Ethernet adapter, a FireWire (IEEE 1394) interface, a Universal Serial Bus (USB), a small computer system interface (SCSI), an infrared (IR) communication port, a Bluetooth wireless communication adapter, a broadband connection, a satellite link, an Internet feed, a cable modem, and the like). In another embodiment, a digital subscriber line (DSL) can be implemented as signal input/output device 104. In such an instance, device 104 may include a DSL modem.

Computer 100 of FIG. 1 can also include one or more computer usable data storage device(s) 108 coupled to bus 110 for storing instructions and information, in one embodiment of the present invention. In one embodiment, data storage device 108 can be a magnetic storage device, (e.g., a hard disk drive, a floppy disk drive, a zip drive, or other magnetic storage device). In another embodiment, data storage device 108 can be an optical storage device, (e.g., a CD (compact disc), a DVD (digital versatile disc), or other alternative optical storage device). Alternatively, any combination of magnetic, optical, and alternative storage devices can be implemented, (e.g., a RAID (random array of independent disks or random array of inexpensive discs)) configuration. It is noted that data storage device 108 can be located internal and/or external of system 100 and communicatively coupled with system 100 utilizing wired and/or wireless communication technology, thereby providing expanded storage and functionality to system 100. It is further noted that nearly any portable electronic device, (e.g., device 100a), can also be communicatively coupled with system 100 via utilization of wired and/or wireless communication technology, thereby expanding the functionality of system 100.

System 100 can also include an optional display device 105 coupled to bus 110 for displaying video, graphics, and/or alphanumeric characters. It is noted that display device 105 can be a CRT (cathode ray tube), a thin CRT (TCRT), a liquid crystal display (LCD), a plasma display, a field emission display (FED), video eyewear, a projection device (an LCD (liquid crystal display), a digital light projector (DLP), a movie theater projection system, and the like), or any other display device suitable for displaying video, graphics, and alphanumeric characters recognizable to a user.

Computer system 100 of FIG. 1 further includes an optional alphanumeric input device 106 coupled to bus 110 for communicating information and command selections to processor(s) 101, in one embodiment. Alphanumeric input device 106 is coupled to bus 110 and includes alphanumeric and function keys. Computer 100 can also include an optional cursor control device 107 coupled to bus 110 for communicating user input information and command selections to processor(s) 101. Cursor control device 107 can be implemented using a number of well known devices such as a mouse, a trackball, a track pad, a joy stick, a optical tracking device, a touch screen, etc. It is noted that a cursor can be directed and/or activated via input from alphanumeric input device 106 using special keys and key sequence commands. It is further noted that directing and/or activating the cursor can be accomplished by alternative means, (e.g., voice activated commands), provided computer system 100 is configured with such functionality.

Figure 2:
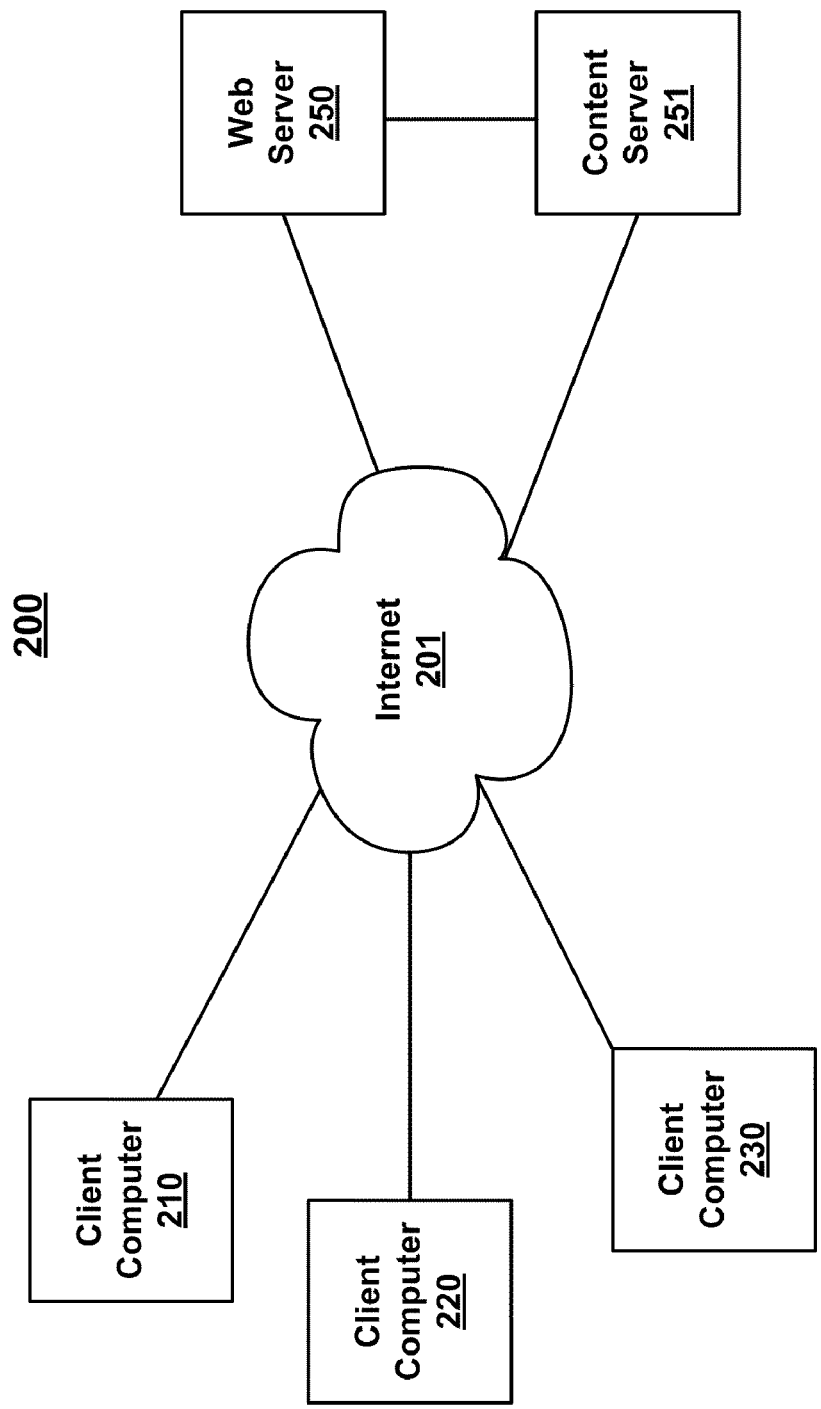
FIG. 2 is a block diagram of an exemplary network environment that can be utilized in accordance with an embodiment of the present invention.

FIG. 2 is a block diagram of an exemplary network 200 in which embodiments of the present invention may be implemented. In one embodiment, network 200 enables one or more authorized client computer systems (e.g., 210, 220, and 230), each of which are coupled to Internet 201, to receive media content from a media content server 251 via the Internet 201 while preventing unauthorized client computer systems from accessing media stored in a database of content server 251.

Network 200 includes a web server 250 and content server 251 which are communicatively coupled to Internet 201. Further, web server 250 and content server 251 can be communicatively coupled without utilizing Internet 201, as shown. Web server 250, content server 251, and client computers 210, 220, and 230 can communicate with each other. It is noted that computers and servers of network 200 are well suited to be communicatively coupled in various implementations. For example, web server 250, content server 251, and client computer systems 210, 220, and 230 of network 200 can be communicatively coupled via wired communication technology (e.g., twisted pair cabling, fiber optics, coaxial cable, etc.), or wireless communication technology, or a combination of wired and wireless communication technology.

Still referring to FIG. 2, it is noted that web server 250, content server 251, and client computer systems 210, 220 and 230 can, in one embodiment, each be implemented in a manner similar to computer system 100 of FIG. 1. However, the server and computer systems in network 200 are not limited to such implementations. Additionally, web server 250 and content server 251 can perform various other functionalities within network 200. It is also noted that, in one embodiment, web server 250 and content server 251 can both be disposed on a single or a plurality of physical computer systems.

Further, it is noted that network 200 can operate with and deliver any type of media content (e.g., audio, video, multimedia, graphics, information, data, software programs, etc.) in any format. In one embodiment, content server 251 can provide audio and video files to client computers 210-230 via Internet 201.

Figure 3:
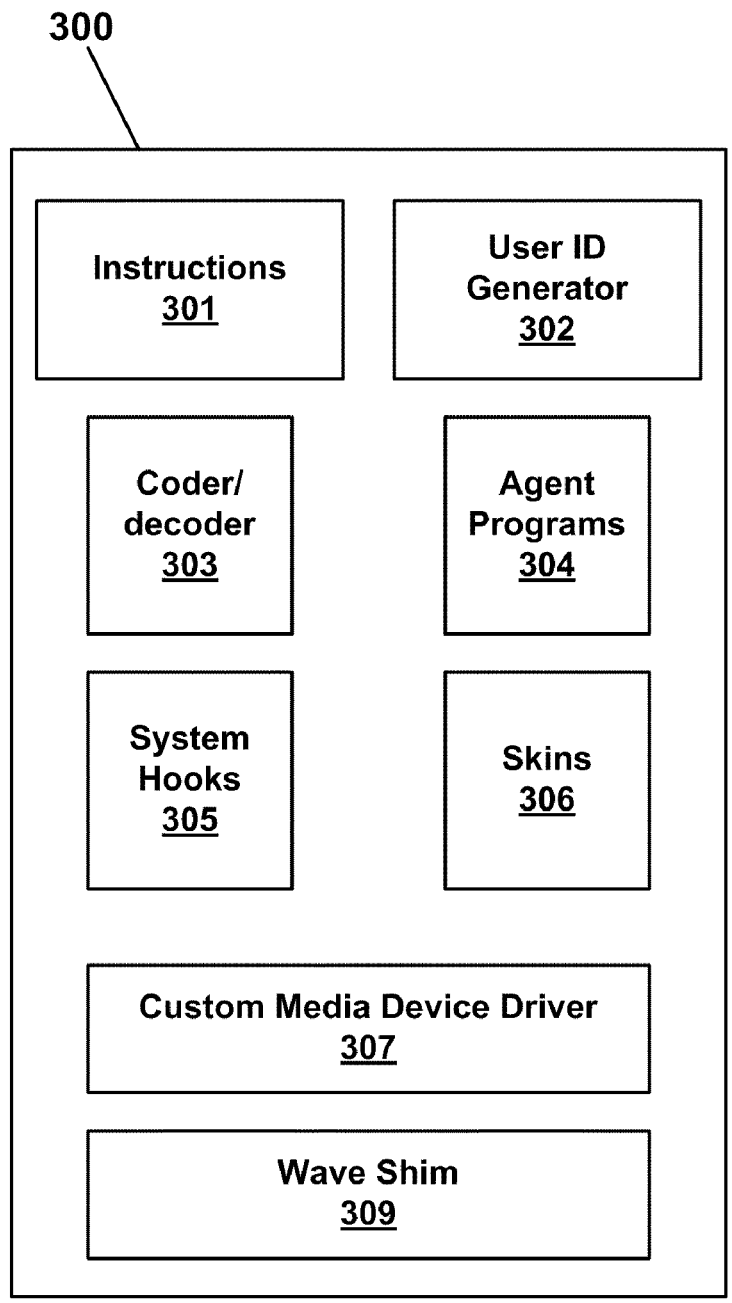
FIG. 3 is a block diagram of various exemplary functional components of a copyright compliance mechanism in accordance with an embodiment of the present invention.

FIG. 3 is a block diagram of an exemplary copyright compliance mechanism (CCM) 300, for controlling distribution of, access to, and/or copyright compliance of media files in accordance with an embodiment of the present invention. In one embodiment, CCM 300 contains one or more software components and instructions for enabling compliance with DMCA (digital millennium copyright act) restrictions and/or RIAA (recording industry association of America) licensing agreements regarding media files. Additionally, CCM 300's software components and instructions further enable compliance with international recording restrictions such as those defined by the IFPI (international federation of phonographic industry), the ISRC (international standard recording industry), other foreign or international recording associations, and/or foreign or international licensing restrictions. In one embodiment, CCM 300 may be integrated into existing and/or newly developed media player and recorder applications. In another embodiment, CCM 300 may be implemented as a stand alone mechanism but in conjunction with existing media player/recorder applications, such that CCM 300 is communicatively coupled to existing media player/recorder applications. Alternatively, CCM 300 can be installed as a stand alone mechanism within a client computer system 210. Additionally, CCM 300 can be installed as a stand alone mechanism and/or as part of a bundled application from a media storage device (e.g., a CD, a DVD, an SD (secure digital card), etc.), and/or as part of an installation package. In another embodiment, CCM 300 can be installed in conjunction with a presentation of desired media content, (e.g., listening to an audio file on a music CD, reading a document, viewing a video, etc.). It is noted that, in one embodiment, CCM 300 may be installed on client system 210 in a clandestine manner, relative to a user.

There are currently two types of copyright licenses recognized by the digital millennium copyright act (DMCA) for the protection of broadcasted copyrighted material. One of the broadcast copyright licenses is a compulsory license, also referred to as a statutory license. A statutory license is defined as a non-interactive license, meaning the user cannot select the song. Further, a caveat of this type of broadcast license is that a user must not be able to select a particular music file for the purpose of recording it to the user's computer system or other storage device. Another caveat of a statutory license is that a media file is not available more than once for a given period of time. In one example, the period of time can be three hours.

The other type of broadcast license recognized by the DMCA is an interactive licensing agreement. An interactive licensing agreement is commonly with the copyright holder (e.g., a record company, the artist, etc.,) wherein the copyright holder grants permission for a server, (e.g., web server 250 and/or content server 251) to broadcast copyrighted material. Under an interactive licensing agreement, there are a variety of ways that copyrighted material (e.g., music files) can be broadcast. For example, one manner in which music files can be broadcast is to allow the user to select and listen to a particular sound recording, but without the user enabled to make a sound recording. This is commonly referred to as an interactive with "no save" license, meaning that the end user is unable to save or store the media content file in a relatively permanent manner. Additionally, another manner in which music files can be broadcast is to allow a user to not only select and listen to a particular music file, but additionally allow the user to save that particularly music file to disc and/or burn the music file to a CD, MP3 player, or other portable electronic device. This is commonly referred to as an interactive with "save" license, meaning that the end user is enabled to save, store, or burn to CD, the media content file.

It is noted that the DMCA allows for the "perfect" reproduction of the sound recording. A perfect copy of a sound recording is a one-to-one mapping of the original sound recording into a digitized form, such that the perfect copy is virtually indistinguishable and/or has no audible differences from the original recording.

In one embodiment, CCM (copyright compliance mechanism) 300 can be stored in web server 250 and/or content server 251 of network 200 and is configured to be installed into each client computer system, (e.g., 210, 220 and 230), enabled to access the media files stored within content server 251 and/or web server 250. Alternatively, copyright compliance mechanism 300 can be externally disposed and communicatively coupled with a client computer system 210 via, (e.g., a portable media device 100a of FIG. 1). In yet another embodiment, CCM 300 can be configured to be operable from a media storage device (e.g., 108) upon which media files may be disposed.

Copyright compliance mechanism 300 is configured to be operable while having portions of components, entire components, combinations of components, disposed within one or more memory units and/or data storage devices of a computer system, (e.g., 210, 220, and/or 230).

Additionally, CCM 300 can be readily updated, (e.g., via Internet 201), to reflect changes or developments in the DMCA, copyright restrictions and/or licensing agreements pertaining to any media file, changes in current media player applications and/or the development of new media player applications, or to counteract subversive and/or hacker-like attempts to unlawfully obtain one or more media files. It is noted that updating CCM 300 can include, but is not limited to, updating portions of components, entire components and/or combinations of components of CCM 300.

Referring to FIG. 3, CCM 300 can include instructions 301 for enabling client computer system 210 to interact with web server 250 and content server 251 of network 200. Instructions 301 enable client computer system 210 to interact with servers, (e.g., 250 and 251) in a network, (e.g., 200).

The copyright compliance mechanism 300 also includes, in one embodiment, a user ID generator 302, for generating a user ID or user key, and one or more cookie(s) which contain(s) information specific to the user and the user's computer system, (e.g., 210). In one embodiment, the user ID and the cookie(s) are installed in computer system 210 prior to installation of the remaining components of the CCM 300. It is noted that the presence of a valid cookie(s) and a valid user ID/user key are verified by web server 250 before the remaining components of a CCM 300 can be installed, within one embodiment of the present invention. Additionally, the user ID/user key can contain, but is not limited to, the user's name, the user's address, the user's credit card number, an online payment account number, a verified email address, and an identity (username) and password selected by the user.

Furthermore, the cookie can contain, but is not limited to, information specific to the user, information regarding the user's computer system 210, (e.g., types of media applications operational therewithin), a unique identifier associated with computer system 210, (e.g., a MAC (media access control) address, an IP address), and/or the serial number of the central processing unit (CPU) operable on computer system 210 and other information specific to the computer system and its user.

Additionally, in another embodiment, user biometrics may be combined with computer system 210 data and user data and incorporated into the generation of a user ID. Alternatively, biometric data may be used in a stand alone implementation in the generation of the user ID. Types of biometric data that may be utilized to provide a user ID and/or authorization may include, but is not limited to, fingerprint data, retinal scan data, handprint data, facial recognition data, and the like.

It is noted that the information regarding the client computer system, (e.g., 210), the user of system 210, and an access key described herein can be collectively referred to as authorization data.

Advantageously, with information regarding the user and the user's computer system, (e.g., 210), web server 250 can determine when a user of one computer system, (e.g., 210), has given their username and password to another user using another computer system, (e.g., 220). Because the username, password, and the user's computer system 210 are closely associated, web server 250 can prevent unauthorized access to copyrighted media content, in one embodiment. It is noted that if web server 250 detects unauthorized sharing of usernames and passwords, it can block the user of computer system 210, as well as other users who unlawfully obtained the username and password, from future access to copyrighted media content available through web server 250. Web server 250 can invoke blocking for any specified period of time, (e.g., for a matter of minutes, hours, months, years, or longer, or permanently).

Still referring to FIG. 3, copyright compliance mechanism 300 further includes a coder/decoder (codec) 303 that, in one embodiment, is adapted to perform, but is not limited to, encoding/decoding of media files, compressing/decompressing of media files, and detecting that delivered media files are encrypted as prescribed by CCM 300. In the present embodiment, coder/decoder 303 can also extract key fields from a header attached to each media content file for, in part, verification that the file originated from a content server, (e.g., 251). It is noted that CCM 300 can include one or more codecs similar to codec 303.

In the present embodiment, coder/decoder 303 can also perform a periodic and repeated check of the media file, while the media file is passed to the media player application, (e.g., in a frame by frame basis or in a buffer by buffer basis), to ensure that CCM 300 rules are being enforced at any particular moment during media playback. It is noted that differing coder/decoders 303 can be utilized in conjunction with various types of copyrighted media content including, but not limited to, audio files, video files, graphical files, alphanumeric files and the like, such that any type of media content file can be protected in accordance with embodiments of the present invention.

Within FIG. 3, copyright compliance mechanism 300 also includes one or more agent programs 304 which are configured to engage in dialogs and negotiate and coordinate transfer of information between a computer system, (e.g., 210, 220, or 230), a server, (e.g., web server 250 and/or content server 251), and/or media player applications, with or without recording functionality, that are operable within a client computer system, in one embodiment. In the present embodiment, agent program 304 can also be configured to maintain system state, verify that other components are being utilized simultaneously, to be autonomously functional without knowledge of the client, and can also present messages, (e.g., error messages, media information, advertising, etc.), via a display window or electronic mail. This enables detection of proper skin implementation and detection of those applications that are running. It is noted that agent programs are well known in the art and can be implemented in a variety of ways in accordance with the present embodiment.

Copyright compliance mechanism 300 also includes one or more system hooks 305, in one embodiment of the present invention. A system hook 305 is, in one embodiment, a library that is installed in a computer system (e.g., 210) that intercepts system wide events. For example, a system hook 305, in conjunction with skins 306, can govern certain properties and/or functionalities of media player applications operating within the client computer system, (e.g., 210), including, but not limited to, mouse click shortcuts, keyboard shortcuts, standard system accelerators, progress bars, save functions, pause functions, rewind functions, skip track functions, forward track preview, copying to CD, copying to a portable electronic device, and the like.

It is noted that the term govern or governing, for purposes of the present invention, can refer to a disabling, deactivating, enabling, activating, etc., of a property or function. Governing can also refer to an exclusion of that function or property, such that a function or property may be operable but unable to perform in the manner originally intended. For example, during the playing of a media file, the progress bar may be selected and moved from one location on the progress line to another without having an effect on the play of the media file.

Within FIG. 3, it is further noted that codec 303 compares the information for the media player application operating on client computer system, (e.g., 210), with a list of "signatures" associated with known media recording applications. In one embodiment, the signature can be, but is not limited to, a unique identifier of a media player application which can consist of the window class of the application along with a product name string which is part of the window title for the application. Advantageously, when new media player applications are developed, their signatures can be readily added to the signature list via an update of CCM 300 described herein.

The following C++ source code is an exemplary implementation of the portion of a codec 303 for performing media player application detection, in accordance with an embodiment of the present invention. In another embodiment, the following source code can be modified to detect kernel streaming mechanisms operable within a client system, (e.g., 210).

```
int
IsRecorderPresent(TCHAR *    szAppClass,
        TCHAR *             szProdName)
{
    TCHAR       szWndText[_MAX_PATH]; /* buffer to receive title string for window */
    HWND        hWnd;       /* handle to target window for operation */
    int     nRetVal;    /* return value for operation */
```

```
        /* initialize variables */
        nRetVal = 0;
        if ( _tcscmp(szAppClass, _T("#32770"))
            == 0)
        {
            /* attempt to locate dialog box with specified window title */
            if ( FindWindow((TCHAR *) 32770, szProdName)
                != (HWND) 0)
            {
                /* indicate application found */
                nRetVal = 1;
            }
        }
        else
        {
            /* attempt to locate window with specified class */
            if ( (hWnd = FindWindow(szAppClass, (LPCTSTR) 0))
                != (HWND) 0)
            {
                /* attempt to retrieve title string for window */
                if ( GetWindowText(hWnd,
                            szWndText,
                            _MAX_PATH)
                    != 0)
                {
                    /* attempt to locate product name within title string */
                    if ( _tcsstr(szWndText, szProdName)
                        != (TCHAR *) 0)
                    {
                        /* indicate application found */
                        nRetVal = 1;
                    }
                }
            }
        }
        /* return to caller */
        return nRetVal;
}
```

Within FIG. 3, it is further noted that codec 303 can also selectively suppress waveform input/output operations to prevent recording of copyrighted media on a client computer system, (e.g., 210). For example, codec 303, subsequent to detection of bundled media player applications operational in a client computer system (e.g., 210) can stop or disrupt the playing of a media content file. This can be accomplished, in one embodiment, by redirecting and/or diverting certain data pathways that are commonly used for recording, such that the utilized data pathway is governed by the copyright compliance mechanism 300. In one embodiment, this can be performed within a driver shim, (e.g., wave driver shim 309 of FIGS. 5A and 5B).

A driver shim can be utilized for nearly any software output device, such as a standard Windows™ waveform output device (e.g., Windows™ Media Player), or a hardware output device (e.g., speakers or headphones). Client computer system 210 is configured such that the driver shim (e.g., 309) appears as the default waveform media device to client level application programs. Thus, requests for processing of waveform media input and/or output will pass through the driver shim prior to being forwarded to the actual waveform audio driver, (e.g., media device driver 505 of FIGS. 5A-5D). Such waveform input/output suppression can be triggered by other components (e.g., agent 304) of CCM 300 to be active when a recording operation is initiated by a client computer system (e.g., 210) during the play back of media files which are subject to the DMCA.

It is noted that alternative driver shims can be implemented for nearly any waveform output device including, but not limited to, a Windows™ Media Player. It is further noted that the driver shim can be implemented for nearly any media in nearly any format including, but not limited to, audio media files, audio input and output devices, video, graphic and/or alphanumeric media files and video input and output devices.

The following C++ source code is an exemplary implementation of a portion of a codec 303 and/or a custom media device driver 307 for diverting and/or redirecting certain data pathways that are commonly used for recording of media content, in accordance with an embodiment of the present invention.

```
DWORD
_stdcall
widMessage(UINT    uDevId,
        UINT    uMsg,
        DWORD   dwUser,
        DWORD   dwParam1,
        DWORD   dwParam2)
{
    BOOL    bSkip;      /* flag indicating operation to be skipped */
```

-continued

```
HWND         hWndMon;    /* handle to main window for monitor */
DWORD        dwRetVal;   /* return value for operation */
/* initialize variables */
bSkip = FALSE;
dwRetVal = (DWORD) MMSYSERR_NOTSUPPORTED;
if (uMsg == WIDM_START)
{
    /* attempt to locate window for monitor application */
    if ( (hWndMon = FindMonitorWindow( ))
       != (HWND) 0)
    {
        /* obtain setting for driver */
        bDrvEnabled = (   SendMessage(hWndMon,
                          uiRegMsg,
                          0,
                          0)
                == 0)
              ? FALSE : TRUE;
    }
    if (bDrvEnabled == TRUE)
    {
        /* indicate error in operation */
        dwRetVal = MMSYSERR_NOMEM;
        /* indicate operation to be skipped */
        bSkip = TRUE;
    }
}
if (bSkip == FALSE)
{
    /* invoke entry point for original driver */
    dwRetVal = CallWidMessage(uDevId, uMsg, dwUser, dwParam1, dwParam2);
}
/* return to caller */
return dwRetVal;
}
```

It is noted that when properly configured, system hook 305 can govern nearly any function or property within nearly any media player application that may be operational within a client computer system, (e.g., 210). In one embodiment, system hook 305 is a DLL (dynamic link library) file. It is further noted that system hooks are well known in the art, and are a standard facility in a Microsoft Windows™ operating environment, and accordingly can be implemented in a variety of ways. However, it is also noted that system hook 305 can be readily adapted for implementation in alternative operating systems, (e.g., Apple™ operating systems, Sun Solaris™ operating systems, Linux operating systems, and nearly any other operating system).

In FIG. 3, copyright compliance mechanism 300 also includes one or more skins 306, which can be designed to be installed in a client computer system, (e.g., 210, 220, and 230). In one embodiment, skins 306 are utilized to assist in client side compliance with the DMCA (digital millennium copyright act) regarding copyrighted media content. Skins 306 are customizable interfaces that, in one embodiment, are displayed on a display device (e.g., 105) of computer system 210 and provide functionalities for user interaction of delivered media content. Additionally, skins 306 can also provide a display of information relative to the media content file including, but not limited to, song title, artist name, album title, artist biography, and other features such as purchase inquiries, advertising, and the like.

Furthermore, when system hook 305 is unable to govern a function of the media player application operable on a client computer system (e.g., 210) such that client computer system could be in non-compliance with DMCA and/or RIAA restrictions, a skin 306 can be implemented to provide compliance.

Differing skins 306 can be implemented depending upon the restrictions applicable (e.g., DMCA and/or RIAA) to each media content file. For example, in one embodiment, a skin 306*a* may be configured for utilization with a media content file protected under a non-interactive agreement (DMCA), such that skin 306*a* may not include a pause function, a stop function, a selector function, and/or a save function, etc. Another skin, (e.g., skin 306*b*) may, in one embodiment, be configured to be utilized with a media content file protected under an interactive with "no save" agreement (DMCA), such that skin 306*b* may include a pause function, a stop function, a selector function, and for those media files having an interactive with "save" agreement, a save or a burn to CD function.

Still referring to FIG. 3, it is further noted that in the present embodiment, each skin 306 can have a unique name and signature. In one embodiment, skin 306 can be implemented, in part, through the utilization of an MD (message digest) 5 hash table or similar algorithm. An MD5 hash table can, in one implementation, be a check-sum algorithm. It is well known in the art that a skin, (e.g., skin 306), can be renamed and/or modified to incorporate additional features and/or functionalities in an unauthorized manner. Since modification of the skin would change the check sum and/or MD5 hash, without knowledge of the MD5 hash table, changing the name or modification of the skin may simply serve to disable the skin, in accordance with one embodiment of the present invention. Since copyright compliance mechanism (CCM) 300 verifies skin 306, MD5 hash tables advantageously provide a deterrent against modifications made to the skin 306.

In one embodiment, CCM 300 also includes one or more custom media device driver(s) 307 for providing an even greater measure of control over the media stream while increasing compliance reliability. A client computer system (e.g., 210) can be configured to utilize a custom media device application (e.g., custom media device 310 of FIGS. 5B, 5C, and 5D) to control unauthorized recording of media content files. A custom media device application can be, but is not limited to, a custom media audio device application for media files having sound content, a custom video device application for media files having graphical and/or alphanumeric content, etc. In one embodiment, custom media device 310 of FIG. 5B is an emulation of the custom media device driver 307. With reference to audio media, the emulation is performed in a waveform audio driver associated with custom media device 310. Driver 307 is configured to receive a media file being outputted by system 210 prior to the media file being sent to a media output device (e.g., media output device 570) and/or a media output application (e.g., recording application 502). Examples of a media output device includes, but is not limited to, a video card for video files, a sound card for audio files, etc. Examples of a recording application can include, but is not limited to, CD burner applications for writing to another CD, ripper applications which capture the media file and change the format of the media file, (e.g., from a CD audio file to an .mpeg audio file, and/or a .wav file, and/or an ogg vorbis file, and various other media formats). In one embodiment, client computer system 210 is configured with a custom media device 310 emulating custom media device driver 307, and which is system 210's default device driver for media file output. In one embodiment, an existing GUI (graphical user interface) can be utilized or a GUI can be provided, (e.g., by utilization of skin 306), or a custom web based player application or as part of a CCM 300 installation bundle, for forcing or requiring system 210 to have driver 307 as the default driver.

Therefore, when a media content file is received by system 210 from server 251, the media content file is playable, provided the media content file passes through the custom media device application (e.g., 310 of FIG. 5B), that is an emulation of custom media device driver 307, prior to being outputted. However, if an alternative media player application is selected, delivered media files from server 251 will not play on system 210.

Thus, secured media player applications would issue a media request to the driver (e.g., 307) for the custom media device 310 which then performs necessary media input suppression, (e.g., waveform suppression for audio files), prior to forwarding the request to the default Windows™ media driver, (e.g., waveform audio driver for audio files).

Within FIG. 3, it is noted that requests for non-restricted media files can pass directly through custom media device driver 307 to a Windows™ waveform audio driver operable on system 210, thus reducing instances of incompatibilities with existing media player applications that utilize waveform media, (e.g., audio, video, etc.). Additionally, media player applications that do not support secured media would be unaffected. It is further noted that for either secured media or non-restricted media, (e.g., audio media files), waveform input suppression can be triggered by other components of CCM 300, (e.g., agents 304, system hooks 305, and skins 306, or a combination thereof), to be active when a recording operation is initiated simultaneously with playback of secured media files, (e.g., audio files). Custom device drivers are well known and can be coded and implemented in a variety of ways including, but not limited to, those found at developers network web sites, (e.g., a Microsoft™ or alternative OS (operating system) developer web sites).

Advantageously, by virtue of system 210 being configured with a custom media device as the default device driver, (e.g., 310 of FIGS. 5B, 5C, and 5D), that is an emulation of a custom media device driver 307, those media player applications that require their particular device driver to be the default driver, (e.g., Total Recorder, etc.), are rendered non-functional for secured media. Further advantageous is that an emulated custom media device provides no native support for those media player applications used as a recording mechanism, (e.g., DirectSound capture, (direct sound 504 of FIGS. 5A-5D) etc., that are able to bypass user-mode drivers for most media devices. Additionally, by virtue of the media content being sent through device driver 307, thus effectively disabling unauthorized saving/recording of media files, in one embodiment, media files that are delivered in a secured delivery system do not have to be encrypted, although, in another embodiment, they still may be encrypted. By virtue of non-encrypted media files utilizing less storage space and network resources than encrypted media files, networks having limited resources can utilize the functionalities of driver 307 of CCM 300 to provide compliance with copyright restrictions and/or licensing agreements applicable with a media content file without having the processing overhead of encrypted media files.

Figure 4:
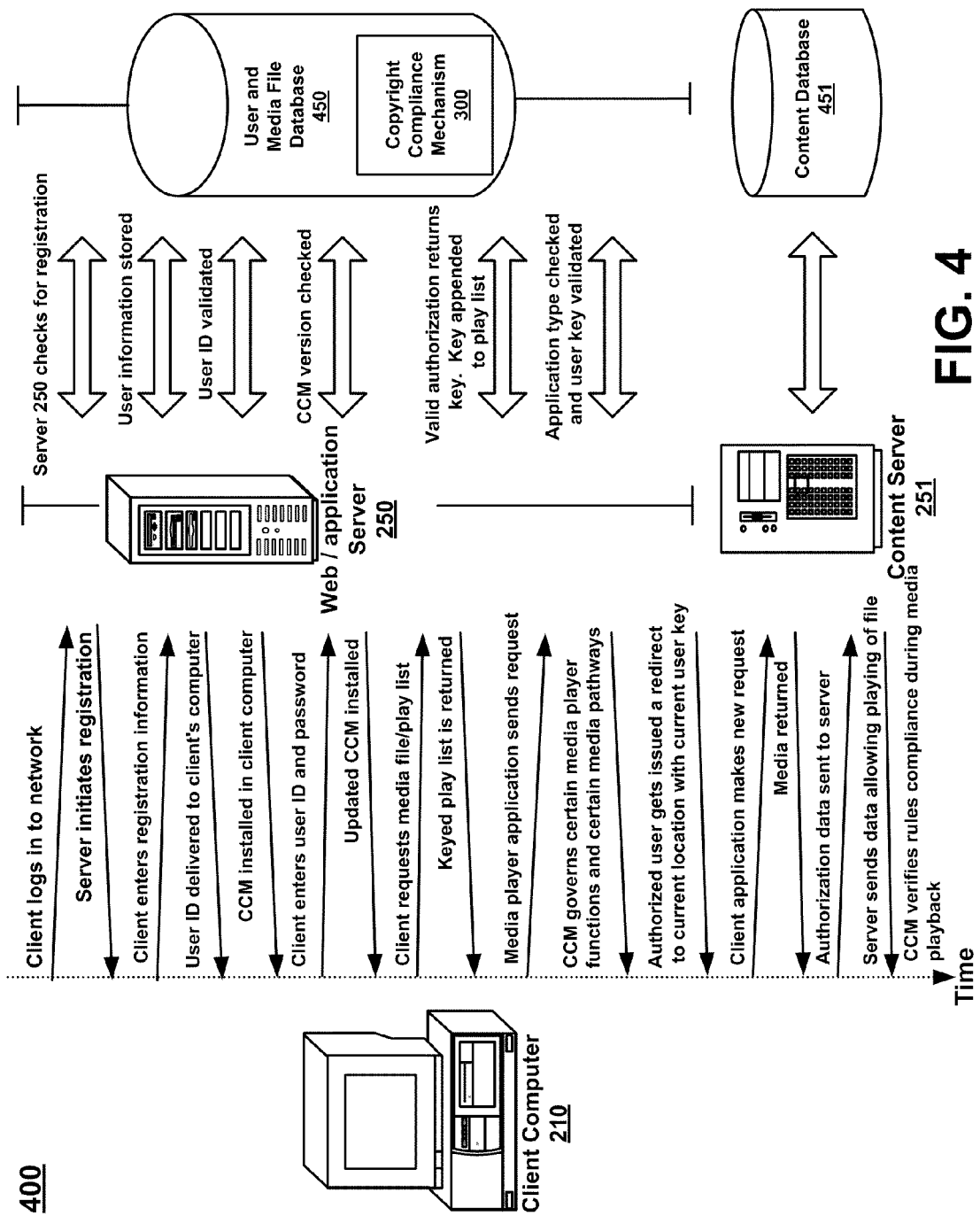
FIG. 4 is an illustration of an exemplary system for implementing a copyright compliance mechanism in accordance with an embodiment of the present invention.

FIG. 4 is an exemplary system 400 for implementing a copyright compliance mechanism in accordance with an embodiment of the present invention. Specifically, system 400 illustrates web server 250, content server 251, or a combination of web server 250 and content server 251 installing a copyright compliance mechanism (e.g., 300) in a client's computer system (e.g., 210) for controlling media file distribution and controlling user access and interaction of copyrighted media files, in one embodiment of the present invention.

Client computer system 210 can communicatively couple with a network (e.g., 200) to request a media file, a list of available media files, or a play list of audio files, (e.g., MP3 files), etc. In response, web server 250 determines if the request originates from a registered user authorized to receive media files associated with the request. If the user is not registered with the network, web server 250 can initiate a registration process with the requesting client 210. Client registration can be accomplished in a variety of ways. For example, web server 250 may deliver to client 210 a registration form having various text entry fields into which the user can enter required information. A variety of information can be requested from the user by web server 250 including, but not limited to, user's name, address, phone number, credit card number, online payment account number, biometric identification (e.g., fingerprint, retinal scan, etc.), verifiable email address, and the like. In addition, registration can, in one embodiment, include the user selecting a username and password.

Still referring to FIG. 4, web server 250 can, in one embodiment, detect information related to the client's computer system 210 and store that information in a user/media database 450. For example, web server 250 can detect a unique identifier of client computer system 210. In one embodiment, the unique identifier can be the MAC (media access control) address of a NIC (network interface card) of client computer system 210 or the MAC address of the network interface adapter integrated on the motherboard of system 210. It is understood that a NIC enables a client computer system 210 to access web server 250 via a network such as Internet 201. It is well known that each NIC typically has a unique identifying number MAC address. Further, web server 250 can, in one embodiment, detect and store (also in database 450) information regarding the type(s) of media player application(s), (e.g., Windows Media Player™, Real Player™, iTunes Player™ (Apple), Live 365™ player), and those media player applications having recording functionality (e.g., Total Recorder, Cool Edit 2000, Sound Forge, Sound Recorder, Super MP3 Recorder, and the like) that are present and operable in client computer system 210. In one embodiment, the client information is verified for accuracy and is then stored in a user database (e.g., 450) within web server 250.

Subsequent to registration completion, creation of the user ID and password, and obtaining information regarding client computer system 210, all or part of this information can be installed in client computer system 210. In one embodiment, client computer system 210 information can be in the form of a cookie. Web server 250 then verifies that the user and client computer system 210 data is properly installed therein and that their integrity has not been compromised. Subsequently, web server 250 installs a copyright compliance mechanism (e.g., 300) into the client's computer system, (e.g., 210), in one embodiment of the present invention. It is noted that web server 250 may not initiate installation of CCM 300 until the user ID, password, and client computer system 210 information is verified. A variety of common techniques can be employed to install an entire CCM 300, portions of its components, entire components, and/or combinations or a function of its components. For example, copyright compliance mechanism 300 can be installed in a hidden directory within client computer system 210, thereby preventing unauthorized access to it. In one embodiment it is noted that unless CCM 300 is installed in client computer system 210, its user will not be able to request, access, or have delivered thereto, media files stored by web server 250 and/or content server 251.

Referring still to FIG. 4, upon completion of client registration and installation of CCM 300, client computer system 210 can then request a media play list or a plurality of play lists, etc. In response, web server 250 determines whether the user of client computer system 210 is authorized to receive the media play list associated with the request. In one embodiment, web server 250 can request the user's username and password. Alternatively, web server 250 can utilize user database 450 to verify that computer 210 is authorized to receive a media play list. If client computer 210 is not authorized, web server 250 can initiate client registration, as described herein. Additionally, web server 250 can disconnect computer 210 or redirect it to an alternative web site. Regardless, if the user and client computer system 210 are not authorized, web server 250 will not provide the requested play list to client computer system 210.

However, if client computer system 210 is authorized, web server 210 can check copyright compliance mechanism 300 within data base 450 to determine if it, or any of the components therein, have been updated since the last time client computer system 210 logged into web server 250. If a component of CCM 300 has been updated, web server 250 can install the updated component and/or a more current version of CCM 300 into client computer system 210, (e.g., via Internet 201). If CCM 300 has not been updated, web server 250 can then deliver the requested media play list to system 210 via Internet 201 along with an appended user key or user identification (ID). It is noted that user database 450 can also include data for one or more media play lists that can be utilized to provide a media play list to client computer system 210. Subsequently, the user of client computer system 210 can utilize the received media play list in combination with the media player application operating on system 210 to transmit a delivery request for one or more desired pieces of media content from web server 250. It is noted that the delivery request contains the user key for validation purposes.

Still referring to FIG. 4, upon receiving the media content delivery request, web server 250 can then check the validity of the requesting media application and the attached user key. In one embodiment, web server 250 can utilize user database 450 to check their validity. If either or both are invalid, web server 250, in one embodiment, can redirect unauthorized client computer system 210 to an alternative destination to prevent abuse of the system. However, if both the requesting media application and the user key are valid, CCM 300 verifies that skins 306 are installed in client computer system 210. Additionally, CCM 300 further verifies that system hook(s) 305 have been run or are running to govern certain functions of those media player applications operable within client computer system 210 that are known to provide non-compliance with one or more restricted use standards such as the DMCA and/or the RIAA. Additionally, CCM 300 further diverts and/or redirects certain pathways that are commonly used for recording, (e.g., driver 307 of FIG. 5A, device 310 of FIG. 5B, device 570 of FIG. 5C, and driver 505 of FIG. 5D). Once CCM 300 has performed the above described functions, web server 250 then, in one embodiment, issues to the client computer 210 a redirect command to the current address location of the desired media file content along with an optional time sensitive access key, (e.g., for that hour, day, or other defined timeframe).

In response to the client computer system 210 receiving the redirect command from web server 250, the media player application operating on client computer system 210 automatically transmits a new request and the time sensitive access key to content server 251 for delivery of one or more desired pieces of media content. The validity of the time sensitive access key is checked by content server 251. If invalid, unauthorized client computer 210 is redirected by content server 250 to protect against abuse of the system and unauthorized access to content server 251. If the time sensitive access key is valid, content server 251 retrieves the desired media content from content database 451 and delivers it to client computer system 210. It is noted that, in one embodiment, the delivered media content can be stored in hidden directories and/or custom file systems that may be hidden within client computer system 210 thereby preventing future unauthorized distribution. In one embodiment, an HTTP (hypertext transfer protocol) file delivery system is used to deliver the requested media files, meaning that the media files are delivered in their entirety to client computer system 210, as compared to streaming media which delivers small portions of the media file.

Still referring to FIG. 4, it is noted that each media file has had, in one embodiment, a header attached therewith prior to delivery of the media file. In one embodiment, the header can contain information relating to the media file, (e.g., title or media ID, media data such as size, type of data, and the like). The header can also contain a sequence or key that is recognizable to copyright compliance mechanism 300 that identifies the media file as originating from content server 251. In one embodiment, the header sequence/key can also contain instructions for invoking the licensing agreements and/or copyright restrictions that are applicable to that particular media file.

Additionally, if licensing agreements and/or copyright restrictions are changed, developed, or created, or if new media player applications, with or without recording functionality, are developed, CCM 300 has appropriate modifications made to portions of components, entire components, combinations of components, and/or the entire CCM 300 to enable continued compliance with licensing agreements and/or copyright restrictions. Furthermore, subsequent to modification of copyright compliance mechanism 300, modified portions of; or the entire updated CCM 300 can be installed in client computer system 210 in a variety of ways. For example, the updated CCM 300 can be installed during client interaction with web server 250, during user log-in, and/or while client computer system 210 is receiving the keyed play list.

Referring still to FIG. 4, it is further noted that, in one embodiment, the media files and attached headers can be encrypted prior to being stored within content server 251. In one embodiment, the media files can be encrypted utilizing randomly generated keys. Alternatively, variable length keys can be utilized for encryption. It is noted that the key to decrypt the encrypted media files can be stored in database 450, content database 451 or in some combination of databases 450 and 451. It is further noted that the messages being passed back and forth between client computer system 210 and web server 250 can also be encrypted, thereby protecting the media files and the data being exchanged from unauthorized use or access. There are a variety of encryption mechanisms and programs that can be implemented to encrypt this data including, but not limited to, exclusive OR, shifting with adds, public domain encryption programs such as Blowfish, and non-public domain encryption mechanisms. It is also noted that each media file can be uniquely encrypted, such that if the encryption code is cracked for one media file, it is not applicable to other media files. Alternatively, groups of media files can be similarly encrypted. Furthermore, in another embodiment, the media files may not be encrypted when being delivered to a webcaster known to utilize a proprietary media player application, (e.g., custom media device driver 307).

Subsequent to media file decryption, the media file may be passed through CCM 300, (e.g., coder/decoder 303), to a media player application operating on client computer system 210, (e.g. playback application 501 of FIGS. 5A-5D, and 6), which can then access and utilize the delivered high fidelity media content, enabling its user(s) to experience the media content, (e.g., listen to it, watch it, view it, or the like). In one embodiment of the present invention, a specialized or custom media player may or may not be required to experience the media content, (e.g., skin 306 of FIG. 3). A skin 306 may be necessary when CCM 300 cannot modify an industry standard media player application to comply with copyright restrictions and/or licensing agreements in accordance with the DMCA. Alternatively, an industry standard media player can be utilized by client computer system 210 to experience the media content. Typically, many media player applications are available and can include, but are not limited to, Windows™ Media Player™ for PCs (personal computers), iTunes™ Player or QuickTime™ for Apple computers, and XMMS player for computers utilizing a Linux operating system. Regardless of the media player application utilized, while the media file is passed to the media player application, (e.g., in a frame by frame basis or in a buffer), coder/decoder 303 will repeatedly ensure that CCM 300 rules are being enforced at any particular moment during media playback, shown as step 650 of FIG. 6C.

As the media file content is delivered to the media player application, periodically, (e.g., after a specified number of frames, after a defined period of time, or any desired time or data period), coder/decoder 303 repeatedly determines whether or not all the rules, as defined by CCM 300, are enforced. If the rules are not enforced, (e.g., a user opening up a recording application such as Total Recorder or an alternative application), the presentation of the media content is, in one embodiment, suspended or halted. In another embodiment, the presentation of the media content can be modified to output the media content in a non-audible manner, (e.g., silence). In yet another embodiment, the media content may be audible but recording functionality can be disabled, such that the media content cannot be recorded. These presentation stoppages are collectively shown as step 751 of FIG. 7C.

If the rules in accordance with CCM 300 are enforced, the codec/decoder 303 retrieves a subsequent portion of the media content that is stored locally in client computer system 210. The newly retrieved portion of the media file is then presented by the client's media player application. While the newly retrieved portion is presented, CCM 300 again checks that the rules are enforced, and retrieves an additional portion of the media file or suspends presentation of the media file if the rules are not being enforced. These operations are performed repeatedly throughout the playback of the media file, in a loop environment, until the media file's contents have been presented in their entirety. Advantageously, by constantly monitoring during playing of media files, CCM 300 can detect undesired activities and enforces those rules as defined by CCM 300.

Figure 5A:
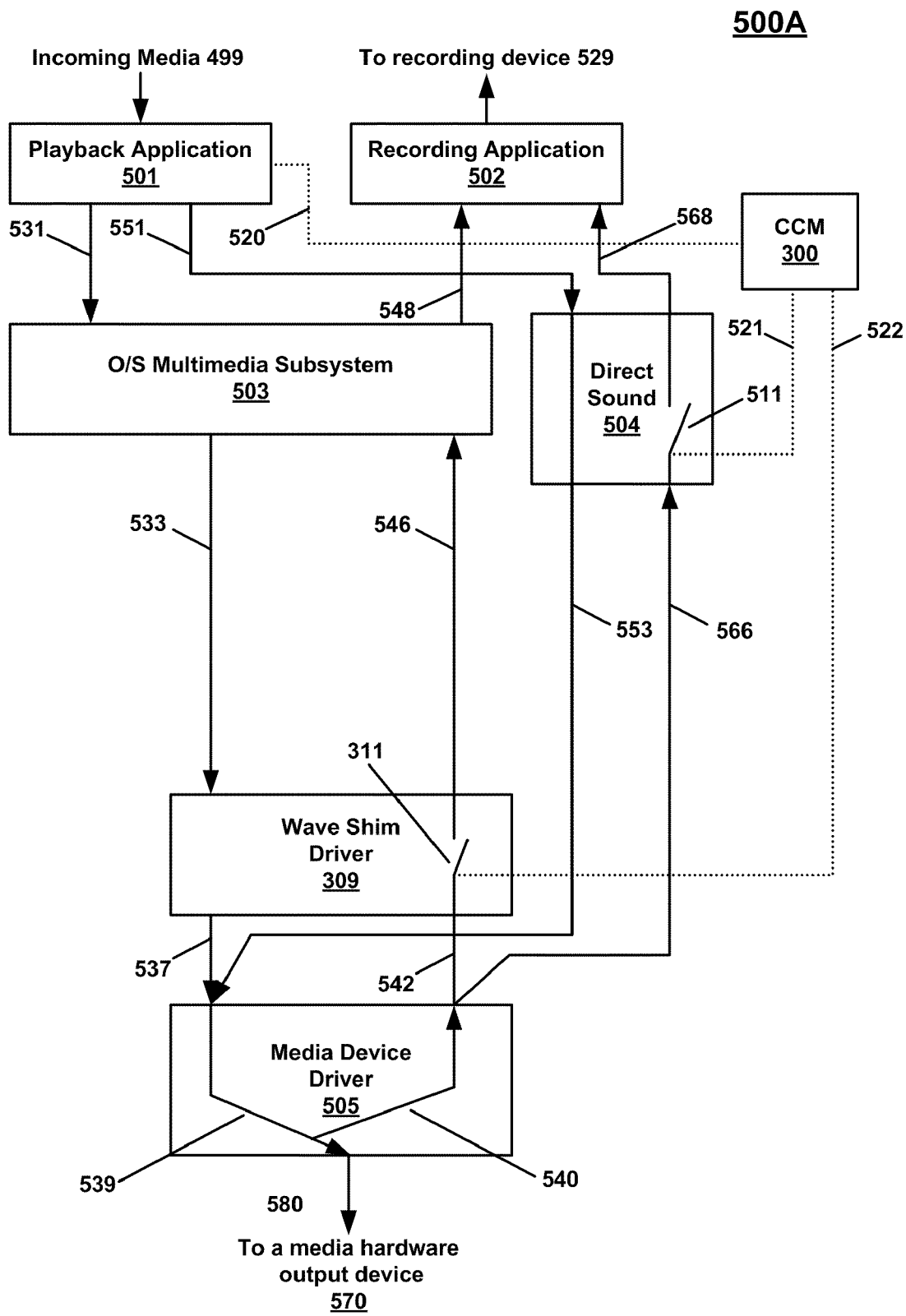
FIG. 5A is a data flow block diagram showing an implementation of a copyright compliance mechanism for preventing unauthorized recording of media files, in accordance with one embodiment of the present invention.
Figure 5B:
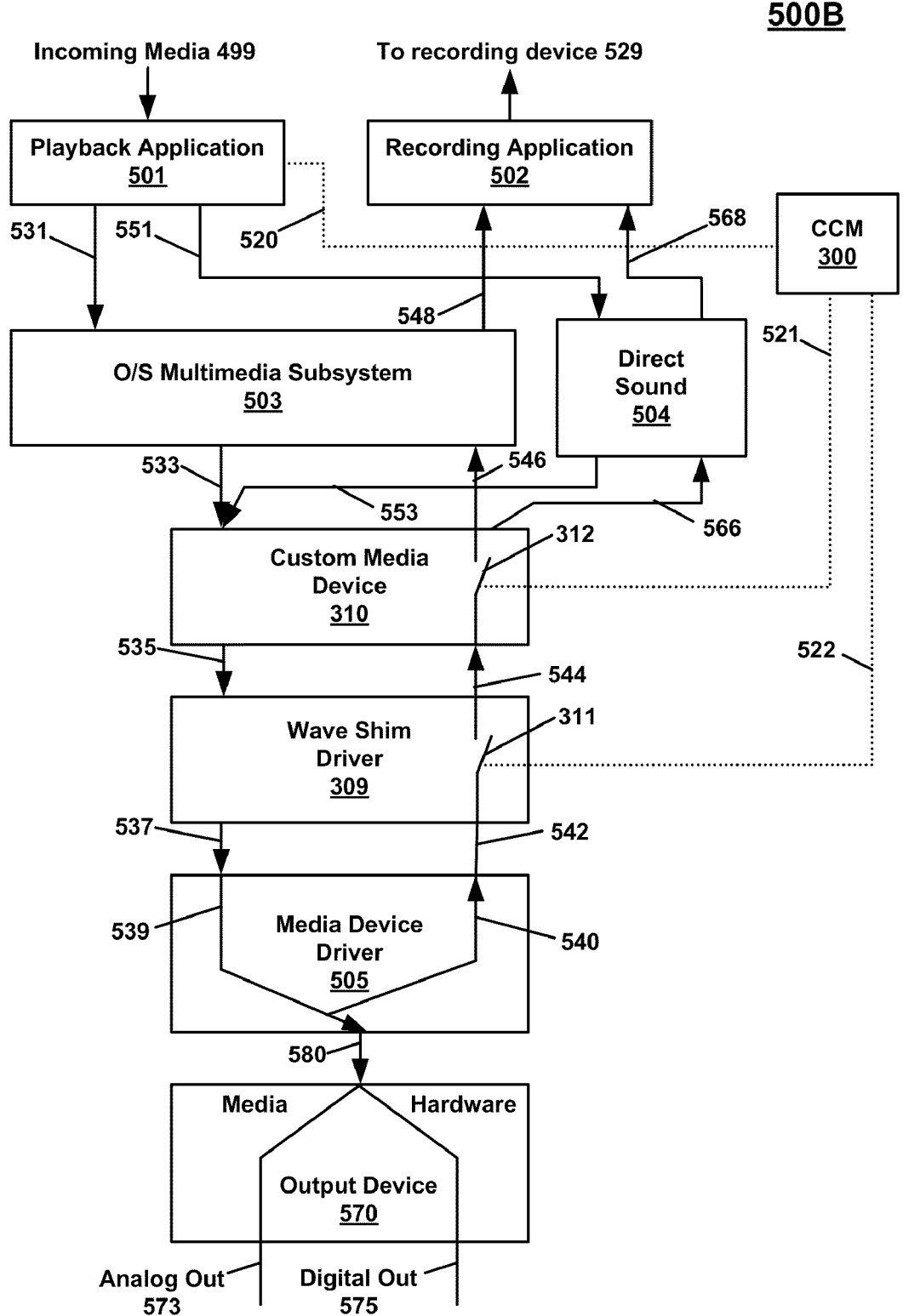
FIG. 5B is a data flow block diagram showing an implementation of a component of a copyright compliance mechanism for preventing unauthorized recording of media files, in accordance with another embodiment of the present invention.

FIG. 5A is an exemplary logic/bit path block diagram 500A showing utilization of a wave shim driver, (e.g., 309 of FIG. 3), in conjunction with copyright compliance mechanism 300, for selectively controlling recording of copyrighted media received by a client computer system, (e.g., system 210), in one embodiment of the present invention. Copyright compliance mechanism 300 is, in one embodiment, installed and operational on client system 210 in the manner described herein.

In one embodiment, a copyright compliance mechanism 300 is shown as being communicatively coupled with a media playback application 501 via coupling 520. Therefore, CCM 300 is enabled to communicate with playback application 501. In one embodiment, CCM 300 can be integrated into a media playback application. CCM 300 is also coupled to and controls a selectable switch 311 in wave shim driver 309 (as described in FIG. 3) via coupling 522. CCM 300 is further coupled to and controls a selectable switch 511 in direct sound 504 via coupling 521. Depending upon the copyright restrictions and licensing agreements applicable to an incoming media file, (e.g., 499), CCM 300 controls whether switches 311 and 511 are open (shown), thus preventing incoming media 499 from reaching a media recording application, or closed (not shown) to allow recording of incoming media 499.

For example, incoming media 499 may originate from a content server, (e.g., 251), coupled to system 210. In another example, incoming media 499 may originate from a personal recording/electronic device, (e.g., a MP3 player/recorder or similar device), coupled to system 210. Alternatively, incoming media 499 may originate from a magnetic, optical or alternative media storage device inserted into a media device player coupled to system 210, (e.g., a CD or DVD inserted into a CD or DVD player), a hard disk in a hot swappable hard drive, an SD (secure digital card) inserted into a SD reader, and the like. In yet another example, incoming media 499 may originate from another media player application or media recording application.

Incoming media 499 may also originate from a satellite radio feed (e.g., XM radio), a personal communication device (e.g., a mobile phone), a cable television radio input (e.g., DMX (digital music express)), a digital distribution and/or a public presentation source via a network, Internet or other communication connection, pay-per-view and/or pay-per-play system, or a set-top box. It is noted that incoming media 499 can originate from nearly any source that can be coupled to system 210. However, regardless of the source of incoming media 499, embodiments of the present invention, described herein, can prevent unauthorized recording of the media 499.

FIG. 5A shows a media playback application 501, (e.g., an audio, video, or other media player application), operable within system 210 and configured to receive incoming media 499. Playback application 501 can be a playback application provided by an operating system, (e.g., Media Player for Windows™ by Microsoft), a freely distributed playback application downloadable from the Internet, (e.g., RealPlayer or LiquidAudio), a playback application provided by a webcaster, (e.g., PressPlay), or a playback application commercially available.

Media device driver 505, in one embodiment, may be a software driver for a sound card coupled to system 210 having a media output device 570, (e.g., speakers or headphones), coupled therewith for media files having audio content. In another implementation, media device driver 505 may be a software driver for a video card coupled with a display device, (e.g., 105), for displaying media files having alphanumeric and/or graphical content, and so on. With reference to audio files, it is well known that a majority of recording applications assume a computer system, (e.g., 210), has a sound card disposed therein, providing full-duplex sound functionality to system 210. This means media output driver 505 can simultaneously cause playback and recording of incoming media files 499. For example, media device driver 505 can playback media 499 along wave-out line 539 to media output device 570 (e.g., speakers for audible playback) via wave-out line 580 while outputting media 499 on wave-out line 540 to eventually reach recording application 502.

For purposes of FIGS. 5A-5D, the terms wave-in line and wave-out line are referenced from the perspective of media device driver 505. Additionally, for the most part, wave-in lines are depicted downwardly and wave-out lines are depicted upwardly in FIGS. 5A-5D.

Continuing with FIG. 5A, playback application 501 is coupled with an operating system (O/S) multimedia subsystem 503 and direct sound 504 via wave-in lines 531 and 551 respectively. O/S multimedia subsystem 503 is coupled to a wave shim driver 309 via wave-in line 533 and wave-out line 546. O/S multimedia subsystem 503 is also coupled to recording application 502 via wave-out line 548. Operating system (O/S) multimedia subsystem 503 can be any O/S multimedia subsystem, (e.g., a Windows™ multimedia subsystem) for system 210 operating under a Microsoft O/S, a QuickTime™ multimedia subsystem for system 210 operating under an Apple O/S, and the like. Playback application 501 is also coupled with direct sound 504 via wave-in line 551.

Direct sound 504, in one embodiment, may represent access to a hardware acceleration feature in a standard audio device, enabling lower level access to components within media device driver 505. In another embodiment, direct sound 504 may represent a path that can be used by a recording application, (e.g., Total Recorder), that can be further configured to bypass the default device driver, (e.g., media device driver 505), to capture incoming media 499 for recording. For example, direct sound 504 can be enabled to capture incoming media 499 via wave-in line 551 and unlawfully output media 499 to recording application 502 via wave-out line 568, as well as media 499 eventually going to media device driver 505, the standard default driver.

Still referring to FIG. 5A, wave shim driver 309 is coupled with media device driver 505 via wave-in line 537 and wave-out line 542. Media device driver 505 is coupled with direct sound 504 via wave-in line 553 which is shown to converge with wave-in line 537 at media device driver 505. Media device driver 505 is also coupled with direct sound 504 via wave-out line 566.

Wave-out lines 542 and 566 are shown to diverge from wave-out line 540 at media device driver 505 into separate paths. Wave-out line 542 is coupled to wave shim driver 309 and wave-out line 566 is coupled to direct sound 504. When selectable switches 311 and 511 are open (shown), incoming media 499 cannot flow to recording application 502, thus preventing unauthorized recording of it.

For example, incoming media 499 is received at playback application 501. Playback application 501 activates and communicates to CCM 300 regarding copyright restrictions and/or licensing agreements applicable to incoming media 499. If recording restrictions apply to media 499, CCM 300 can, in one embodiment, open switches 311 and 511, thereby blocking access to recording application 502 to effectively prevent unauthorized recording of media 499. In one embodiment, CCM 300 can detect if system 210 is configured with direct sound 504 selected as the default driver to capture incoming media 499, via wave-in line 551, or a recording application is detected and/or a hardware accelerator is active, such that wave driver shim 309 can be bypassed by direct sound 504. Upon detection, CCM 300 can control switch 511 such that the output path, wave-out line 568, to recording application 502 is blocked. It is further noted that CCM 300 can detect media recording applications and devices as described herein, with reference to FIG. 3.

Alternatively, if media device driver 505 is selected as the default driver, incoming media 499 is output from playback application 501 to O/S multimedia subsystem 503 via wave-in line 531. From subsystem 503, media 499 is output to wave shim driver 309 via wave-in line 533. The wave shim driver 309 was described herein with reference to FIG. 3. Media 499 is output from wave shim driver 309 to media device driver 505 via wave-in line 537. Once received by media device driver 505, media 499 can be output via wave-out line 539 to media output device 570 coupled therewith via wave-out line 580. Additionally, media device driver 505 can simultaneously output media 499 on wave-out line 540 back to wave shim driver 309. Dependent upon recording restrictions applicable to media 499, CCM 300 can, in one embodiment, close switch 311 (not shown as closed), thereby allowing media 499 to be output from wave shim driver 309 to subsystem 503 (via wave-out line 546) and then to recording application 502 via wave-out line 548. Alternatively, CCM 300 can also open switch 311, thereby preventing media 499 from reaching recording application 502.

It is noted that by virtue of CCM 300 controlling both switches 311 and 511, and therefore controlling wave-out line 548 and wave-out line 568 leading into recording application 502, incoming media files, (e.g., 499), can be prevented from being recorded in an unauthorized manner in accordance with applicable copyright restrictions and/or licensing agreements related to the incoming media 499. It is also noted that embodiments of the present invention in no way interfere with or inhibit the playback of incoming media 499.

FIG. 5B is an exemplary logic/bit path block diagram 500B of a client computer system, (e.g., 210), configured with a copyright compliance mechanism 300 for preventing unauthorized recording of copyrighted media according to an embodiment of the present invention. Copyright compliance mechanism 300 is, in one embodiment, coupled with and operational on client system 210 in the manner described herein with reference to FIGS. 4, 5A, 5C, 5D, 6, and 7.

Diagram 500B of FIG. 5B is similar to diagram 500A of FIG. 5A, with a few changes. Particularly, diagram 500B includes a custom media device 310 communicatively interposed between and coupled to O/S multimedia subsystem 503 and wave shim driver 309. Custom media device 310 is coupled to O/S multimedia subsystem via wave-in line 533 and wave-out line 546. Custom media device 310 is coupled with wave shim driver 309 via wave-in line 535 and wave-out line 544. Additionally, custom media device 310 is coupled with direct sound 504 via wave-in line 553 which converges with wave-in line 533 and wave-out line 566 which diverges from wave-out line 546, in one embodiment.

Diagram 500B also includes a media hardware output device 570 that is coupled to media device hardware driver 505 via line 580. Media hardware output device 570 can be, but is not limited to, a sound card for audio playback, a video card for video, graphical, alphanumeric output, and the like.

In one embodiment, CCM 300 is communicatively coupled with playback application 501 via coupling 520, waveform driver shim 309 via coupling 522, and custom media device 310 via coupling 525. CCM 300 is coupled to and controls selectable switch 311 in waveform driver shim 309 via coupling 522. CCM 300 is also coupled to and controls selectable switch 312 in custom audio device 310 via coupling 525. Depending upon the copyright restrictions and licensing agreements applicable to an incoming media file, (e.g., media 499), CCM 300 controls whether switches 311 and 312 are open (shown), thus preventing the incoming media 499 from reaching a recording application, or closed (not shown) so as to allow recording of the incoming media 499.

Continuing with FIG. 5B, direct sound 504 is coupled with custom media device 310 via wave-in line 553, instead of being coupled with media device driver 505 (FIG. 5A). In one embodiment, custom audio device 310 mandates explicit selection through system 210, meaning that custom audio device 310 needs to be selected as a default driver of system 210. By virtue of having the selection of custom media device 310 as the default driver of system 210, the data path necessary for direct sound 504 to capture the media content can be selectively closed.

For example, incoming media 499 originating from nearly any source described herein with reference to FIG. 5A is received by media playback application 501 of system 210. Playback application 501 communicates to CCM 300, via coupling 520, to determine whether incoming media 499 is protected by any copyright restrictions and/or licensing agreements. Playback application 501 communicates with CCM 300 to control switch 311 and 312 accordingly. For example, if recording of incoming media 499 would violate applicable restrictions and/or agreements, switch 312 is in an open position (as shown), such that the output path to recording application 502, (e.g., wave-out line 548 and/or wave-out line 568), is effectively blocked thereby preventing unauthorized recording of media 499.

Alternatively, if media device driver 505 is selected as the default driver, incoming media 499 continues from O/S multimedia subsystem 503, through custom media device 310, wave driver shim 309, and into media device driver 505 where media 499 can be simultaneously output to media output device 570 via line 580, and output on wave-out line 540 to wave shim driver 309 on wave-out line 542. However, by virtue of CCM 300 controlling switch 311, wave-out line 544 which eventually leads to recording application 502 is blocked, thus effectively preventing unauthorized recording of media 499.

It is noted that by virtue of CCM 300 controlling both switches 311 and 312 and therefore controlling wave-out line 548 and wave-out line 568, any incoming media files, (e.g., 499), can be prevented from being recorded in an unauthorized manner in accordance with applicable copyright restrictions and/or licensing agreements related to the incoming media 499.

Still referring to FIG. 5B, it is further noted that custom media device 310 allows for unfettered playback of incoming media 499. Additionally, at any time during playback of media 499, custom media device 310 can be dynamically activated by CCM 300.

Figure 5C:
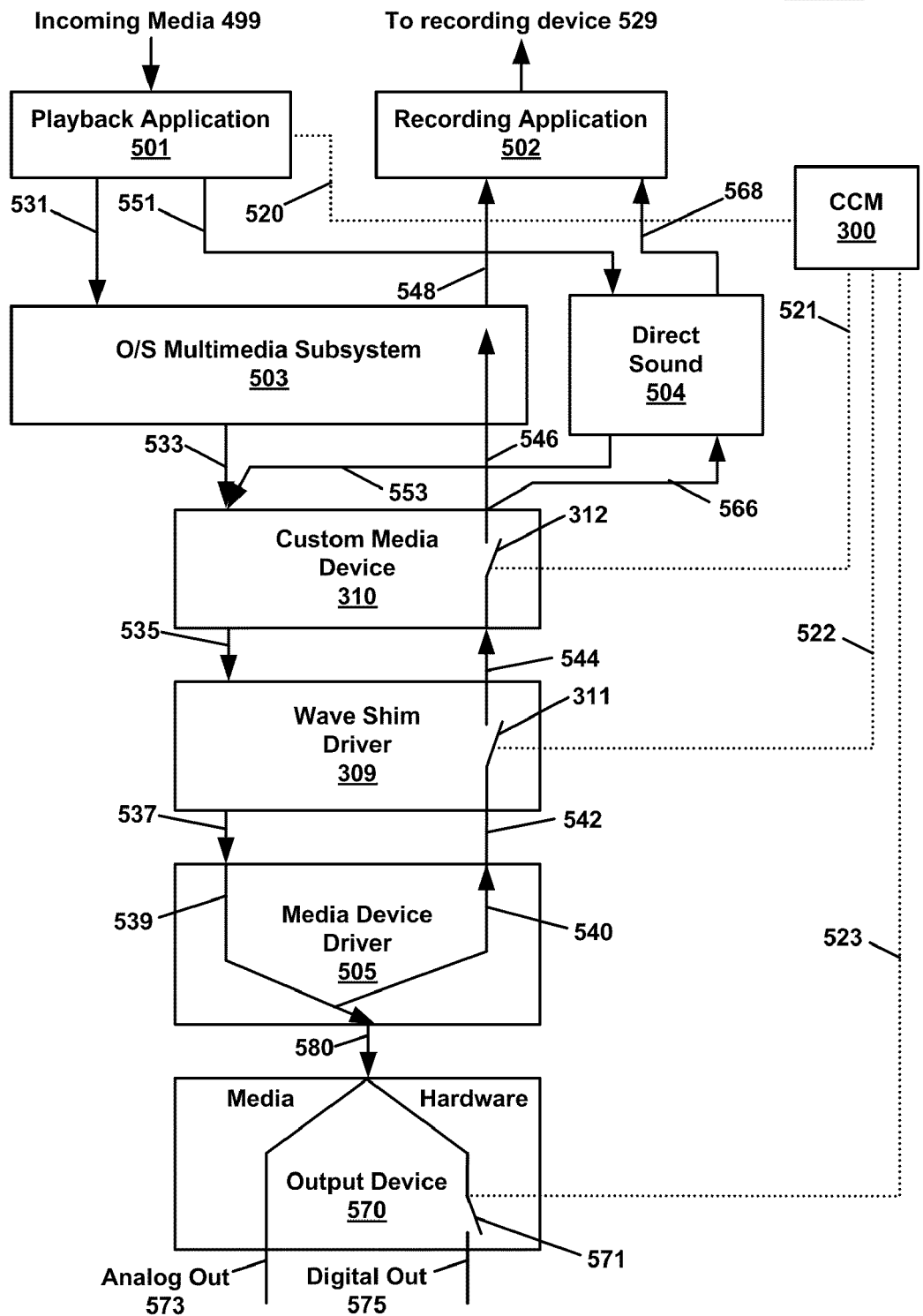
FIG. 5C is a data flow block diagram showing an implementation of a copyright compliance mechanism for preventing unauthorized output of media files, in accordance with one embodiment of the present invention.

FIG. 5C is an exemplary logic/bit path block diagram 500C of a client computer system, (e.g., 210), configured with a copyright compliance mechanism 300 for preventing unauthorized output and unauthorized recording of copyrighted media according to an embodiment of the present invention. Copyright compliance mechanism 300 is, in one embodiment, coupled with and operational on client system 210 in the manner described herein with reference to FIGS. 4, 5A, 5B, 5D, 6, and 7.

Diagram 500C of FIG. 5C is similar to diagram 500B of FIG. 5B, with a few changes. Particularly, media hardware output device 570 is shown to include a switch 571 controlled by CCM 300 via communication line 523, similar to switches 311 and 312, for controlling output of incoming media 499. Diagram 500C includes media hardware output device 570 that is coupled with a media device driver 505. In one embodiment, media hardware output device 570 can be a S/PDIF (Sony/Phillips Digital Interface) card for providing multiple outputs, (e.g., an analog output 573 and a digital output 575). An alternative media hardware output device providing similar digital output can also be implemented as device 570 including, but not limited to, a USB (universal serial bus) output device and/or an externally accessible USB port located on system 210, a FireWire (IEEE1394) output device and/or an externally accessible FireWire port located on system 210, with wireline or wireless communication functionality.

In one embodiment, CCM 300 is communicatively coupled with playback application 501 via coupling 520, waveform driver shim 309 via coupling 522, custom media device 310, via coupling 525, and media hardware output device 570 via coupling 523. CCM 300 is coupled to and controls selectable switch 311 in waveform driver shim 309 via coupling 522. CCM 300 is also coupled to and controls selectable switch 312 in custom audio device 310 via coupling 525. CCM 300 is further coupled to and controls selectable switch 571 in media hardware output device 570 via coupling 523. Depending upon the copyright restrictions and licensing agreements applicable to an incoming media file, (e.g., media 499), CCM 300 controls whether switches 311 and 312 are open (shown), thus preventing the incoming media 499 from reaching a recording application, or closed (not shown) so as to allow recording of the incoming media 499. Additionally, CCM 300 controls whether switch 571 is open (shown), thus preventing incoming media 499 from being output from digital output 575 of media hardware output device 570, or closed (not shown) to allow incoming media 499 to be output from media hardware output device 570.

By controlling media hardware output device 570, copyright compliance mechanism 300 can prevent unauthorized output of incoming media 499 to a digital recording device that may be coupled with digital output 575 of media hardware output device 570. Accordingly, in one embodiment, CCM 300 is enabled to also detect digital recording devices that may be coupled to a digital output line, (e.g., 575), of a media hardware output device, (e.g., 570). Examples of a digital recording device that can be coupled to media hardware output device 570 includes, but is not limited to, mini-disc recorders, MP3 recorders, personal digital recorders, digital recording devices coupled with multimedia systems, personal communication devices, set-top boxes, and/or nearly any digital device that can capture incoming media 499 being output from media hardware output device 570, (e.g., a sound card, video card, etc.).

Within FIG. 5C, direct sound 504 is shown coupled with custom media device 310 via wave-in line 553, instead of being coupled with media device driver 505 (FIG. 5A). In one embodiment, custom audio device 310 mandates explicit selection through system 210, meaning that custom audio device 310 needs to be selected as a default driver of system 210. By virtue of having the selection of custom media device 310 as the default driver of system 210, the data path necessary for direct sound 504 to capture the media content can be selectively closed.

For example, incoming media 499 originating from nearly any source with reference to FIG. 5A is received by media playback application 501 of system 210. Playback application 501 communicates to CCM 300, via coupling 520, to determine whether incoming media 499 is protected by any copyright restrictions and/or licensing agreements. Playback application 501 communicates with CCM 300 to control switch 311, 312, and 571 accordingly. In the present example, recording of incoming media 499 would violate applicable restrictions and/or agreements and therefore switch 312 is in an open position, such that the output path to recording application 502, (e.g., wave-out line 548 and/or wave-out line 568), is effectively blocked, thereby preventing unauthorized recording of media 499.

Alternatively, if media device driver 505 is selected as the default driver, incoming media 499 continues from O/S multimedia subsystem 503, through custom audio device 310, wave driver shim 309, and into media device driver 505 where media 499 can be simultaneously output to media output device 570 via line 580, and output on wave-out line 540 to wave shim driver 309 on wave-out line 542. However, by virtue of CCM 300 controlling switch 311, wave-out line 544 which eventually leads to recording application 502 is blocked, thus effectively preventing unauthorized recording of media 499.

It is noted that by virtue of CCM 300 controlling both switches 311 and 312 and therefore controlling wave-out line 548 and wave-out line 568, any incoming media files, (e.g., 499), can be prevented from being recording in an unauthorized manner in accordance with applicable copyright restrictions and/or licensing agreements related to the incoming media.

Still referring to FIG. 5C, it is noted that although CCM 300 can prevent unauthorized recording of incoming media 499 by controlling switches 311 and 312, thus preventing incoming media 499 from reaching recording application 502, controlling switches 311 and 312 do nothing to prevent incoming media 499 from being captured by a peripheral digital device, (e.g., a mini-disc recorder, etc.), coupled to digital output 575 of device 570. Thus, by also controlling digital output 575 of media hardware output device 570 via switch 571, CCM 300 can prevent unauthorized capturing of incoming media 499 from output 575, (e.g., on a sound card for audio files, a video card for video and/or graphical files), regardless of whether incoming media 499 is received in a secure and encrypted manner. However, when switch 571 is in a closed position, incoming media 499 may be played back in an unfettered manner. Additionally, at any time during playback of media 499, switch 312 of custom media device 310, switch 311 of media device driver 309, and/or switch 571 of media hardware output device 570 can be dynamically activated by CCM 300.

Figure 5D:
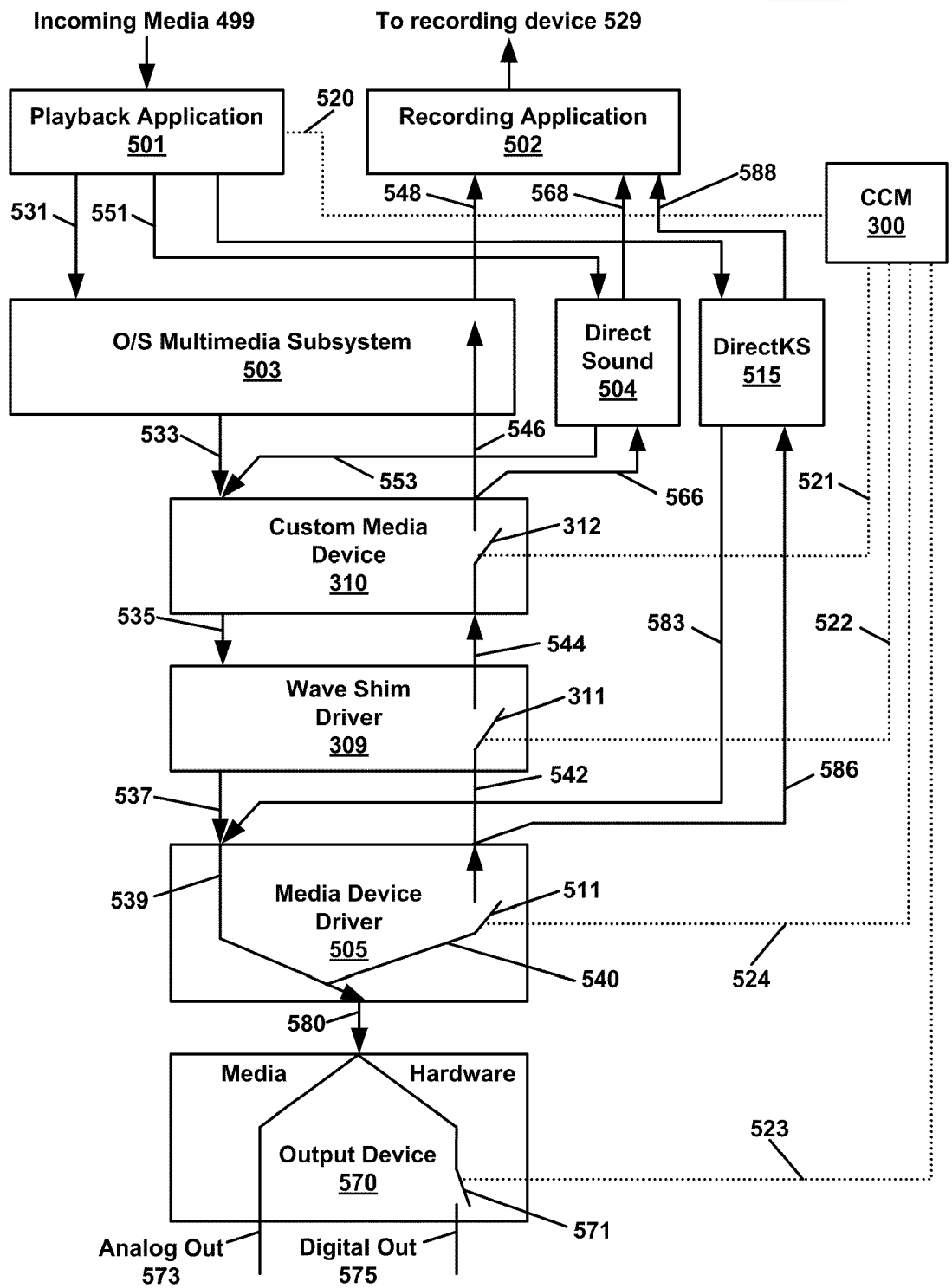
FIG. 5D is a data flow block diagram showing an implementation of a copyright compliance mechanism for preventing unauthorized output of media files through media file capture at a kernel level, in accordance with one embodiment of the present invention.

FIG. 5D is an exemplary logic/bit path block diagram 500D of a client computer system, (e.g., 210), configured with a copyright compliance mechanism 300 for preventing unauthorized kernel based output and unauthorized recording of copyrighted media according to an embodiment of the present invention. Copyright compliance mechanism 300 is, in one embodiment, coupled with and operational on client system 210 in the manner described herein with reference to FIGS. 4, 5A, 5B, 5C, 6, and 7.

Diagram 500D of FIG. 5D is similar to diagram 500C of FIG. 5C, with some changes. Particularly, diagram 500D includes a kernel streaming mechanism 515, (e.g., DirectKS), that is coupled with media device driver 505. In one embodiment, DirectKS 515 can be used for establishing a direct connection with media device driver 505. In the present embodiment, media device driver 505 is shown to include a switch 511 controlled by CCM 300 via communication line 524, that is similar to switches 311, 312, and 571, for controlling output of incoming media 499.

In one embodiment, CCM 300 is communicatively coupled with: playback application 501 via coupling 520, waveform driver shim 309 via coupling 522, custom media device 310 via coupling 525, and media device driver 505 via coupling 524. Specifically, CCM 300 is coupled to and controls selectable switch 311 of waveform driver shim 309 via coupling 522. CCM 300 is also coupled to and controls selectable switch 312 of custom audio device 310 via coupling 525. CCM 300 is further coupled to and controls selectable switch 511 of media device driver 505 via coupling 524. Depending upon the copyright restrictions and/or licensing agreements applicable to an incoming media file, (e.g., media 499), CCM 300 controls whether switches 311 and 312 are open (shown), thus preventing the incoming media 499 from reaching a recording application, or closed (not shown) so as to allow recording of the incoming media 499. Additionally, CCM 300 controls whether switch 511 is open (shown), thus preventing incoming media 499 from capturing incoming media 499 and redirecting it to recording application 502 to create an unauthorized copy or recording of incoming media 499. CCM 300 can also control whether switch 511 is closed (not shown) to allow DirectKS 515 to capture and redirect incoming media 499 to recording application 502.

DirectKS 515, in one embodiment, may represent a kernel streaming mechanism that is adapted to establish a direct connection with media device driver 505 of an operating system operable on client computer system 210, enabling kernel level access to media device driver 505. A kernel streaming mechanism can be implemented for the purpose of precluding utilization of standard audio APIs (application programming interfaces) to play or record media content, with particular attention paid to those playback applications with low latency requirements. DirectKS 515 can bypass existing APIs and communicate with media device driver 505. DirectKS 515 can be readily adapted to work in conjunction with a playback application, (e.g., 501), via coupling 581 to capture incoming media 499 and redirect it to driver 505 via coupling 583 and then to recording application 502 via wave-out line 588. Accordingly, DirectKS 515 can be implemented to create unauthorized media recordings.

By controlling media device driver 505, copyright compliance mechanism 300 can prevent unauthorized output of incoming media 499 to a digital recording device 529 that may be coupled with recording application 502. In one embodiment, media device driver 505 is configured through the kernel mixer (not shown) to control the data path. Additionally, in one embodiment CCM 300 is enabled to also detect a kernel streaming mechanism 515 (e.g., DirectKS) that may be operable on client computer system 210, as described herein with reference to FIG. 3.

In one embodiment, custom media device 310 mandates explicit selection through system 210, meaning that custom media device 310 needs to be selected as a default driver of system 210. By virtue of having the selection of custom media device 310 as the default driver of system 210, the data path necessary for direct sound 504 to capture the media content is selectively closed.

For example, incoming media 499 originating from nearly any source described herein with reference to FIG. 5A is received by media playback application 501 of system 210. Playback application 501 communicates to CCM 300, via coupling 520, to determine whether incoming media 499 is protected by any copyright restrictions and/or licensing agreements. Playback application 501 communicates with CCM 300 to control switches 311, 312, 571, and 511, accordingly. In the present example, recording of incoming media 499 would violate applicable restrictions and/or agreements and path to recording application 502, (e.g., wave-out line 548 and/or wave-out line 568 and/or wave-out line 588), is effectively blocked, thereby preventing unauthorized recording of media 499.

Still referring to FIG. 5D, it is particularly noted that although CCM 300 can prevent unauthorized recording of incoming media 499 by controlling switches 311, 312, and 571, thus preventing incoming media 499 from reaching recording application 502, controlling switches 311, 312, and 571, do nothing to prevent incoming media 499 from being returned to recording application 502 by a kernel streaming mechanism 515 (e.g., DirectKS), which enables capturing and redirecting of incoming media 499 to recording application 502, via wave-out line 588. Thus, by also controlling switch 511 of media device driver 505, CCM 300 can prevent kernel streaming mechanism 515 from returning incoming media 499 to recording application 502, thereby preventing incoming media 499 from being captured and redirected to recording application 502 in an attempt to create an unauthorized copy and/or recording of incoming media 499. However, when switch 511 is in a closed position, incoming media 499 may be returned to recording application 502, such that recording could be possible, provided recording does not violate copyright restrictions and/or licensing agreements applicable to incoming media 499. Additionally, at any time during playback of media 499, switch 312 of custom media device 310, switch 311 of wave shim driver 309, and/or switch 511 of media device driver 505 can be dynamically activated by CCM 300.

Figure 6:
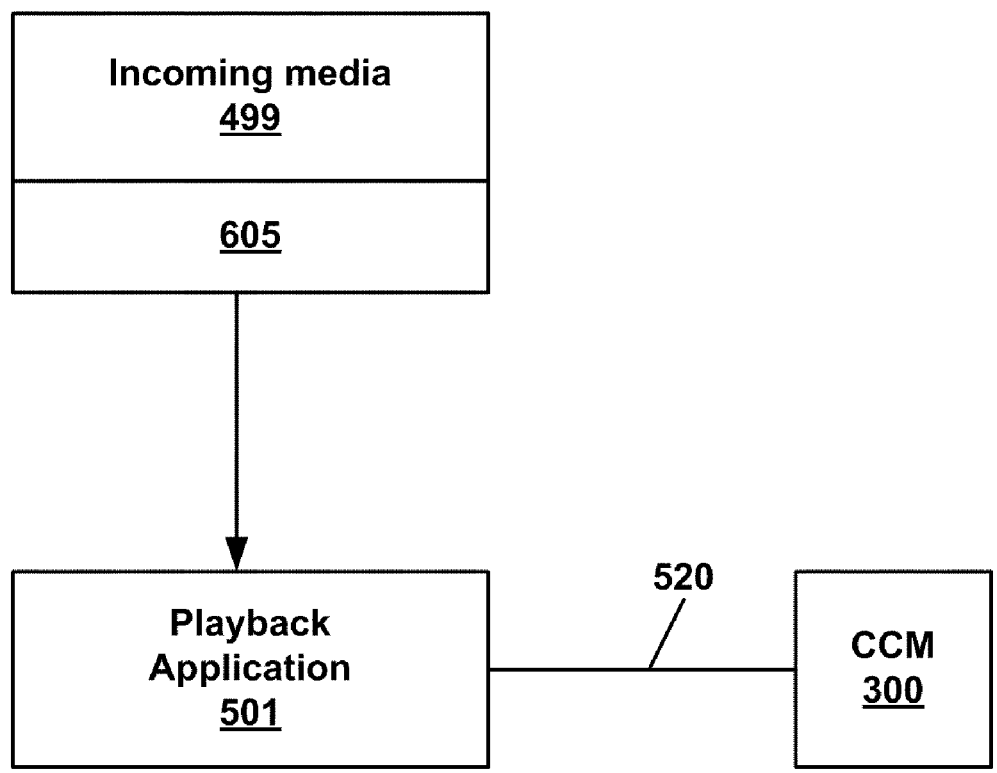
FIG. 6 is a block diagram of an environment for preventing unauthorized copying of a media file, in accordance with one embodiment of the present invention.

FIG. 6 is an block diagram of a media file, (e.g., 499), adapted to be received by a playback application, (e.g., 501 of FIGS. 5A-5D), configured with an indicator 605 for enabling incoming media 499 to comply with rules according to the SCMS (serial copy management system). When applicable to a media file, (e.g., 499), the SCMS allows for one copy of a copyrighted media file to be made, but not for copies of copies to be made. Thus, if incoming media 499 can be captured by a recording application, (e.g., 502 of FIGS. 5A-5D), and/or a recording device, (e.g. 529), and/or a peripheral recording device and/or a recording application coupled to a digital output of a media hardware output device, (e.g., digital output 575 of media hardware output device 570 of FIGS. 5B, 5C, and 5D), and/or a kernel streaming mechanism 515, (e.g., DirectKS 515 of FIG. 5D), unauthorized copying and/or recording may be accomplished.

Playback application 501 is coupled with CCM 300 via communication line 520 in a manner analogous to FIGS. 5A, 5B, 5C, and/or 5D. Although not shown in FIG. 6, it is noted that CCM 300 is also coupled to switches 311 and 511 as shown in FIG. 5A, switches 311 and 312 in FIG. 5B, switches 311, 312, and 571 in FIG. 5C, and switches 312, 311, 571, and 511, in FIG. 5D.

In one embodiment, an indicator 605 is attached to incoming media 499 for preventing unauthorized copying or recording in accordance with the SCMS. In one embodiment, indicator 605 can be a bit that may be transmitted prior to beginning the delivery of incoming media 499 to playback application 501. In another embodiment, indicator 605 may be placed at the beginning of the bit stream of incoming media 499. In yet another embodiment, indicator 605 may be placed within a frame period of incoming media 499, (e.g., every fifth frame), or any other desired frame period. In another embodiment, indicator 605 may be transmitted at a particular time interval or intervals during delivery of the media file, (e.g., 499). Thus, indicator 605 may be placed nearly anywhere within or attached to the bit stream related to incoming media 499.

Within FIG. 6, indicator 605 may be comprised of various indicators, (e.g., a level 0 indicator, a level 1 indicator, and a level 2 indicator), in one embodiment of the present invention. In the present embodiment, a level 0 indicator may be for indicating to CCM 300 that copying is permitted without restriction, (e.g., incoming media 499 is not copyrighted or the copyright is not asserted). In the present embodiment, a level 1 indicator may be for indicating to CCM 300 that one generation of copies of incoming media 499 may be made, such that incoming media 499 is an original copy and that one copy may be made. In the present embodiment, a level 2 indicator may be for indicating to CCM 300 that incoming media 499 is copyright protected and/or a copy thereof, and as such no digital copying is permitted.

For example, incoming media 499 is received by playback application 501. Application 501 detects an indicator 605 attached therewith, in this example, a level 2 bit placed in the bit stream indicates to CCM 300 that copying is not permitted. As such, when CCM 300 is configured in system 210 such as that shown in FIG. 5A, in response to a level 2 indicator bit, CCM 300, while controlling the media path, then activates switches 311 and 511 to prevent any recording of incoming media 499.

However, CCM 300 is configured in system 210 such as that shown in FIG. 5B, in response to a level 2 indicator bit, CCM 300 while controlling the media path, then activates switches 311 and 312 to prevent any recording of incoming media 499.

Alternatively, when CCM 300 is configured in system 210 such as that shown in FIG. 5C, in response to a Level 2 indicator bit, CCM 300, while controlling the media path then activates switches 311, 312, and 571 to prevent any recording of incoming media 499.

It is noted that CCM 300 can activate or deactivate switches coupled therewith, as described herein with reference to FIGS. 5A-5D, thereby funneling incoming media 499 through the secure media path, in this instance the audio path, to prevent unauthorized copying of incoming media 499. It is further noted that CCM 300 can detect media recording applications and devices as described herein, with reference to FIG. 3.

Figure 7A:
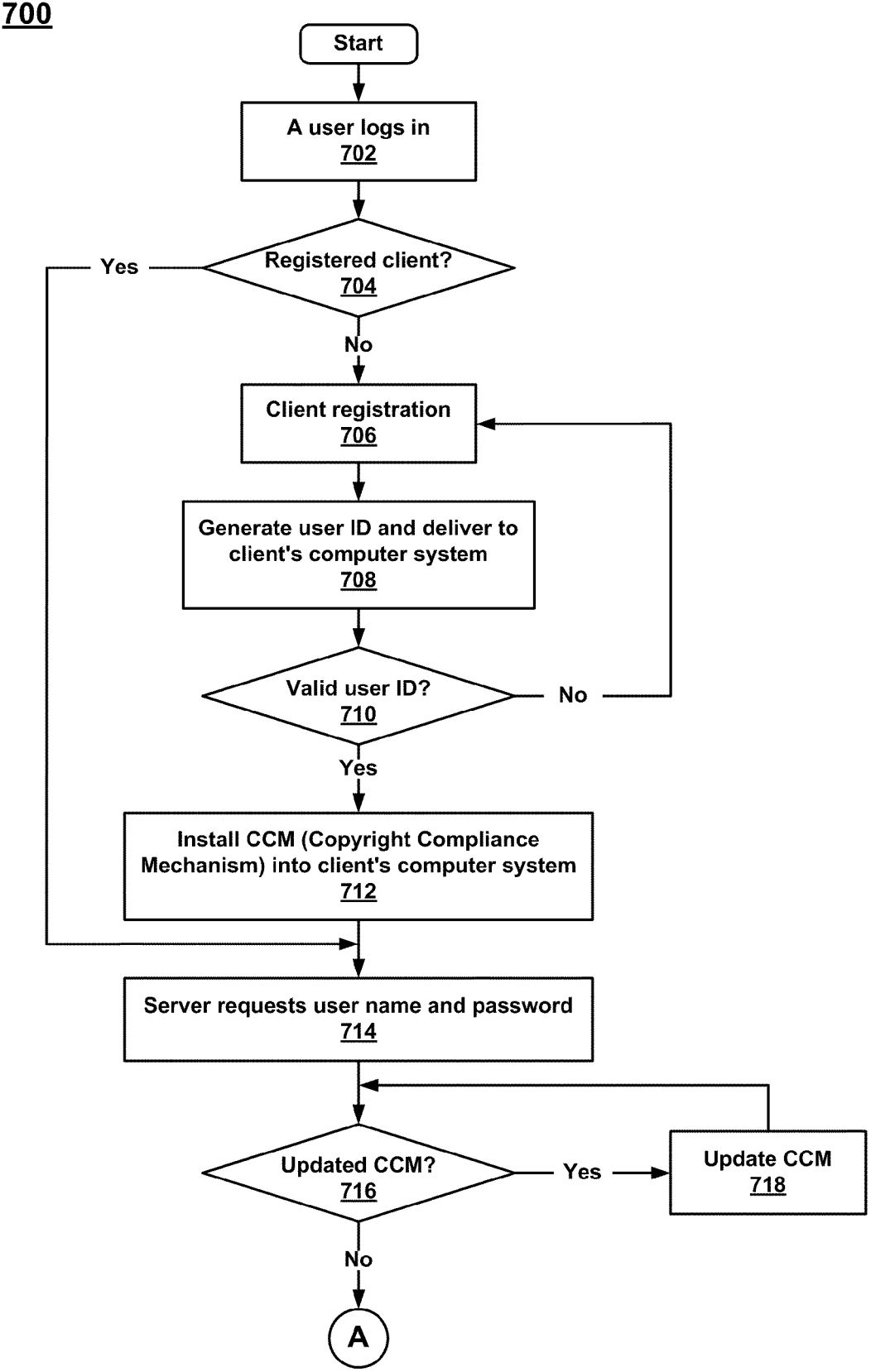
FIGS. 7A, 7B, and 7C are a flowchart of steps performed in accordance with an embodiment of the present invention for providing a copyright compliance mechanism to a network of client and server computer systems.
Figure 7B:
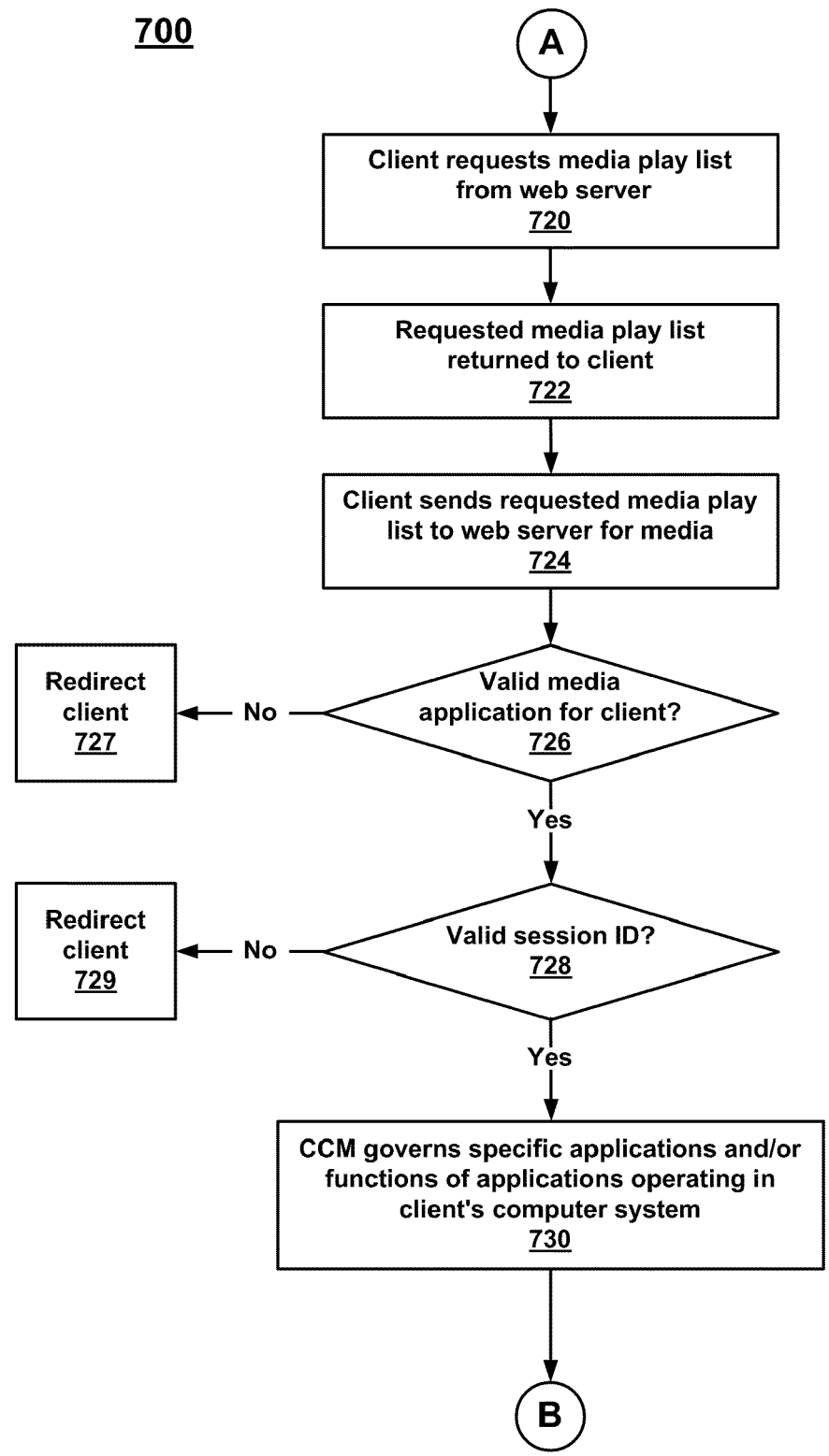
Figure 7C:
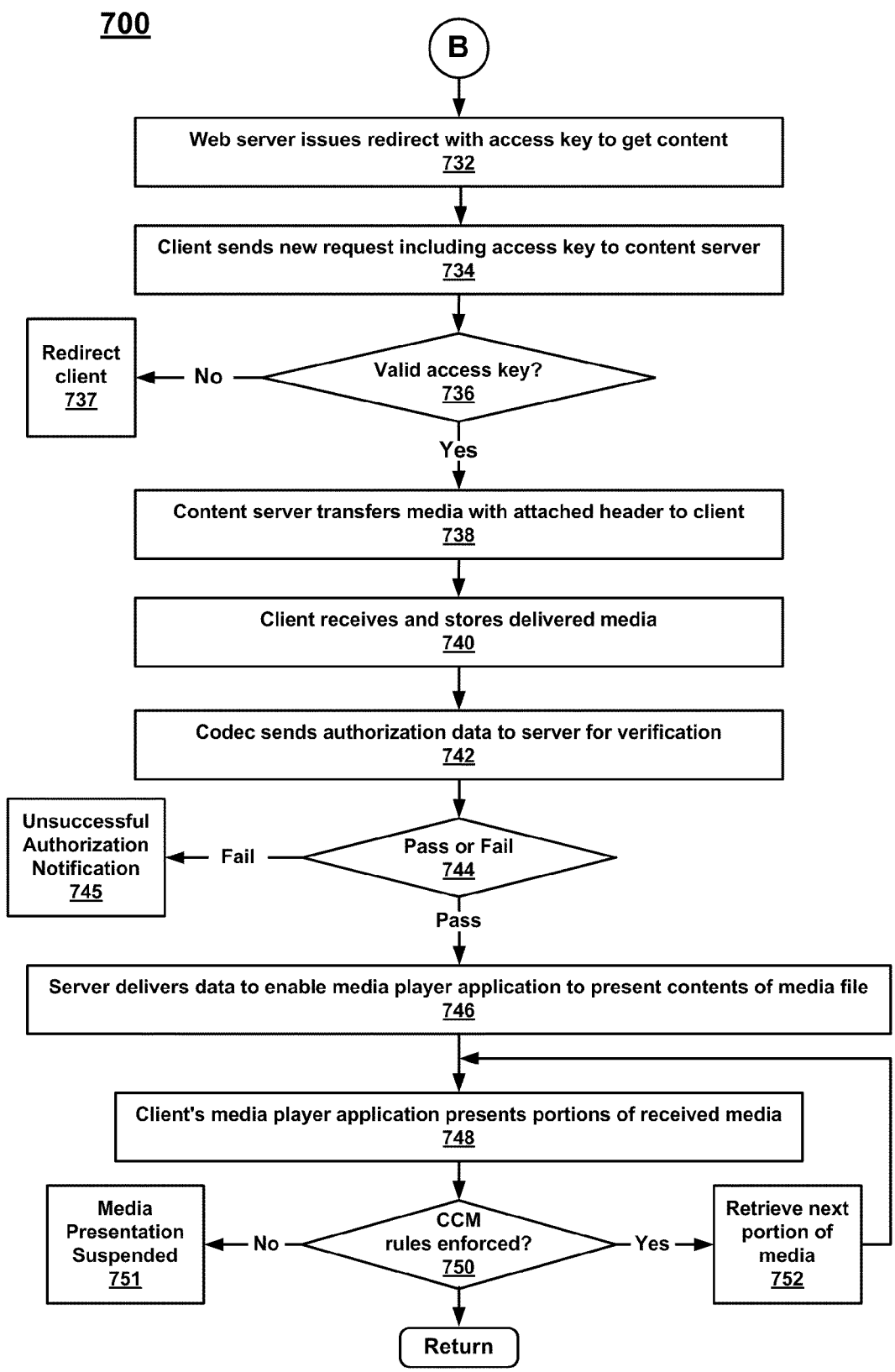

FIGS. 7A, 7B, and 7C are a flowchart 700 of steps performed in accordance with one embodiment of the present invention for controlling end user interaction of delivered electronic media. Flowchart 700 includes processes of the present invention which, in some embodiments, are carried out by processors and electrical components under the control of computer readable and computer executable instructions. The computer readable and computer executable instructions reside, for example, in data storage features such as computer usable volatile memory 102 and/or computer usable non-volatile memory 103 of FIG. 1. However, the computer readable and computer executable instructions may reside in any type of computer readable medium. Although specific steps are disclosed in flowchart 700, such steps are exemplary. That is, the present embodiment is well suited to performing various other steps or variations of the steps recited in FIGS. 7A, 7B, and 7C. Within the present embodiment, it should be appreciated that the steps of flowchart 700 may be performed by software, by hardware or by any combination of software and hardware.

The present embodiment provides a method for restricting recording of high fidelity media content delivered via one or more communication networks. The present embodiment delivers the high fidelity media content to registered clients while preventing unauthorized clients from directly receiving media content from a source database. Once the client computer system receives the media content, it can be stored in hidden directories and/or custom file systems that may be hidden to prevent subsequent unauthorized sharing with others. It is noted that various functionalities can be implemented to protect and monitor the delivered media content. For example, the physical address of the media content can be hidden from media content recipients. Alternatively, the directory address of the media content can be periodically changed. Additionally, an access key procedure and rate control restrictor can also be implemented to monitor and restrict suspicious media content requests. Furthermore, a copyright compliance mechanism, (e.g., CCM 300), can be installed in the client computer system 210 to provide client side compliance with licensing agreements and/or copyright restrictions applicable to the media content. By implementing these and other functionalities, the present embodiment restricts access to and the distribution of delivered media content and provides a means for copyrighted media owner compensation.

It is noted that flowchart 700 is described in conjunction with FIGS. 2, 3, 4, and 5A-5D, in order to more fully describe the operation of the present embodiment. In operation 702 of FIG. 7A, a user of a computer system, (e.g., 210), causes the computer to communicatively couple to a web server, (e.g., 250), via one or more communication networks, (e.g., Internet 201), and proceeds to attempt to log in. It is understood that the log in process of operation 702 can be accomplished in a variety of ways in accordance with embodiments of the present invention.

In operation 704 of FIG. 7A, web server 250 accesses a user database, (e.g., 450), to determine whether the user and the computer system 210 logging in are registered with it. If the user and computer system 210 are registered with web server 250, the present embodiment proceeds to operation 714. However, if the user and computer system 210 are not registered with web server 250, web server 250 can initiate a user and computer system 210 registration process at operation 706.

In operation 706, registration of the user and computer system 210 is initiated. The user and computer system registration process can involve the user of computer system 210 providing personal information including, but not limited to, their name, address, phone number, credit card number, online payment account number, biometric identification (e.g., fingerprint, retinal scan, etc.), and the like. Web server 250 can verify the accuracy of the information provided. Web server 250 can also acquire information regarding the user's computer system 210 including, but not limited to, identification of media players disposed and operable on system 210, a unique identifier corresponding to the computer system, etc. In one embodiment, the unique identifier corresponding to the computer system can be a MAC address. Additionally, web server 250 can further request that the user of computer system 210 select a username and password.

In operation 708 of FIG. 7A, subsequent to the completion of the registration process, web server 250 generates a unique user identification (ID) or user key associated with the user of client computer system 210. The unique user ID, or user key, is then stored by web server 250 in a manner that is associated with that registered user. Furthermore, one or more cookies containing that information specific to that user and the user's computer system 210, is installed in a non-volatile memory device, (e.g., 103 and/or data storage device 108 of computer system 210). It is noted that the user ID and cookie can be stored in a hidden directory within one or more non-volatile memory devices within computer system 210, thereby preventing user access and/or manipulation of that information. It is further noted that if the unique user ID, or user key, has been previously generated for the user and computer 210 that initially logged-in at operation 702, the present embodiment proceeds to operation 714

In operation 710, web server 250 verifies that the user ID and the cookie(s) are properly installed in computer system 210 and verifies the integrity of the cookie(s) and the user ID, thereby ensuring no unauthorized alterations to the user ID or the cookie(s) has occurred. If the user ID is not installed and/or not valid, web server 250 can re-initiate the registration process at operation 706. Alternatively, web server 250 can decouple computer system 210 from the network, thereby requiring a re-log in by the user of computer 210. If the cookie(s) and user ID are valid, the present embodiment proceeds to operation 712.

In operation 712 of FIG. 7A, web server 250 can install a version of a copyright compliance mechanism, (e.g., 300), onto one or more non-volatile memory devices of computer system 210. Installing CCM 300 into user's computer system 210 can facilitate client side compliance with licensing agreements and copyright restrictions applicable to specific delivered copyrighted media content. At operation 712, the components of CCM 300, such as instructions 301, coder/decoder (codec) 303, agent programs 304, system hooks 305, skins 306, and custom media device drivers 307 (e.g., custom media device 310 of FIGS. 5B-5D), are installed in computer system 210, such as that shown in FIGS. 5A-5D. In one embodiment, a hypertext transfer protocol file delivery system can be utilized to install CCM 300 into computer system 210. However, operation 712 is well suited to install CCM 300 on computer system 210 in a wide variety of ways in accordance with the present embodiment. For example, CCM 300 can be installed as an integrated component within a media player application, media recorder application, and/or media player/recorder applications. Alternatively, CCM 300 can be installed as a stand alone mechanism within client computer system 210. Additionally, CCM 300 can be installed as a stand alone mechanism and/or as part of a bundled application from a media storage device, (e.g., a CD, a DVD, an SD), and/or as part of an installation package. In another embodiment, CCM 300 can be installed in conjunction with a presentation of desired media content, (e.g., listening to an audio file on a music CD, reading a document, viewing a video, etc.). It is noted that, in one embodiment, CCM 300 may be installed on client system 210 in a clandestine manner, relative to a user.

In operation 714, web server 250 can request the previously established username and password of the user of client computer system 210. Accordingly, the user of client computer system 210 causes it to transmit to web server 250 the previously established username and password. Upon the receipt thereof, web server 250 may access a user database, (e.g., 450), to determine their validity. If the username and password are invalid, web server 250 refuses access wherein flowchart 700 may be discontinued (not shown). Alternatively, if the username and password are valid, the present embodiment proceeds to operation 716.

In operation 716 of FIG. 7A, web server 250 can access media file database 450 to determine if copyright compliance mechanism 300 has been updated to reflect changes made to the DMCA (Digital Millennium Copyright Act) and/or to the interactive/non-interactive licensing agreements recognized by the DMCA. It is noted that alternative licensing agreements can be incorporated into copyright compliance mechanism 300. Advantageously, by providing a copyright compliance mechanism that can be readily updated to reflect changes in copyright restrictions, licensing agreements, and/or changes to existing media player applications, and/or the development of new media player applications, copyright compliance mechanism 300 can provide compliance with current restrictions associated with the media content.

Continuing with operation 716, if web server 250 determines that CCM 300, or components thereof, of computer 210 has not been updated, web server 250 initiates installation of the newer components and/or the most current version of CCM 300 into computer system 210, shown as operation 718. If web server 250 determines that the current version of CCM 300 installed on system 210 does not have to be updated, the present embodiment proceeds to operation 720 of FIG. 7B.

In operation 720 of FIG. 7B, the user of client computer system 210 causes it to transmit to web server 250, (e.g., via Internet 201), a request for a play list of available media files. It is noted that the play list can contain all or part of the media content available from a content server, (e.g., 251).

In operation 722, in response to web server 250 receiving the play list request, web server 250 transmits to client computer system 210 a media content play list together with the unique user ID associated with the logged-in user. The user ID, or user key, can be attached to the media content play list in a manner invisible to the user. It is noted that the media content in content server 251 can be, but is not limited to, high fidelity music, audio, video, graphics, multimedia, alphanumeric data, and the like. The media content play list of operation 720 can be implemented in diverse ways. In one example, web server 250 can generate a media content play list by combining all the available media content into a single play list. Alternatively, all of the media content titles, or different lists of titles, can be loaded from content server 251 and passed to a CGI (common gateway interface) program operating on web server 250 where the media titles, or differing lists of titles, can be concatenated into a single dimensioned array that can be provided to client computer system 210. It is understood that the CGI can be written in nearly any software computing language.

In operation 724 of FIG. 7B, the user of client computer system 210 can utilize the received media content play list in conjunction with a media player application in order to cause client computer system 210 to transmit a request to web server 250 for delivery of desired media content, and wherein the user ID is automatically included therewith. The media content play list provided to client computer system 210 by web server 250 can enable the user to create one or more customized play lists by the user selecting desired media content titles. It is noted that a customized media play list can establish the media content that will eventually be delivered to client computer system 210 and the order in which the content will be delivered. Additionally, the user of client computer system 210 can create one or more customized play lists and store those play lists in system 210 and/or within web server 250. It is noted that a customized play list does not actually contain the desired media content titles, but rather the play list includes one or more identifiers associated with the desired media content that can include, but is not limited to, a song, an audio clip, a video clip, a picture, a multimedia clip, an alphanumeric document, or particular portions thereof. In another embodiment, the received media content play list can include a random media content delivery choice that the user of client computer system 210 can transmit to web server 250, with the user ID, to request delivery of the media content in a random manner.

In operation 726, upon receiving the request for media content from client computer system 210, web server 250 determines whether the requesting media application operating on client computer system 210 is a valid media application. One of the functions of a valid media application is to be a player of media content as opposed to an application that downloads media content in an unauthorized or unregulated manner. If web server 250 determines that the media application operating on system 210 is not a valid media application, the present embodiment proceeds to operation 727 which in one embodiment, redirects client computer 210 to a web site where the user of system 210 can download a valid media player application or to a software application which can identify client computer system 210, log system 210 out of web server 250 and/or prevent future logging-in for a defined period of time, (e.g., 15 minutes, an hour, a day, a week, a month, a year, or any specified amount of time). If web server 250 determines that the media application operating on system 210 is a valid media application, the present embodiment proceeds to operation 728.

In operation 728 of FIG. 7B, the present embodiment causes web server 250 to determine whether the user ID (or user key) that accompanied the media delivery request sent by client computer system 210 is valid. If web server 250 determines that the user ID is invalid, the present embodiment proceeds to operation 729 where client computer system 210 can be logged off web server 250 or client computer system 210 can be returned to operation 706 (of FIG. 7A) to re-register and to have another unique user ID generated by web server 250. It is noted that the order in which operation 726 and 728 are performed can be altered such that operation 728 can be performed prior to operation 726. If web server 250 determines that the user ID is valid, the present embodiment proceeds to operation 730.

In operation 730, prior to web server 250 authorizing the delivery of the redirect and access key for the requested media file content, shown as operation 732, CCM 300 governs certain media player applications and/or functions thereof that are operable on client computer system 210. These governed functions can include, but is not limited to, pause, stop, progress bar, save, etc. It is noted that, in one embodiment, CCM 300 can utilize system hooks 305 to accomplish the functionality of operation 730.

In operation 732 of FIG. 7C, the present embodiment causes web server 250 to transmit to client computer system 210 a redirection command along with a time sensitive access key (e.g., for that hour, day or for any defined period of time) thereby enabling client computer 210 to receive the requested media content. The redirection command can include a time sensitive address of the media content location within content server 251. The address is time sensitive because, in one embodiment, the content server 251 periodically renames some or all of the media address directories, thereby making previous content source addresses obsolete. Alternatively, the address of the media content is changed. In another embodiment, the location of the media content can be changed along with the addresses. Regardless, unauthorized users and/or applications are restricted from directly retrieving and/or copying the media content from content server 251. Therefore, if someone with inappropriate or unlawful intentions is able to find where the media content is stored, subsequent attempts will fail, as the previous route no longer exists, thereby preventing future unauthorized access.

It is noted that in one embodiment of the present invention, the addresses (or routes) of content server 251 that are actively coupled to one or more client computer systems (e.g., 210-230) are maintained while future addresses, or routes, are being created for new client devices. It is further noted that as client computer systems are uncoupled from the media content source of content server 251, that directory address, or link, can be immediately changed, thereby preventing unauthorized client system or application access.

In another embodiment, the redirection of client computer system 210 to content server 251 can be implemented by utilizing a server network where multiple servers are content providers (e.g., 251), or by routing a requesting client computer system (e.g., 210, 220, or 230) through multiple servers. In yet another embodiment, the delivery of media content from a central content provider (e.g., 251) can be routed through one or more intermediate servers before being received by the requesting client computer system, (e.g., 210).

The functionality of operation 732 is additionally well suited to provide recordation of the Internet Protocol (IP) addresses of the client computer systems, (e.g., 210), the media content requested and its transfer size, thereby enabling accurate monitoring of royalty payments, clock usage and transfers, and media content popularity.

In operation 734 of FIG. 7C, upon receiving the redirection command, the present embodiment causes the media playback application 501 (FIGS. 5A-5D) operating on client computer system 210 to automatically transmit to content server 251a new media delivery request which can include the time sensitive access key and the address of the desired media content.

In operation 736 of FIG. 7C, content server 251 determines whether the time sensitive access key associated with the new media delivery request is valid. If content server 251 determines that the time sensitive access key is valid, the present embodiment proceeds to operation 738 of FIG. 7C. However, if content server 251 determines that the time access key is not valid, the present embodiment proceeds to operation 737, a client redirect.

In operation 737, content server redirects client computer 210 to operation 732 where a new access key is generated. Alternatively, operation 737 causes the present embodiment to return to operation 704 of FIG. 7A. In yet another embodiment, operation 737 can cause client computer system 210 to be disconnected from content server 251.

In operation 738 of FIG. 7C, content server 251 transmits the requested high fidelity media content to client computer system 210. It is noted that each media content file delivered to client computer system 210 can have a header attached thereto, prior to delivery, as described herein with reference to FIG. 4. It is further noted that both the media content and the header attached thereto can be encrypted. In one embodiment, the media content and the header can be encrypted differently. Alternatively, each media content file can be encrypted differently. In another embodiment, groups of media files are analogously encrypted. It is noted that public domain encryption mechanisms, (e.g., Blowfish), and/or non-public domain encryption mechanisms can be utilized.

Still referring to operation 738, content server 251 can transmit the requested media content in a burst load (in comparison to a fixed data rate), thereby transferring the content to client computer system 210 as fast as the network transfer rate allows. Further, content server 251 can have its download rate adapted to be equal to the transfer rate of the network to which it is coupled. In another embodiment, the content server 251 download rate can be adapted to equal the network transfer rate of the client computer system 210 to which the media content is being delivered. For example, if client computer system 210 is coupled to Internet 201 via a T1 connection, then content server 251 transfers the media content at transmission speeds allowed by the T1 connection line. As such, once the requested media content is transmitted to client computer system 210, content server 251 is then able to transmit requested media content to another client computer system, (e.g., 220 or 230). Advantageously, this provides an efficient means to transmit media content, in terms of statistical distribution over time and does not overload the communication network(s).

It is noted that delivery of the requested media content by content server 251 to client computer system 210 can be implemented in a variety of ways. For example, an HTTP (hypertext transfer protocol) file transfer protocol can be utilized to transfer the requested media content as well as copyright compliance mechanism 300 to client 210. In this manner, the copyright compliance mechanism as well as each media content file/title can be delivered in its entirety. In another embodiment, content server 251 can transmit to client computer system 250 a large buffer of media content, (e.g., audio clips, video clips, and the like).

In operation 740 of FIG. 7C, upon receiving the requested high fidelity media content from content server 251, the present embodiment causes client computer system 210 to store the delivered media content in a manner that is ready for presentation, (e.g., playback). The media content is stored in client computer system 210 in a manner that restricts unauthorized redistribution. For example, the present embodiment can cause the high fidelity media content to be stored in a volatile memory device (e.g., 102), utilizing one or more hidden directories and/or custom file systems that may be hidden, where it may be cached for a limited period of time. Alternatively, the present embodiment can cause the high fidelity media content to be stored in a non-volatile memory device, (e.g., 103) or data storage device (e.g., 108). It is noted that the manner in which each of the delivered media content file(s) is stored, volatile or non-volatile, can be dependent upon the licensing restrictions and/or copyright agreements applicable to each media content file. It is further noted that in one embodiment, when a user of client computer system 210 turns the computer off or causes client computer system 210 to disconnect from the network, the media content stored in a volatile memory device is typically deleted therefrom.

Still referring to operation 740, in another embodiment, the present embodiment can cause client computer system 210 to store the received media content in a non-volatile manner within a media application operating therein, or within one of its Internet browser applications (e.g., Netscape Communicator™, Microsoft Internet Explorer™, Opera™, Mozilla™, and the like) so that delivered media content can be used in a repetitive manner. Further, the received media content can be stored in a manner making it difficult for a user to redistribute in an unauthorized manner, while allowing the user utilization of the received media content, (e.g., by utilizing one or more hidden directories and/or custom file systems that may also be hidden). It is noted that by storing media content with client computer system 210 (when allowed by applicable licensing agreements and/or copyright restrictions), content server 251 does not need to redeliver the same media content to client computer 210 each time its user desires to experience (e.g., listen to, watch, view, etc.) the media content file.

In operation 742 of FIG. 7C, the received media content file is then fed into a media player application (e.g., 501 of FIGS. 5A-5D), which then runs it through a codec, (e.g., 303 of CCM 300), in one embodiment. In response, coder/decoder 303 sends an authorization request to the content server, (e.g., 251), with attached authorization data, as described herein. In response to receiving codec's 303 authorization request, server 251 compares the received authorization data with that stored in server 251, and subsequently, the present embodiment proceeds to operation 744.

In operation 744, the content server 251 responds with a pass or fail authorization. If server 251 responds with a fail, such that the received authorization data is invalid, the present embodiment can proceed to operation 745, where server 251 can, in one embodiment, notify the user of client system 210, (e.g., by utilization of skin 306), that there was an unsuccessful authorization of the requested media content file. It is noted that alternative messages having similar meanings may also be presented to the user of client computer system 210, thereby informing the user that the delivery failed. However, if the authorization data passes, the present embodiment proceeds to operation 746.

In operation 746, content server 251 transmits certain data back to the media player application enabling the media player application to present the contents of the media file via media playback application 501 of FIGS. 5A-5D. In one embodiment, a decryption key can be included in the transmitted data to decrypt the delivered media content file. In another embodiment, an encryption/decryption key can be included in the transmitted data to allow access to the contents of the media file.

In operation 748 of FIG. 7C, subsequent to media file decryption, the media file may be passed through CCM 300, (e.g., a codec 303), to a media player application operating on client computer system 210, (e.g., playback application 501 of FIGS. 5A-5D), which can then access and utilize the delivered high fidelity media content, enabling its user(s) to experience the media content, (e.g., listen to it, watch it, view it, or the like). In one embodiment of the present invention, a specialized or custom media player may be involved in order to experience the media content, (e.g., skin 306 of FIG. 3). Skin 306 may be implemented when CCM 300 cannot modify an industry standard media player application to comply with copyright restrictions and/or licensing agreements in accordance with the DMCA. Alternatively, a specialized or custom media player may not be needed to experience the media content. Instead, an industry standard media player can be utilized by client computer system 210 to experience the media content. Typically, many media player applications are available and can include, but are not limited to, Windows™ Media Player™ for PCs (personal computers), iTunes™ Player or QuickTime™ for Apple computers, and XMMS player for computers utilizing a Linux operating system. Regardless of the media player application utilized, while the media file is passed to the media player application, (e.g., in a frame by frame basis or in a buffer by buffer basis), coder/decoder 303 will repeatedly ensure that CCM 300 rules are being enforced at any particular moment during media playback, shown as operation 750.

In operation 750, as the media file content is delivered to the media player application, (e.g., 501 of FIGS. 5A-5D), periodically, (e.g., after a specified number of frames, after a defined period of time, or any desired time or data period), coder/decoder 303 repeatedly determines whether or not all the rules are enforced, in accordance with rules as defined by CCM 300. If the rules are not enforced, (e.g., change due to a user opening up a recording application (e.g., Total Recorder or alternative application)) the present method proceeds to operation 751. If the rules, in accordance with CCM 300, are enforced, the present embodiment then proceeds to operation 752.

In operation 751 of FIG. 7C, if the rules according to CCM 300 are not enforced, the presentation of the media content is, in one embodiment, suspended or halted. In one embodiment, CCM 300 of FIG. 5A can selectively control switches 311 and 511 to prevent output of incoming media 499 to a recording application 502 via wave shim driver 309 and direct sound 504 respectively, thus preventing unauthorized recording of incoming media 499. In another embodiment, CCM 300 of FIG. 5B can selectively control switches 311 and 312 to prevent output of incoming media 499 to recording application 502 via wave shim driver 309 and custom media device 310, thus preventing unauthorized recording of incoming media 499. In yet another embodiment, CCM 300 of FIG. 5C can selectively control switches 311, 312, to not only prevent incoming media 499 from being recorded in an unauthorized manner but can also selectively control switch 571 to prevent unauthorized output of incoming media 499 via digital output 575 of media hardware output device 570. In yet another embodiment, CCM 300 of FIG. 5D can selectively control switches 311, 312, 571, and 511 to a prevent kernel streaming mechanism 515, (e.g., DirectKS) which can establish a connection with media device driver 505 of FIG. 5D, from capturing incoming media content and returning it to a recording application (e.g., 502) to create an unauthorized recording of the media content. In one embodiment, incoming media 499 may not be output from digital output 575. In another embodiment, incoming media 499 may be output via digital output 575 but in an inaudible manner, (e.g., silence). In yet another embodiment, incoming media 499 can be audible but recording functionality can be disabled, such that the media content cannot be recorded.

In operation 752, if the rules are enforced in accordance with CCM 300, codec 303 retrieves a subsequent portion of the media content that is stored locally in client computer system 210. The present embodiment proceeds to operation 748 where the newly retrieved portion of the media file is then presented by the client's media player application. In this manner, the playback of the media content is constantly monitored by the present embodiment. Advantageously, by constantly monitoring playback of media files, CCM 300 can detect undesired activities and enforce those rules defined by CCM 300. It is noted that process 700 can be exited (not shown) once the media file contents are presented in their entirety.

Figure 8:
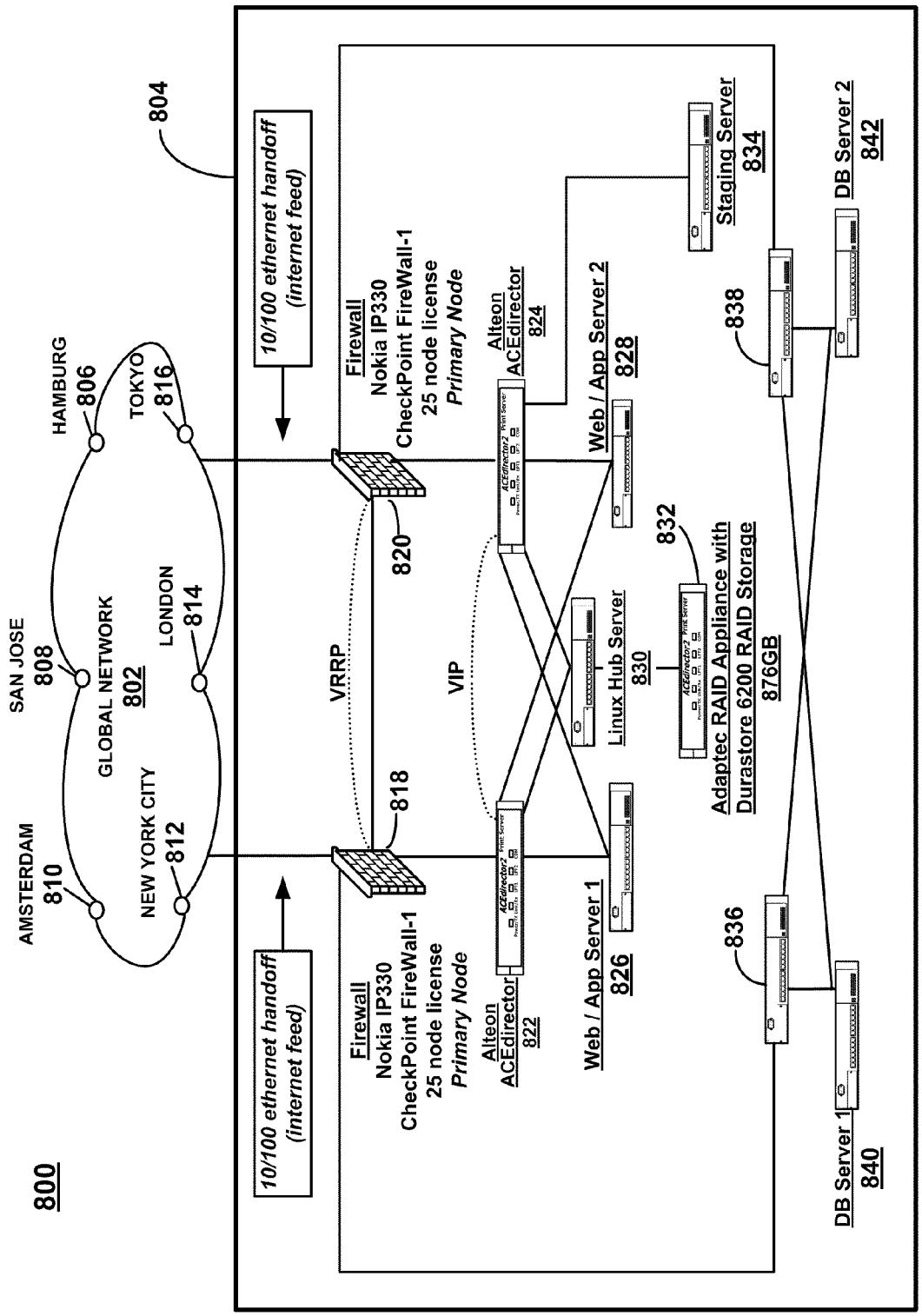
FIG. 8 is a diagram of an exemplary global media delivery system in which a copyright compliance mechanism can be implemented in accordance with an embodiment of the present invention.

FIG. 8 is a diagram of an exemplary high-speed global media content delivery system 800, in accordance with an embodiment of the present invention. In one embodiment, system 800 can be utilized to globally deliver media content, (e.g., audio media, video media, graphic media, multimedia, alphanumeric media, etc.), to one or more client computer systems, (e.g., 210, 220, and/or 230), in conjunction with a manner of delivery similar to that described herein. In one embodiment, system 800 includes a global delivery network 802 that can include multiple content servers, (e.g., 804, 806, 808, 810, 812, 814, and 816), that can be located throughout the world and which may be referred to as points of presence or media delivery point(s). Each content server 804-816 can store a portion, a substantial portion, or the entire contents of a media content library that can be delivered to client computer systems via one or more networks, (e.g., LAN Internet 201, or a wide area network (WAN)). Accordingly, each content server 804-816 can provide media content to client computer systems in its respective vicinity of the world. Alternatively, each content server can provide media content to a substantial number of client computer systems.

For example, a media delivery point (MDP) 816, located in Tokyo, Japan, is able to provide and deliver media content from the media content library stored in its content database, (e.g., 451), to client computer systems within the Asiatic regions of the world while a media delivery point 812, located in New York City, N.Y., USA, is able to provide and deliver media content from its stored media content library to client devices within the Eastern United States and Canada. It is noted that each city name, (e.g., London, Tokyo, Hamburg, San Jose, Dallas, Amsterdam, or New York City), associated with one of the media delivery points 804-816 represents the location of that particular media delivery point or point of presence. However, it is further noted that these city names are exemplary because media delivery points 804-816 can be located anywhere within the world, and as such are not limited to the cities shown in global network 802.

Still referring to FIG. 8, it is further noted that global system 802 is described in conjunction with FIGS. 2, 3, 4, 5A-D, and 6, in order to more fully describe the operation of the present embodiment. Particularly, subsequent to a client computer system, (e.g., 210 of FIG. 2), interacting with a web server, (e.g., 250 of FIG. 2), as described herein, web server 250, in one embodiment, can redirect client computer system 210 to receive the desired media content from an MDP (e.g., 804-816) based on one or more differing criteria.

For example, computer system 210 may be located in Brattleboro, Vt., and its user causes it to log-in with a web server 250 which can be located anywhere in the world. It is noted that operations 702-730 of FIGS. 7A and 7B can then be performed as described herein such that the present embodiment proceeds to operation 732 of FIG. 7C. At operation 732, the present embodiment can determine which media delivery points, (e.g., 804, 806, 808, 810, 812, 814, or 816), can subsequently provide and deliver the desired media content to client computer system 210.

Still referring to FIG. 8, one or more differing criteria can be utilized to determine which media delivery point (e.g., 804-816) to select for delivery of the desired media content. For example, the present embodiment can base its determination upon which media delivery point is in nearest proximity to client computer system 210, (e.g., media delivery point 812). This can be performed by utilizing the stored registration information, (e.g., address), provided by the user of client computer system 210. Alternatively, the present embodiment can base its determination upon which media delivery point provides media content to the part of the world in which client computer system is located. However, if each media of the delivery points (e.g., 804-816) stores differing media content, the present embodiment can determine which one can actually provide the desired media content. It is noted that these are exemplary determination criteria and the embodiments of the present invention are not limited to such implementation.

Subsequent to determination of which media delivery point is to provide the media content to client computer system 210 at operation 732, web server 250 transmits to client computer system 210 a redirection command to a media delivery point/content server, (e.g., 812), along with a time sensitive access key, also referred to as a session key, (e.g., for that hour, day, or any defined time frame) thereby enabling client computer system 210 to eventually receive the requested media content. Within system 800, the redirection command can include a time sensitive address of the media content location within media delivery point 812. Accordingly, the New York City media delivery point 812 can subsequently provide and deliver the desired media content to client computer system 210. It is noted that operations 732-742 of FIG. 7C can be performed by media delivery point 812 in a manner similar to content server 251 described herein.

Advantageously, by utilizing multiple content servers, (e.g., media delivery point 804-816), to provide high fidelity media content to client computer systems, (e.g., 210-230), located throughout the world, communication network systems of the Internet 201 do not become overly congested. Additionally, global network 802 can deliver media content to a larger number of client computer systems (e.g., 210-230) in a more efficient manner. Furthermore, by utilizing communication technology having data transfer rates of up to 320 Kbps (kilobits per second) or higher, embodiments of the present invention provide for rapid delivery of the media content in a worldwide implementation.

Referring still to FIG. 8, it is noted that media delivery points/content servers 804-816 of global network 802 can be coupled in a wide variety of ways in accordance with the present embodiment. For example, media delivery point 804-816 can be coupled utilizing wired and/or wireless communication technologies. Further, it is noted that media delivery points 804-816 can be functionally coupled such that if one of them fails, another media delivery point can take over and fulfill its functionality. Additionally, one or more web servers similar to web server 250 can be coupled to global network 802 utilizing wired and/or wireless communication technologies.

Within system 800, content server/media delivery point 804 includes a web infrastructure that, in one embodiment, is a fully redundant system architecture. It is noted that each of the MDP/content servers 806-816 of global network 802 can be implemented to include a web infrastructure in a manner similar to the implementation shown in MDP 804.

Specifically, the web infrastructure of media delivery point 804 includes firewalls 818 and 820 which are each coupled to global network 802. Firewalls 818 and 820 can be coupled to global network 802 in diverse ways, (e.g., utilizing wired and/or wireless communication technologies). Particularly, firewalls 818 and 820 can each be coupled to global network 702 via a 10/100 Ethernet handoff. However, system 800 is not limited in any fashion to this specific implementation. It is noted that firewalls 818 and 820 are implemented to prevent malicious users from accessing any part of the web infrastructure of media delivery point 804 in an unauthorized manner. Additionally, firewall 818 can include a device 836, (e.g., a router or other switching mechanism), coupled therewith and a DB (database) server 840 coupled to device 836 while firewall 820 includes a device 838, (e.g., a router or other switching mechanism), coupled therewith and a DB (database) server 842 coupled to device 838. Furthermore, DB server 840 is coupled with device 838 and DB server 842 is coupled with device 836.

Still referring to FIG. 8, and within media delivery point 804, firewall 818 is coupled to a director device 822 which is coupled to internal web application server 826 and 828, and a hub server 830. Firewall 820 is coupled to a director 824 which is coupled to internal web application servers 826 and 828, and hub server 830. Hub server 830 can be implemented in a variety of ways including, but not limited to, as a Linux hub server. Hub server 830 is coupled to a data storage device 832 capable of storing media content. Data storage device 832 can be implemented in a variety of ways, (e.g., as a RAID (redundant array of inexpensive/independent disks)) appliance.

It is noted that media delivery points 804-816 can be implemented in any manner similar to content server 250 described herein. Additionally, media delivery points 804-816 of the present embodiment can each be implemented as one or more physical computing devices, (e.g., computer system 100 of FIG. 1).

Figure 10:
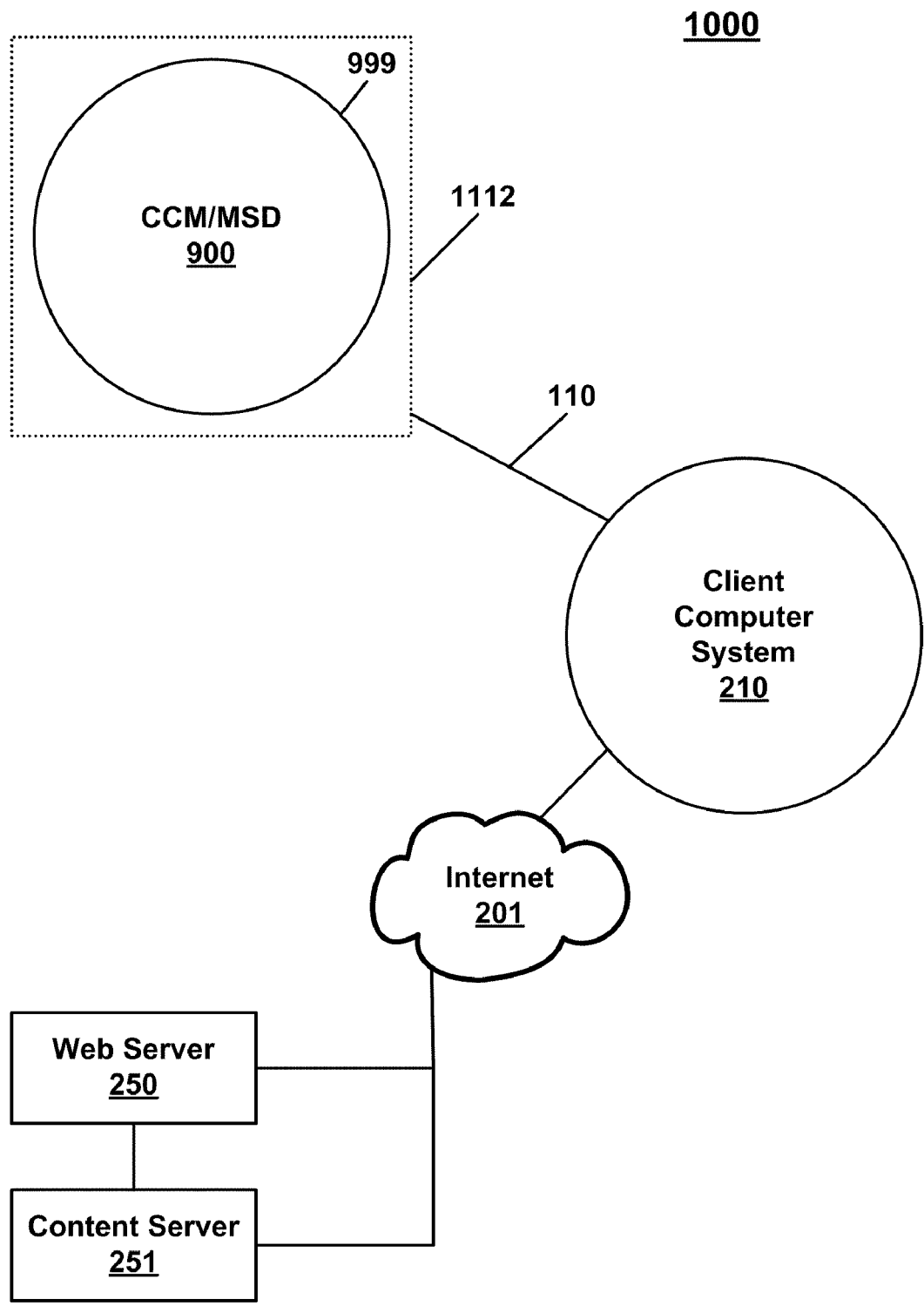
FIG. 10 is a block diagram of a communicative environment for dynamic updating of a copyright compliance mechanism installed from a media storage device onto a client computer system, in accordance with one embodiment of the present invention.
Figure 11:
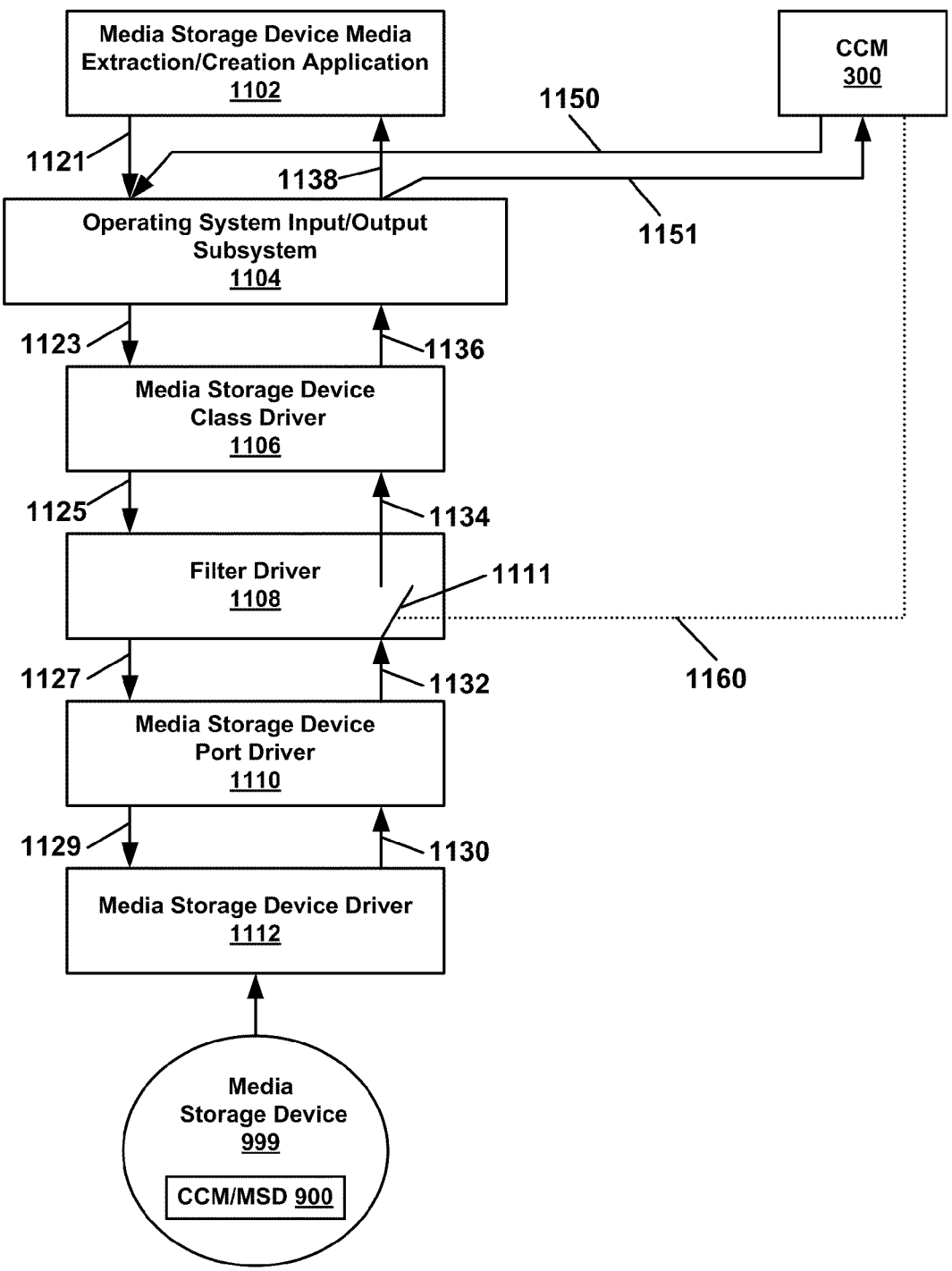
FIG. 11 is a data flow block diagram showing an implementation of a copyright compliance mechanism for preventing unauthorized reproduction of a protected media file located on a media storage device, in accordance with one embodiment of the present invention.

In another embodiment, CCM 300 can be adapted to be disposed on a media storage device, (e.g., 999 of FIGS. 10 and 11). Media storage device 999 can be, but is not limited to, a CD, a DVD, or other optical or magnetic storage device. By virtue of disposing a version of CCM 300 on a media storage device 999, embodiments of the present invention can provide copy protection for audio, video, multimedia, graphics, information, data, software programs, and other forms of media that may contain copyrighted material and which may be disposed on a media storage device. Alternatively, CCM 300 can be adapted to be installed on a computer system, (e.g., 210), via a media storage device 999 upon which it may be disposed.

Figure 9:
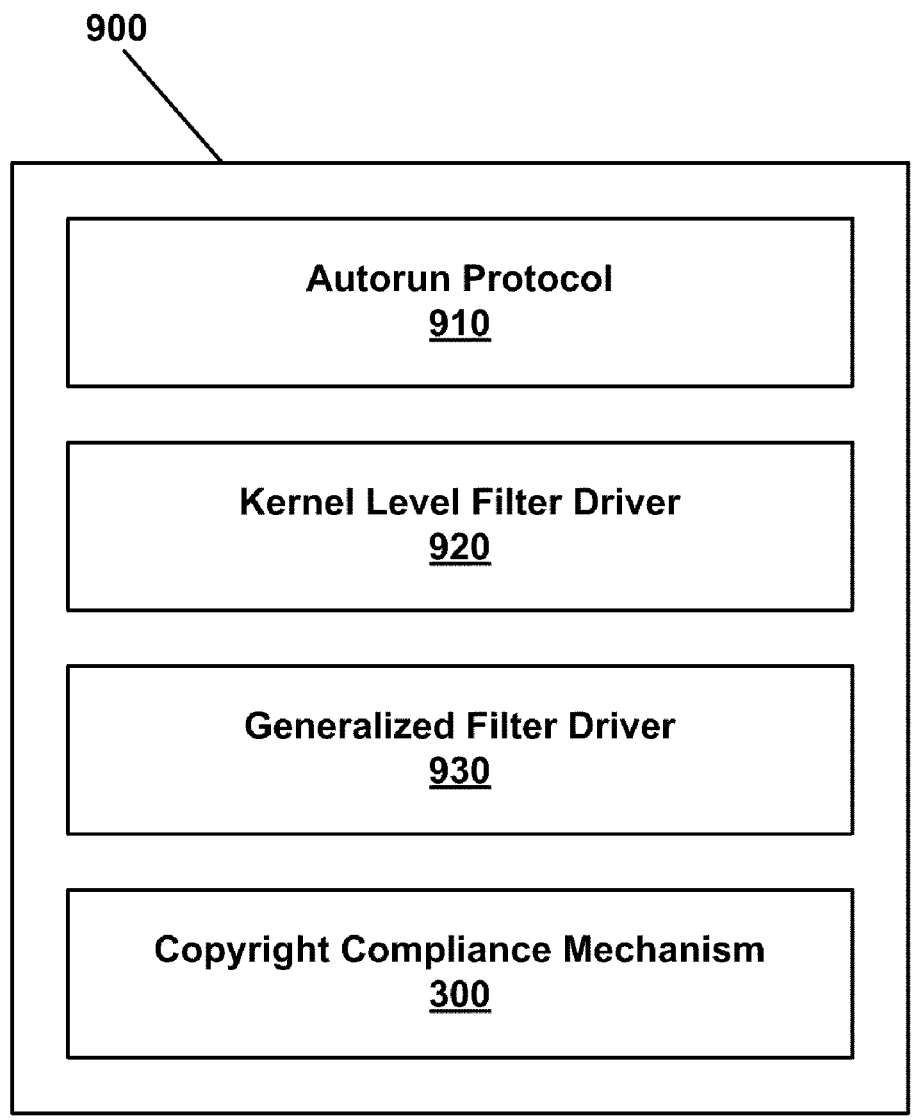
FIG. 9 is a block diagram of components of a copyright compliance mechanism installable from a media storage device upon which protected media files are disposed, in accordance with one embodiment of the present invention.

FIG. 9 is a block diagram of a copyright compliance mechanism/media storage device (CCM/MSD) 900, a version of CCM 300 adapted to be disposed on a media storage device, (e.g., 999 of FIGS. 10 and 11) in accordance with an embodiment of the present invention. It is noted that CCM 300 in CCM/MSD 900 is analogous to CCM 300 as described in FIGS. 3, 4, 5A-D, 6 and 7A-C. Further, CCM/MSD 900 can be readily updated in accordance with global delivery system 800, as described in FIGS. 7A-C, and 8.

In one embodiment, CCM/MSD 900 is adapted to provide stand-alone compliance with copyright restrictions and/or licensing agreements applicable to media files that may be disposed on a media storage device, (e.g., 999). In another embodiment, CCM/MSD 900 is adapted to be installed on a computer system, (e.g., 210) to provide compliance with copyright restrictions and/or licensing agreements applicable to media files as described in FIGS. 3, 4, 5A-D, 6 and 7A-C.

Referring to FIG. 9, CCM/MSD 900 includes an autorun protocol component 910 for invoking automatic installation of CCM 300. To deter users from attempts at defeating various features inherent to CCM 300, (e.g., the autorun feature), CCM 300's monitoring program, agent program 304, verifies that those features that are to be operational are operational, and if not, CCM 300 prohibits the user from experiencing the contents of the media storage device.

If a user somehow defeats the autorun feature, and the user attempts to utilize an application to capture an image of the content, the application will make an image of the content on the media storage device, which also images the copyright protection contained thereon. As such when the image is played, CCM 300 recognizes the copy protection is present, and CCM 300 will only allow the user to experience the content when authorized, once CCM 300 is installed.

By virtue of the protections as described above provided by CCM 300, users will be able to experience the content of the media storage device in the content's original high quality format, thereby obviating the need to compress the media file used on client system 210. Advantageously, the user will no longer need to suffer through poor quality output as a result of severely compressed media files.

It is noted that when adapted to be implemented in conjunction with a secure file format, meaning that the format of the file is, without proper authorization, non-morphogenic, embodiments of the present invention also provide effective compliance with copyright restrictions and/or licensing agreements with secure files formats. CCM 300 can control the types of file formats into which the media file can be transformed, (e.g., .wav, .mp3, etc.).

In one embodiment, the autorun feature associated with a media storage device drive, (e.g., 1112 of FIG. 10) of client system 210 is activated and operational. Alternatively, a notice of required autorun activation within client system 210 may be displayed on the media storage device and/or the case in which the media storage device is stored.

In another embodiment, if CCM 300 is present or if the user is coupled to a server, then messages containing instructions on how to activate the autorun feature of client system 210 may be presented to the user. In one embodiment autorun protocol component 910 can detect media storage device drives resident on a computer system, (e.g., 210).

The following C++ source code is an exemplary implementation of a portion of autorun protocol component 910 for detecting media storage device drives residing and operable on client computer system 210, according to one embodiment of the present invention.

```
if ( (dwRetVal = GetLogicalDrives( ))
    != (DWORD) 0)
{
    /* initialize variables */
    dwMask = (DWORD) 1;
    /* initialize path to root of current drive */
    _tcscpy(szDrive, _T("A:\\"));
    for (nIndex = 0, dwMask = (DWORD) 1;
        dwMask != (DWORD) 0;
        nIndex++, dwMask <<= 1)
    {
        if ((dwRetVal & dwMask) != 0)
        {
            /* construct path to root of drive */
            szDrive[0] = (TCHAR) 'A' + nIndex;
            if (GetDriveType(szDrive) == DRIVE_CDROM)
            {
                MessageBox((HWND) 0,
                    _T("CD-ROM drive found."),
                    szDrive,
                    MB_OK);
            }
            else
            {
                /* clear bit at current position */
                dwRetVal &= (~dwMask);
            }
        }
    }
}
```

In another embodiment, autorun protocol component 910 can detect whether a media storage device containing media files has been inserted into a media storage device drive coupled with client computer system 210, (e.g., drive 1112 of FIG. 10). In another embodiment, CCM 300 can include instructions for monitoring media storage device drive 1112, and upon detection of drive activation, CCM 300 determines what type of media storage device has been inserted therein. Subsequently, CCM 300 can detect various triggers on the media storage device to invoke its protection, (e.g., a hidden file on newer media storage devices and/or the copyright indicator bit on legacy media storage devices), obviating the need for autorun. Upon detection, CCM 300 can invoke the appropriate protection for the associated media file.

The following C++ source code is an exemplary implementation of a portion of autorun protocol component 910 for detecting a media storage device inserted in a media storage device drive residing and operable on client computer system 210, according to one embodiment of the present invention.

```
/* set error mode for operation */
uiErrMode = SetErrorMode(SEM_FAILCRITICALERRORS);
/* initialize path to root of current drive */
_tcscpy(szDrive, _T("A:\\"));
for (nIndex = 0, dwMask = (DWORD) 1;
        dwMask != (DWORD) 0;
        nIndex++, dwMask <<= 1)
{
    if ((dwCDROMMask & dwMask) != 0)
    {
        /* construct path to root of drive */
        szDrive[0] = (TCHAR) 'A' + nIndex;
        if (  GetDiskFreeSpace(szDrive,
                              &dwSectors,
                              &dwBytes,
                              &dwClustersFree,
                              &dwClusters)
            != 0)
        {
            /* add bit for drive to mask */
            dwRetVal |= dwMask;
        }
    }
}
/* restore original error mode */
SetErrorMode(uiErrMode);
```

Additionally, autorun protocol component 910 can also detect changes in media, (e.g., insertion of a different media storage device 999). Further, other media changes can be detected subsequent to adaptation of the source code including, but not limited to, detecting a previously accessed media file and/or detecting a previously inserted media storage device.

The following C++ source code is an exemplary implementation of a portion of autorun protocol component 910 for detecting a change in media, according to one embodiment of the present invention.

```
/* initialize path to root of current drive */
_tcscpy(szDrive, _T("A:\\"));
for (nIndex = 0, dwMask = (DWORD) 1;
        dwMask != (DWORD) 0;
        nIndex++, dwMask <<= 1)
{
    /* check for presence of CD-ROM media in drive */
    if ((dwCurrMask & dwMask) != 0)
    {
        /* check if media previously in drive */
        if ((dwPrevMask & dwMask) == 0)
        {
            /* construct path to root of drive */
            szDrive[0] = (TCHAR) 'A' + nIndex;
            /* check for presence of marker on drive */
            if (IsMPBMarkerPresent(szDrive) != 0)
            {
                /* process autorun information present on drive */
                nRetVal = ProcessAutorun(szDrive);
            }
        }
    }
}
```

Still referring to FIG. 9, CCM/MSD 900 also includes a kernel level filter driver 920 for controlling a data input path of an operating system coupled with and operable on client computer system 210.

CCM/MSD 900 also includes a generalized filter driver 930 for controlling "ripping" and "burning" applications, (e.g., Nero, Roxio, Exact Audio Copy, and others), thereby preventing such activities.

The following C++ source code is an exemplary implementation of a portion of generalized filter driver 930 for controlling ripping and burning applications that may be residing on and operable within client computer system 210, in accordance with one embodiment of the present invention.

```
bool    bDisabled;         /* flag indicating CD reads disabled */
        /* initialize variables */
        bDisabled = false;
        if (bProtected == true)
        {
            if (type == IRP_MJ_DEVICE_CONTROL)
            {
                ULONG ulIoControlCode = stack-
>Parameters.DeviceIoControl.IoControlCode;
                if (ulIoControlCode == IOCTL_SCSI_PASS_THROUGH)
                {
                    SCSI_PASS_THROUGH * pspt = (SCSI_PASS_THROUGH *)
Irp->AssociatedIrp.SystemBuffer;
                    if ( (pspt != NULL)
                        && (pspt->Cdb[0] == SCSIOP_READ_CD))
                    {
                        pspt->DataTransferLength = 0;
                        pspt->ScsiStatus = 0;
                        bDisabled = true;
                    }
                }
                else if (ulIoControlCode == IOCTL_SCSI_PASS_THROUGH_DIRECT)
                {
                    SCSI_PASS_THROUGH_DIRECT * psptd =
(SCSI_PASS_THROUGH_DIRECT *)
Irp->AssociatedIrp.SystemBuffer;
                    if( (psptd != NULL)
                        && (psptd->Cdb[0] == SCSIOP_READ_CD))
                    {
                        psptd->DataTransferLength = 0;
                        psptd->ScsiStatus = 0;
                        bDisabled = true;
```

```
            }
        }
    }
}
if (bDisabled == true)
{
    /* complete current request */
    status = CompleteRequest(Irp, STATUS_SUCCESS, 0);
}
else
{
    /* pass request down without additional processing */
    status = IoAcquireRemoveLock(&pdx->RemoveLock, Irp);
    if (!NT_SUCCESS(status))
        return CompleteRequest(Irp, status, 0);
    IoSkipCurrentIrpStackLocation(Irp);
    status = IoCallDriver(pdx->LowerDeviceObject, Irp);
    IoReleaseRemoveLock(&pdx->RemoveLock, Irp);
}
```

Still referring to FIG. 9, CCM/MSD 900 includes a CCM 300, analogous to CCM 300 of FIG. 3, that is adapted to be installed in client computer system 210 in one or more ways described herein.

In one embodiment, kernel level filter driver 920, generalized filter driver 930 and CCM 300 of CCM/MSD 900 are automatically installed on client computer system 210, subsequent to insertion of media storage device 999 into a media storage device drive, (e.g., 1112 of FIGS. 10 and 11). Autorun protocol component 910, as described above, detects insertion of media storage device 999 into an appropriate drive, and initiates installation of the components, (e.g., CCM 300, driver 920 and driver 930). In one embodiment, drivers 920 and 930 may be temporarily installed and may be deleted upon removal of media storage device 999 from media storage device drive 1112. In yet another embodiment, drivers 920 and 930 may be installed in hidden directories and/or files within client computer system 210. In another embodiment, some components of CCM 300 can remain installed on client system 210, (e.g. the monitoring program 304). In still another embodiment, other components, (e.g., the kernel level filter driver 920), can be dynamically loaded and unloaded as necessary in accordance with copyright restrictions and/or licensing agreements applicable to the media file.

Embodiments of the present invention utilize software, (e.g., CCM/MSD 900), that is placed on media storage device 999, in conjunction with controlling software CCM 300 installed on client computer system 210, and web server 250 and/or content server 251, wherein each component is communicatively coupled with the other via the Internet, thereby enabling dynamic updating of CCM 300 in the manner as described with reference to FIG. 4, and operation 716 and 718 of FIGS. 7A-C. However, embodiments of the present invention are well suited for use as a stand-alone solution, that is, using CCM/MSD 900 without communicatively coupling with web server 250 and/or content server 251 via Internet 201.

In the present embodiment, CCM/MSD 900 provides a stand-alone DRM mechanism that is far more sophisticated than existing DRM solutions. This is because CCM/MSD 900 goes into the data pathway of the operating system operable on client computer system 210 and obtains control of the data pathway, (e.g., filter driver 1108 of FIG. 11), rather than exploiting inefficiencies or errors in the computer system.

FIG. 10 is a block diagram of a communicative environment 1000 for controlling unauthorized reproduction of protected media files disposed on a media storage device in accordance with an embodiment of the present invention. Included in communicative environment 1000 is a media storage device drive 1112 coupled with a client computer system 210 via a data/address bus 110. Client computer system 210 is coupled with web server 250 and content server 251 via Internet 201. A media storage device 999, upon which a CCM/MSD 900 may be disposed, can be inserted in media storage device drive 1112. As such, autorun protocol component 910 detects the insertion and automatically invokes installation of CCM 300, kernel level filter driver 920 and generalized filter driver 930 from media storage device 999 into client computer system 210. In one embodiment, subsequent to installation, CCM 300 initiates a dynamic update with web server 250 and/or content server 251, via Internet 201. By installing CCM 300 on client computer system, agent program 304 (FIG. 3) of CCM 300 is able to control the integrity of the software associated with CCM/MSD 900. Additionally, by conferring with servers 250 and/or 251 via Internet 201 online, the CCM 300 software version on media storage device 999 and installed on client computer system 210 can be updated when circumventions occur and/or kept current from platform to platform. However, in embodiments of the present invention, it is not necessary for client computer 210 to initiate communications with servers 250 and/or 251.

Advantageously, the monitoring mechanism of agent program 304 enables constant morphing of the version of CCM 300 disposed on media storage device 999 by communicating with server 250 and/or 251 and utilizing the dynamic update capabilities of global network 800 to readily update that which has been installed on client computer system 210, via media storage device 999.

In one embodiment, the installation is performed clandestine with respect to the user and is initiated by inserting media storage device 999 into an appropriate media storage device drive, (e.g. a magnetic/optical disk drive or alternative device drive coupled with client system 210). If the user is not registered with CCM 300, as described herein with reference to FIG. 4 and FIGS. 7A-7C, once installed, CCM 300 initiates an update process with web server 250 and/or content server 251 to readily include updates that have been invoked subsequent to release of the media file on media storage device 999. By virtue of the dynamic update capabilities of CCM 300, regardless of the version of CCM 300 on media storage device 999, CCM 300 provides compliance with copyright restrictions and/or licensing agreements applicable to the media file on media storage device 999. Advantageously, enabling dynamic adaptability of CCM 300 provides for continued interoperability with new and updated operating systems, advancements in electronic technology, communication technologies and protocols, and the like, ensuring the effectiveness of CCM 300 into the future.

In another embodiment, if the user is a registered user with global delivery system 800, CCM 300 can detect which version is most current. Accordingly, when the version existing on client system 210 is more current that the version (for install) on media storage device 999, CCM 300 can bypass the install process and present the contents contained on media storage device 999 to the user for them to experience.

Further advantageous, this technology is backward compatible with media storage device drives manufactured subsequent to and including the year 1982. Additionally, CCM 300 is compatible with media storage devices having a copyright indicator bit disposed thereon. The copyright indicator bit has been included on all CDs released since the year 1982.

In one embodiment, an additional component of CCM 300 is that the trigger for agent program 304 may be the copyright bit indicator. This means when the copyright indicator bit is detected by CCM 300, the functions of CCM 300 are initiated. Alternatively, in another embodiment, when the copyright bit indicator is not detected, CCM 300 may remain in an un-invoked or idle state. If CCM 300 can detect the copyright bit indicator, CCM 300 can provide the appropriate compliance with regard to copyright restrictions and/or licensing agreements applicable to the media files.

In an alternative embodiment, a trigger control in the table of contents of media storage device 999 includes instructions for triggering autorun protocol 910 of CCM/MSD 900 and can utilize the copyright indicator bit or alternative implementation to trigger the technology. In this manner, CCM 300 can control copyrighted works while public domain material can be experienced and reproduced at a user's discretion. Because autorun can be problematic for media storage device manufacturers, embodiments of CCM/MSD 900 can include alternative autorun programs that perform analogous to autorun.

In another embodiment, CCM 300 can invoke its own proprietary player, (e.g., custom media device 310 as described with reference to FIG. 3), thus enabling increased control of copyright restrictions and/or licensing agreements applicable to the media. By invoking custom media device 310, CCM 300 enables user experience of the media while providing protection against unauthorized reproduction of the media disposed on media storage device 999.

In an embodiment of the present invention, the media files and the CCM/MSD 900 disposed on a media storage device 999 are encrypted. In this embodiment, CCM 300 utilizes sophisticated encryption technology to encrypt the table of contents, CCM 300, and the media files disposed on media storage device 999. Encrypting the table of contents and media files of media storage device 999 deters unauthorized attempts to copy and/or distribute the content on media storage device 999. Encrypting CCM 300 can also deter nefarious attempts to reverse engineer CCM 300. Decryption can be performed using an associated decryption key. In an embodiment of the present invention, the decryption key is stored as a hidden file on media storage device 999 and can only be accessed, for example, in conjunction with a unique identification entered by a user. The identification number can be compared with an associated serial number that is unique to each copy of media storage device 999. Alternatively, decryption can be performed by a proprietary or custom presentation mechanism resident on demo media storage device, (e.g., 999).

The content of media storage device 999 is encrypted, using various levels of encryption to provide protection levels commensurate with copyright holder's desires and required protection. For example, media storage device 999 is delivered to a user who inserts media storage device 999 into the appropriate storage device reader or connector coupled with the user's computer, and CCM 300 is installed on client system 200 in a manner clandestine to the user. The user is prompted to enter the unique identification number that is delivered with media storage device 999. If, for example, the ID number matches on the serial number of media storage device, the decryption files on the media storage device are made available for decrypting the other files on media storage device 999.

Accordingly, if the user, to whom demo media storage device 999 had been released, had demo media storage device 999 stolen, or if the user allowed alternative parties try to experience the content of media storage device 999 without entering the unique identification number, the unauthorized party would have to try to crack the encryption keys and the encryption of the actual content of media storage device 999, consuming non-trivial amounts of time.

In one embodiment, CCM 300 allows a user to access media on media storage device after registering with an authenticating entity. For example, upon registering with web server 250 and/or content server 251, the user is sent the identification number that allows accessing the decryption files stored on media storage device 999. In another embodiment, CCM 300 is not encrypted and is installed on client computer system 210 subsequent to insertion of media storage device 999 into media storage device drive 1112. Once installed, CCM 300 initiates a communication session with web server 250/content server 251, where content server 251 can provide authorization for the user to experience the media on media storage device 999.

Thus, in embodiments of the present invention, CCM 300 is able to control which users receive authorization to experience the media of media storage device 999. CCM 300 may also define a period of time in which the media is accessible and/or how many times the user may experience the media. This may enable copyright holders to release the content on an authorized media storage device, (e.g., 999), prior to "pirated" copies flooding the market.

Advantageously, by virtue of encrypting the media stored upon media storage device, unauthorized attempts to copy and/or distribute media will be discouraged. Furthermore, unauthorized sharing of the media by one of the authorized users can be readily detected, and further sharing or experiencing of the media may be halted. Additionally, because the authorized user shared the media in an unauthorized manner, in a worse case scenario, criminal charges could be filed against that user.

It is noted that placing CCM/MSD 900 on a media storage device, (e.g., 999), so as to enable installation of CCM 300 on client system 210 is one manner in which CCM 300 can be installed on client system 210. An alternative manner in which CCM 300 can be installed on client computer system 210 is through "cross-pollination." For example, webcasters broadcast the media file to the user. The media file has a CCM 300 coupled with the media file, and upon downloading the media file onto client computer system 210, embodiments of the present invention enable the installation of CCM 300 onto client computer system 210. In another implementation, CCM 300 is incorporated into and becomes part of an operating system operational on client system 210. Alternatively, laws are passed that mandate the inclusion of CCM 300 on each client computer system 210.

FIG. 11 is an exemplary logic/bit path block diagram 1100 of a client computer system, (e.g., 210), configured with a copyright compliance mechanism (CCM) 300 for preventing unauthorized reproduction of copyrighted media according to an embodiment of the present invention. Copyright compliance mechanism 300 is, in one embodiment, coupled with and operational on client system 210 in any manner similar to that described herein with reference to FIGS. 4, 5A-5D, 6, 7A-7C, 9, and 10.

Diagram 1100 of FIG. 11 includes a media storage device media extraction/creation application 1102 communicatively coupled to operating system input/output subsystem 1104 via wave in line 1121 and wave out line 1138. Operating system input/output subsystem 1104 is coupled with media storage device class driver 1106 via wave in line 1123 and wave out line 1136. Media storage device class driver 1106 is coupled with filter driver 1108 via wave in line 1125 and wave out line 1134. Filter driver 1108 is coupled with media storage device port driver 1110 via wave in line 1127 and wave out line 1132. Filter driver 1108 is shown to include a switch 1111, controlled by CCM 300 via coupling 1160. Media storage device port driver 1110 is coupled with media storage device drive 1112 via wave line in 1129 and wave line out 1130. Media storage device 999, shown to include CCM/MSD 900 is receivable by media storage device drive 1112. Additionally, CCM 300 is coupled with operating system input/output subsystem 1104 via wave in line 1150 and wave out line 1151.

In one embodiment, CCM 300 is coupled to and controls selectable switch 1111 in filter driver 1108. Depending upon the copyright restrictions and/or licensing agreements applicable to a media file disposed on media storage device 999, CCM 300 controls whether switch 1111 is open (shown), thus preventing the media file from reaching media extraction/creation application 1102, or closed (not shown) so as to allow reproduction of the protected media file. Media extraction/creation application 1102 can be a "ripping" or "burning" application such as Nero, Roxio, Exact Audio Copy, or other readily available application.

Continuing with FIG. 11, media storage device 999 is received by media storage device drive 1112. CCM 300 determines whether media storage device 999 or media disposed thereon is protected by any copyright restrictions and/or licensing agreements, (e.g., via detection of a copyright indicator bit). CCM 300 communicates with filter driver 1108 to control switch 1111 accordingly. In the present example, reproducing media storage device 999, and/or the contents thereof, would violate applicable restrictions and/or agreements and therefore switch 1111 is in an open position such that the output path, (e.g., wave-out line 1138) to media extraction/creation application 1102 is effectively blocked thereby preventing unauthorized reproduction of media storage device 999.

It is particularly noted that by virtue of CCM 300 controlling switch 1111, and therefore controlling wave-out line 1138, any incoming copyright protected media disposed on a media storage device 999 can be prevented from being reproduced in an unauthorized manner in accordance with applicable copyright restrictions and/or licensing agreements related to the incoming media.

Advantageously, as new secure or proprietary file formats are developed, CCM 300 can be readily adapted to be functional therewith. Further, CCM/MSD 900 can prevent users from making unauthorized reproductions (e.g., recording, copying, ripping, burning, etc.) of media files. By using kernel level filter drivers (e.g., 1108) and getting to a low enough level within the operating system (OS) on client system 210, CCM 300 can detect particular applications and when they request media storage device drive 1112 to poll the media file for copying, ripping, etc., and disable the data input path. CCM 300, in this embodiment, deals with the input pathway.

In one embodiment, alternative applications that monitor the state of client computer system 210 can enable the autorun functionality of client computer system 210 or alternatively, invoke an automatic mechanism similar to autorun to ensure invocation of CCM 300 for compliance of copyright restrictions and/or licensing agreements applicable to media storage device 999 and/or the copyright protected media disposed thereon.

In one embodiment, CCM 300 can invoke a proprietary media player from media storage device 999, or activate a proprietary media player resident and operable on client computer system 210, or an alternative authorized media player resident on client computer system 210, in a manner similar to that described herein with reference to FIG. 3.

When media storage device 999 is a multisession device, (e.g., a compact disk having a data session and a music session (audio tracks)), and it is inserted into or communicatively coupled with media storage device drive 1112 such that its content is accessible, CCM 300 views the contents of the media storage device 999, and in some operating systems the audio tracks will not be displayed. Instead, the data session is shown, as is an autorun file, (e.g., autorun protocol component 910), and upon clicking, invokes a player application. CCM 300 can have a data session and files to which a user may not have access unless a player application is invoked.

In one embodiment, the player application could deposit a monitoring portion (e.g., agent program 304) on client system 210, which in one embodiment may reside on client computer system 210 subsequent to removal or decoupling of media storage device 999 from media storage device drive 1112.

By virtue of content in a multisession media storage device 999, which may not be directly accessible to most player applications, the player application can be invoked which can then install the CCM 300 into client system 210, according to one embodiment of the present invention.

In one embodiment, a proprietary media player application is stored on media storage device 999. However, it may not be automatically invoked. Upon some user intervention, (e.g., inserting media storage device 999 into media storage device drive 1112), the media player application is loaded onto client system 210 which has CCM 300 integrated therewith. Thus, CCM 300 is launched regardless of autorun being activated or de-activated, and mandates the user to utilize the proprietary media player application, to experience the content of the media, (e.g., media files), on the media storage device 999.

In an alternative embodiment, client computer system 210 has autorun turned off, wherein it is common for the user to be unable to play a media file unless a proprietary media player application is invoked. Activating the proprietary media player application can initiate an installation of those components of CCM 300 that are bypassed when autorun is not active.

Advantageously, by providing a copyright compliance mechanism, (e.g., 300), which can be easily and readily installed on a client computer system, (e.g., 210) one of more embodiments of the present invention can be implemented to control access to, the delivery of, and the user's experience with media content subject to copyright restrictions and/or licensing agreements, for example, as defined by the DMCA. Additionally, by closely associating a client computer system, (e.g., 210), with the user thereof and the media content received, embodiments of the present invention can provide for accurate royalty recording.

Figure 12:
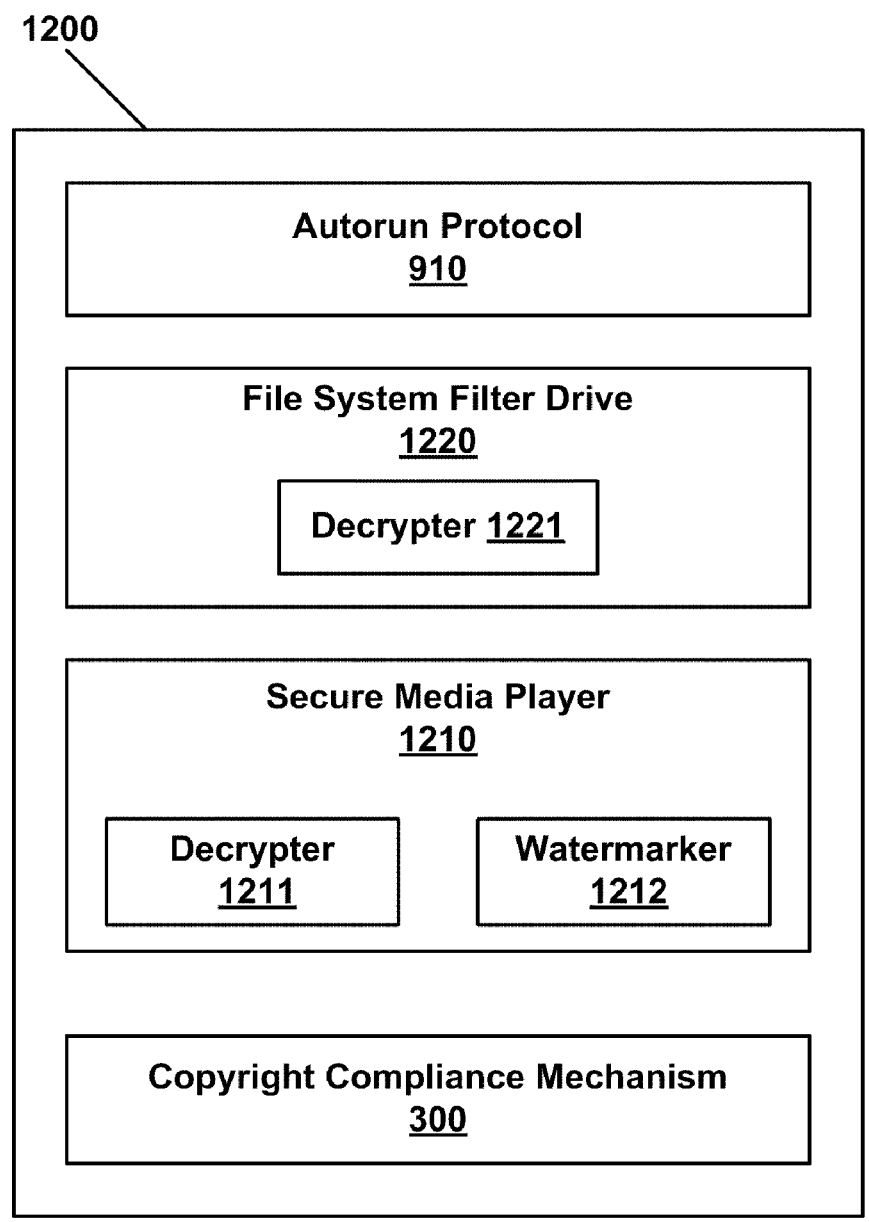
FIG. 12 is a block diagram of components of a usage compliance mechanism installable from a media storage device upon which protected media files are disposed, in accordance with one embodiment of the present invention.

FIG. 12 is a block diagram of a usage compliance mechanism 1200, an alternative version of copyright compliance mechanism 300 which is configured to be disposed on a media storage device, (e.g., 999 of FIGS. 10, 11, 13, 14, and 15) in accordance with an embodiment of the present invention. It is noted that CCM 300 of usage compliance mechanism 1200 is similar to CCM 300 as described herein with reference to FIGS. 3, 4, 5A-5D, 6, 7A-7C, 8, 9, 10, and 11. Further, usage compliance mechanism 1200 can be readily updated in accordance with global delivery system 800, in a manner similar to that described herein with reference to FIGS. 7A-7C.

In one embodiment, usage compliance mechanism 1200 can be disposed on a media storage device, (e.g., 999). Content disposed thereon can, in one embodiment, be demonstration and/or pre-release content. Examples of demonstration and/or pre-release content can include, but is not limited to, audio, video, multimedia, graphics, information, data, software programs, etc. More specifically, demonstration and/or pre-release content can contain, but is not limited to, digital movies or music that may be distributed to persons in the related media field for review, (e.g., a motion picture academy member for their review of a movie, a record industry critic to review songs that may be released on a new compact disc, etc.). Alternatively, demonstration and/or pre-release content can also contain, but is not limited to, a beta version of a software program, and the like.

Alternatively, the content disposed on media storage device 999 can, in another embodiment, be a commercial release of audio content, video content, software application, etc. Embodiments of the present invention are well suited to be implemented in a commercial environment, (e.g., public presentation systems such as those in movie theaters, auditoriums, arenas and the like). Additionally, embodiments of the present invention are readily adaptable to be implemented in commercial distribution points, (e.g., audio, video, and/or software retail and/or rental establishments), as well as for pay-per-view and/or pay-per-play implementations.

Further, literary works, documents, graphics such as pictures, painting, drawing, and the like can comprise the content on media storage device 999. It is noted that a nearly endless variety of demonstration, pre-release, and/or commercially released content can be disposed on media storage device 999.

Referring to FIG. 12, usage compliance mechanism (UCM) 1200 includes an autorun protocol 910 for invoking installation of components of UCM 1200 on a client computer system, (e.g., 210), in one embodiment of the present invention. Autorun protocol 910 of FIG. 12 is analogous to autorun protocol 910 of FIG. 9. Also included in UCM 1200 is a file system filter driver 1220, in one embodiment of the present invention.

File system filter driver 1220 can, in one embodiment, be an upper level and/or lower level filter for the individual bus devices within client computer system 210, (e.g., media storage device drive 1112 of FIGS. 10, 11, 13, 14, and 15). File system filter driver 1220 is enabled to hook onto access to a media storage device drive 1112, (e.g., a CD drive), and intercept data reads associated with accessing the content on media storage device 999.

Figure 13:
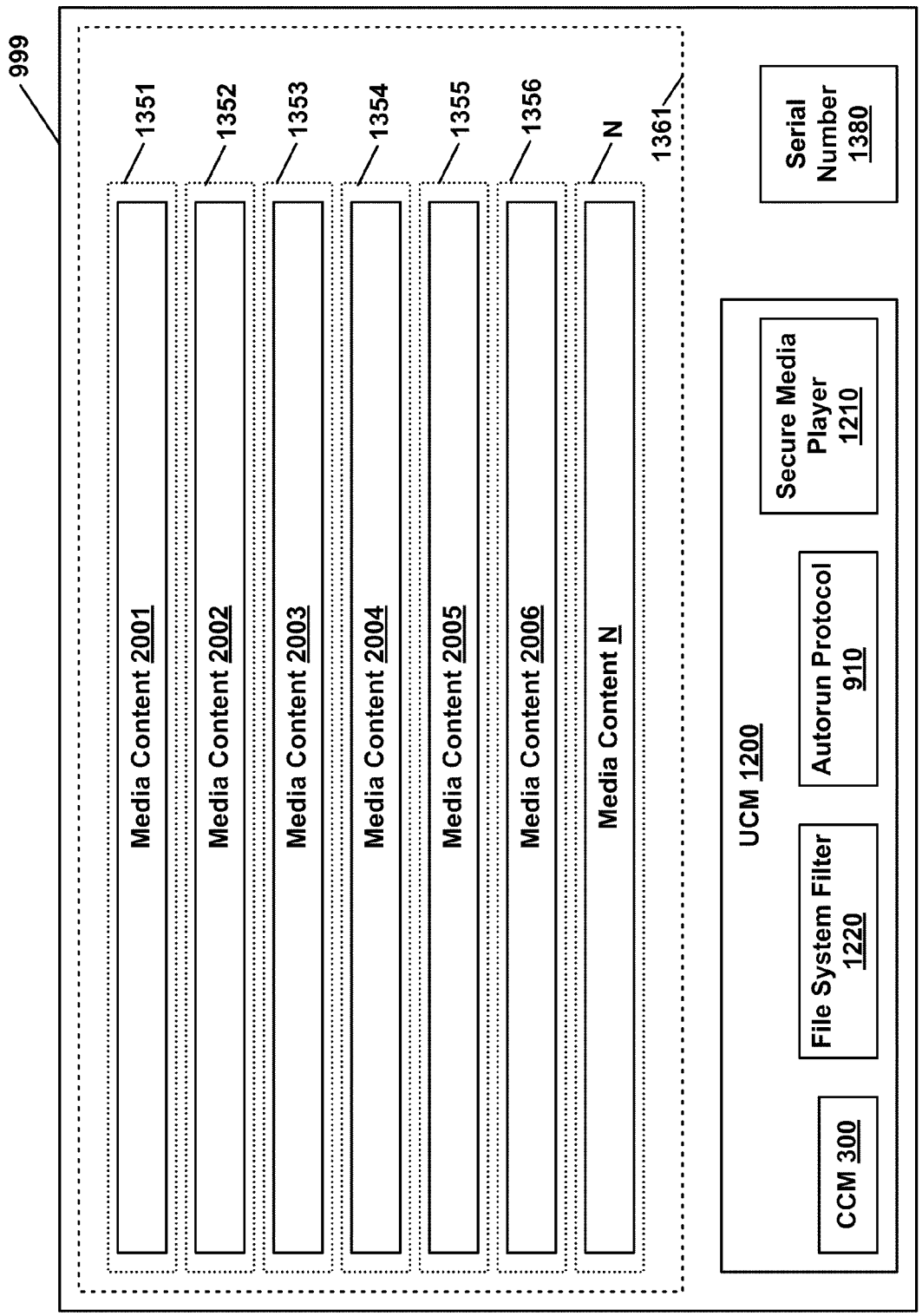
FIG. 13 is a block diagram of components of a usage compliance mechanism and content disposed on a media storage device, in accordance with one embodiment of the present invention.

File system filter driver 1220 includes a decrypter 1221 for providing decryption of encryptions applied to encrypted content, (e.g., encryptions 2351-2N applied to encryptions 1351-1N of media content 2001-N of FIG. 13, in one embodiment of the present invention. Decrypter 1221 can provide dynamic decryption of encryptions applied to encrypted media content on a media storage device 999 as the content, (e.g., 2001-N), is accessed and read by media storage device drive 1112.

Still referring to FIG. 12, UCM 1200 also includes a secure media player 1210. Secure media player 1210 can be, in one embodiment, similar to custom media device 310, that is an emulation of the custom media device driver 307, as described herein with reference to FIGS. 3 and 5B-5D. Alternatively, secure media player 1210 may be an alternative content presentation mechanism having controlling properties analogous to custom media device 310. Secure media player 1210 includes a decrypter 1211 for decrypting encryption applied to each instance of media disposed on a media storage device 999, (e.g., encryptions 1351 to 1N) applied to media content 2001 to N of FIG. 13, respectively. Secure media player 1210 also includes a watermarker 1212 for watermarking the outgoing data stream. In one embodiment, watermarker 1212 operates concurrent with secure media player 1210 and during player 1210's rendering of the content, watermarker 1212 will attach a serial number, (e.g., serial number 1380 of FIG. 13), associated with each media storage device 999 onto the outgoing data stream.

FIG. 13 is a block diagram of contents and components that may be disposed on a media storage device, (e.g., 999), in accordance with embodiments of the present invention. FIG. 13 is shown with multiple instances of content, e.g. media content 2001-N, disposed thereon. Media content 2001-N may be, but are not limited to, movies, audio tracks, beta software, documents, literary works, etc. It is noted that any digital media can be disposed on a media storage device 999 or on a plurality of media storage devices 999.

In an embodiment of the present invention, media content 2001-N is intended to be accessed by a computer system only. In this embodiment, the media content 2001-N is in a computer readable format only and, as a result, media content 2001-N is not compatible with existing compact disk digital audio (CD-DA) standards. This prevents accessing media content 2001-N using a variety of electronic devices such as portable CD players, MP3 players, home/portable recording devices, home/portable video playback devices, etc., which are often used to copy and play pirated copies of media content.

Media storage device 999 of FIG. 13 is analogous to media storage device 999 of FIGS. 10 and 11, 14, and 15. In one embodiment of the present invention. media storage device 999 is configured for utilization in conjunction with demonstration and/or pre-release content.

Figure 14:
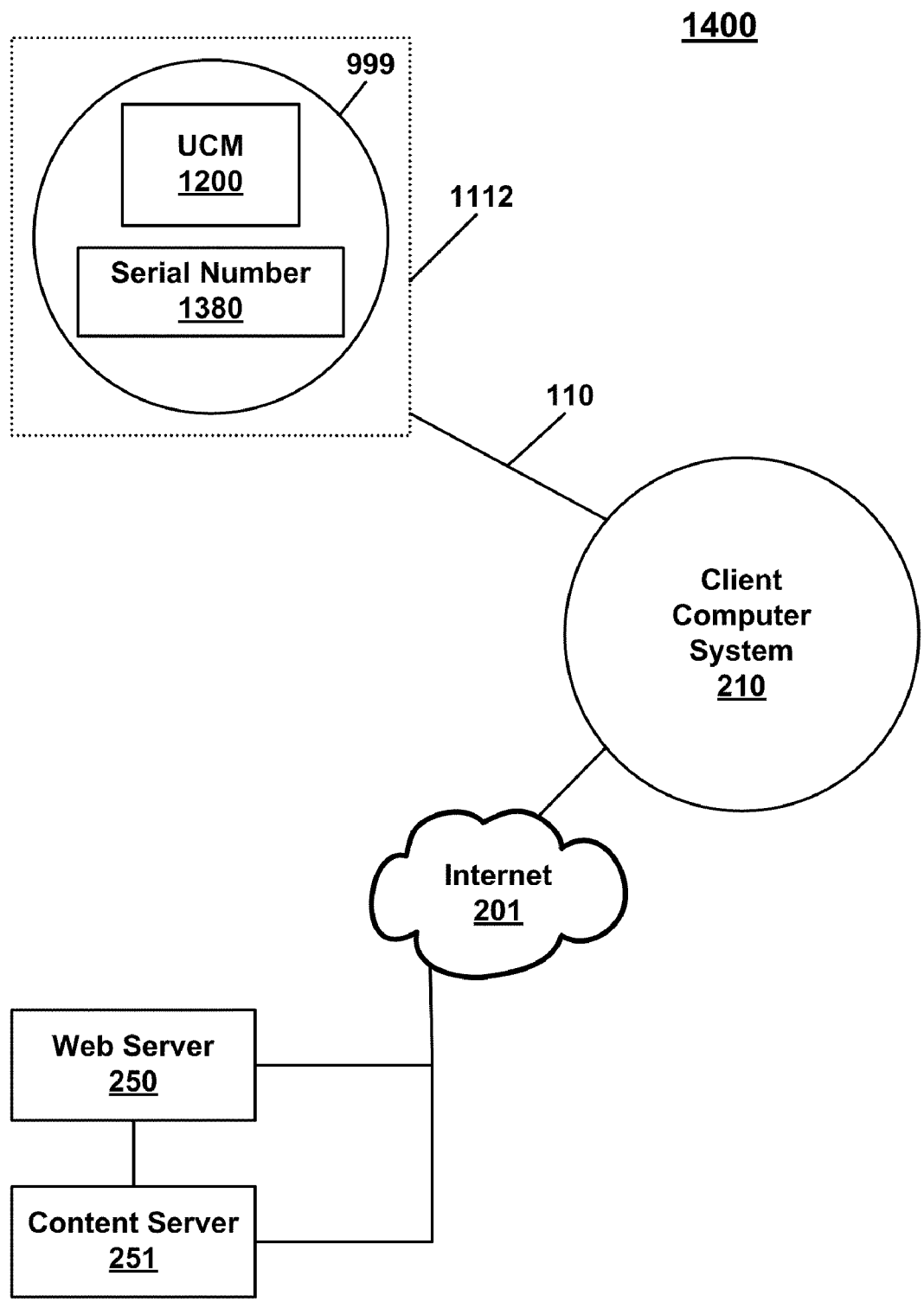
FIG. 14 is a block diagram of a communicative environment for controlling presentation of content on a media storage device, in accordance with one embodiment of the present invention.
Figure 15:
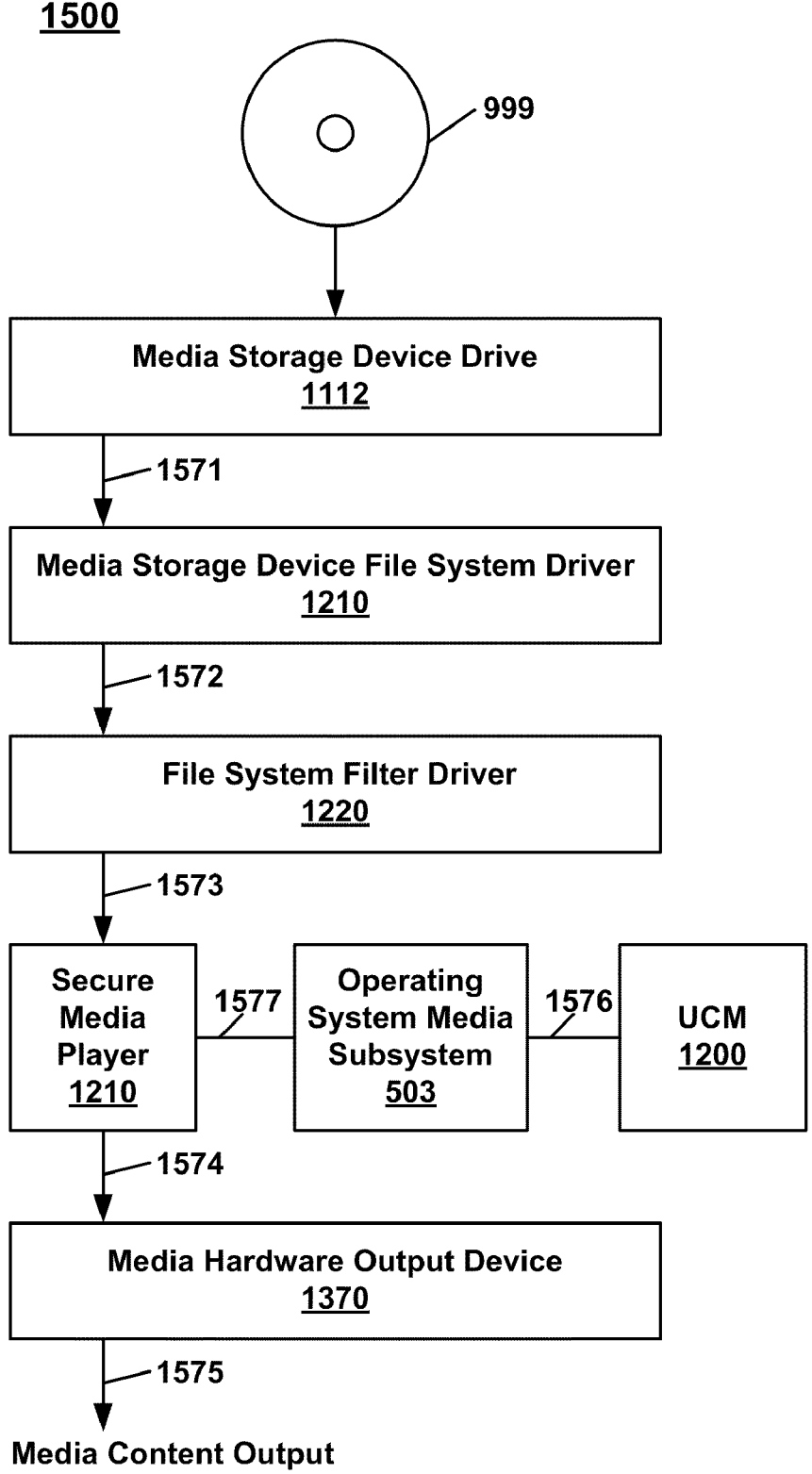
FIG. 15 is a data flow block diagram showing an implementation of a usage compliance mechanism for controlling presentation of content disposed on a media storage device, in accordance with one embodiment of the present invention.

Media storage device 999 of FIG. 13 is shown to have disposed thereon a UCM (usage compliance mechanism) 1200 for controlling presentation of content, (e.g., media content 2001-N), disposed on media storage device 999. The UCM 1200 in FIGS. 13, 14, and 15, is analogous to the UCM 1200 described herein with reference to FIG. 12. It is noted that autorun protocol 910 of UCM 1200 is, in one embodiment, disposed on media storage device 999 in a non-encrypted form.

Also shown on media storage device 999 is a unique identifier for providing a unique identification of the media storage device, (e.g., serial number 1380), in one embodiment of the present invention. Serial number 1380 may be, but is not limited to, nearly any distinguishable identifying type of indicator, (e.g., a randomly generated number, a sequential number, a combination of numbers and alphanumeric characters, and the like). In embodiments of the present invention, serial number 1380 is unique to the particular media storage device 999 and is stored in a hidden file to hinder attempts to create unauthorized copies of the content of the media storage device. Additionally, serial number 1380 may be protected with a copyright protection bit to prevent it from being copied to a different media storage device.

Advantageously, by disposing a unique identifier on a media storage device 999, e.g. a serial number 1380, this enables close association of the content disposed thereon, (e.g., media content 2001-N), with the anticipated recipient of the media storage device, (e.g., a movie critic, a music critic, an academy award member, a software beta tester, etc.). Therefore, by closely associating a media storage device, (e.g., 999), with an anticipated recipient, (e.g., the user of computer system 210), embodiments of the present invention can prevent unauthorized persons from experiencing content on a media storage device, as described herein with reference to FIGS. 3, 4, 7A-7C, and 8. Further advantageous is that by having a unique identifier for each media storage device 999, embodiments also provide security at the media storage device mastering level. This means that an employee working at a mastering facility who unlawfully purloins a copy of the media storage device may still be able to copy the contents and turn those copies into bootleg (unauthorized versions) copies of the media storage device in an attempt to flood the market. However, by virtue of each media storage device 999 having a unique identifier, and each media storage device 999 is associated with its intended recipient, persons not associated with a particular media storage device 999 will be unable to experience the content thereon. While the market may still be flooded with bootleg copies, those that acquire a bootleg copy of a media storage device 999, in accordance with the present invention, will not be able to experience the content thereon, thereby possibly causing the public to be less receptive to the idea of an inexpensive bootleg copy of something that they cannot use.

In one embodiment, media storage device 999 may be distributed to its intended recipients in a variety of ways. For example, distribution of media storage device 999 to its intended recipients can include, but is not limited to, postal delivery methods, (e.g., the United States Postal Service, parcel delivery services such UPS (United Parcel Service) and/or Federal Express, courier delivery services, commercial wholesale/retail distribution networks, and the like). In another embodiment, the intended recipient of a media storage device 999 may be required to physically pick up device 999 from a distribution point.

Media storage device 999 can include multiple instances of content, (e.g., media content 2001-N), in one embodiment of the present invention. Media content 2001-N can be any type of digital media content, including, but not limited to, audio, video, multimedia, graphics, information, data, software programs, etc.

Still referring to FIG. 13, in one embodiment of the present invention, each instance of media content 2001-N is subject to a first encryption, (e.g., encryptions 1351 to 1N), respectively. In the embodiment of FIG. 13, the first decryption key for each encryption, (e.g., encryptions 1351-1N) is stored in decryption keys file 1390. In another embodiment, a first decryption key for each encryption, (e.g., encryptions 1351-1N), may be stored in a server, (e.g., web server 250 and/or content server 251 of FIGS. 2, 4, 10, and 14). In one embodiment, secure media player 1210 can utilize decrypter 1211 and the decryption key stored in decryption key file 1390 or on web server 250 and/or content server 251 to decrypt encryptions 1351-1N during rendering of the content. It is noted that secure media player 1210 can be communicatively coupled with web server 250 and/or content server 251 during rendering and presentation of the content disposed on media storage device 999.

Additionally, media content 2001-N having a first encryption applied thereto, (e.g., encryptions 1351-N), can each be subject to a second encryption, (e.g., encryptions 2351-2N), respectively, prior to disposal of media content 2001-N on media storage device 999. In, one embodiment, the decryption key for each of the second encryptions, (e.g., encryptions 2351-2N) is also stored in decryption keys file 1390. In another embodiment, the second decryption key to decrypt encryptions 2351-2N may be stored in a server, (e.g., web server 250 and/or content server 251 of FIGS. 2, 4, 10, and 14). In one embodiment, file system filter driver 1220 can utilize decrypter 1221 and the second decryption key stored on web server 250 and/or content server 251 to decrypt encryptions 2351-2N during the reading of the content on media storage device 999 by media storage device drive 1112. It is noted that file system filter driver 1220 can be communicatively coupled with web server 250 and/or content server 251 during rendering and presentation.

In one embodiment, encryptions 1351-N can be less computationally intensive encryptions when compared to encryptions 2351-2N. Alternatively, in one embodiment, encryptions 1351-N can be more computationally intensive when compared to than encryptions 2351-N.

There are many available encryption methods that can be implemented as encryptions 1351-N and/or encryptions 2351-2N. Examples of encryptions that may be implemented for encryptions 1351-1N and/or 2351-2N can include, but are not limited to, triple DES (data encryption standard), AES (advanced encryption standard), Blowfish, and numerous others. In one embodiment, encryptions 1351-1N and/or 2351-2N can each be comprised of a series and/or a mixture of encryptions. A differing encryption, (e.g., a plurality of randomly generated encryptions), can be implemented for each instance of media on a media storage device, rather than using one format. In one embodiment, numerous variations of Blowfish are utilized to provide the desired encryptions.

It is noted that when the media (e.g., 2001) of media storage device 999 is encrypted utilizing multiple different encryptions (e.g., 1351 and 2351), the media is more secure against those with dishonest and/or unlawful interests. For example, a person/hacker may attempt to gain access to the content by breaking the second encryption (e.g., 2351) applied to a media content (e.g., 2001). However, if they are successful, the remaining encryption, (e.g., 1351) remains unbroken by virtue of the differing encryptions. Therefore, the person/hacker would have to perform the entire encryption breaking process again to access media content 2001 on media storage device 999. Thus, after spending non-trivial amounts of time breaking two differing encryptions applied to an instance of media (e.g., 2001) the remaining content on media storage device 999 can still be encrypted, each with its own differing multiple encryptions.

FIG. 14 is a block diagram of a communicative environment 1400 for controlling presentation of media content disposed on a media storage device. Included in communicative environment 1400 is a media storage device drive 1112 coupled with a client computer system 210 via a data/address bus 110. Client computer system 210 is coupled with web server 250 and/or content server 251 via Internet 201. A media storage device 999, upon which a usage compliance mechanism 1200 may be disposed, is received by in media storage device drive 1112. Autorun protocol component 910 detects the reception and automatically invokes installation of CCM 300, file system filter driver 1220, and secure media player 1210 from media storage device 999 into client computer system 210. In one embodiment, subsequent to installation, UCM 1200 initiates a dynamic update with web server 250 and/or content server 251, via Internet 201, as described herein with reference to FIGS. 3, 4, and 7A-7C, thereby controlling the integrity of the software. Additionally, by conferring with servers 250 and/or 251 via Internet 201 online, the UCM 1200 software version on media storage device 999 and installed on client computer system 210 can be updated when circumventions occur and kept current from platform to platform. However, while the embodiment of FIG. 14 shows client computer system communicatively coupled with web server 250 and/or content server 251 via Internet 201, embodiments of the present invention are well suited to be utilized as a stand alone implementation that does not communicate with Internet 201.

In FIG. 14, the monitoring mechanism of agent program 304 enables constant morphing of the version of CCM 300 disposed on media storage device 999 by communicating with server 250 and/or 251 and utilizing the dynamic update capabilities of global network 800 to readily update that which has been installed on client computer system 210, via media storage device 999.

In one embodiment, the installation is performed clandestine with respect to the recipient of media storage device 999 and is initiated by inserting media storage device 999 into an appropriate media storage device drive, (e.g. a magnetic/optical disk drive or alternative device drive) coupled with client system 210. Portions of UCM 1200 determine if the recipient is registered with web server 250 and/or content server 251. If the recipient is not registered with servers 250 and/or 251, as described herein with reference to FIGS. 4, 7A-7C, and FIG. 8, portions of UCM 1200 initiates an installation process as described herein with reference to FIGS. 3, 4, 7A-7C, and 11.

If computer system 210 is registered with servers 250 and/or 251, UCM 1200 can initiate an update process with web server 250 and/or content server 251 to readily include updates that have been invoked subsequent to distribution of media storage device 999. By virtue of the dynamic update capabilities of UCM 300, regardless of the version of CCM 300 on media storage device 999, UCM 1200 provides compliance with copyright restrictions and/or licensing agreements applicable to the media content on media storage device 999, (e.g., media content 2001-N). Advantageously, enabling dynamic adaptability of UCM 1200 provides for continued interoperability with new and updated operating systems, advancements in electronic technology, communication technologies and protocols, and the like, ensuring the effectiveness of UCM 1200 into the future.

In another embodiment, if the user is a registered user with global delivery system 800, UCM 1200 can detect which version is most current. Accordingly, when the version existing on client system 210 is more current that the version (for install) on media storage device 999, UCM 1200 can bypass the install process and present the contents contained on media storage device 999 to the user for them to experience.

Further advantageous, this technology is backward compatible with media storage device drives manufactured subsequent to 1982. Additionally, UCM 1200 is compatible with media storage devices having a copyright indicator bit disposed thereon. The copyright indicator bit has been included on all CDs released since 1982.

In the present embodiment of FIG. 14, each instance of media is encrypted on media storage device 999, as described herein with reference to FIG. 13. However, most home players and/or stand alone media playing devices rarely include a decryption mechanism. As such, to experience the music on a home machine, the music is conventionally not encrypted. Accordingly, media storage device 999, in its present embodiment, may not be operable on a home and/or stand alone media playing device.

In one embodiment, UCM 1200 can invoke its own proprietary content presentation mechanism, (e.g., secure media player 1210), as described with reference to custom media device 310 of FIG. 3, thus enabling increased control of copyright restrictions and/or licensing agreements applicable to the media content. By invoking a secure media player 1210, UCM 1200 enables user experience of media content while providing protection against unauthorized presentation or reproduction of the media disposed on media storage device 999.

Still referring to FIG. 14, in one embodiment, the media content, (e.g., media content 2001-N, and UCM 1200 disposed on a media storage device 999 are encrypted, with the exception of autorun protocol 910, as described above. In one embodiment of the present invention, UCM 1200 is encrypted differently than media content 2001-N, thereby preventing the cracking of one encryption from being utilized on another encryption. It is noted that the embodiments of the present invention are operable in an online environment, meaning that client computer system 210 can be communicatively coupled with web server 250 and/or content server 251 to enable a user to experience the content of media storage device 999. In this implementation, UCM 1200 may only allow for specific plays for specific users, which can be controlled via a network, (e.g., network 1400), and server 250 and/or 251.

In the present embodiment, UCM 1200 can be implemented for demonstration and/or pre-release protection of content disposed on a media storage device 999. However, content disposed on media storage device 999 can also be commercially released content, (e.g., audio, video, software, and the like). In this embodiment, sophisticated encryption technology, (e.g., Blowfish), is utilized to encrypt media content 2001-N on media storage device 999 with an associated decrypter key disposed on media storage device 999, (e.g., decryption key files 1390), or on web server 250 and/or content server 251. In one embodiment, a plurality of encryptions are applied to media content 2001-N and a plurality of decrypter keys are stored in decryption key files 1390 of media storage device 999, or on web server 250 and/or content server 251. Decryption can be performed using an associated decryption key in conjunction with a secure media player 1210 and file system filter driver 1220 installed on computer system 210 via media storage device 999.

Still with reference to FIG. 14, the content of media storage device 999, (e.g., media content 2001-N is encrypted), using various levels of encryption to provide protection levels commensurate with copyright holders desires and required protection. For example, media storage device 999 is purchased by or delivered to a user, the user inserts media storage device 999 into the appropriate storage device reader or connector coupled with the recipient's computer, and autorun protocol 910 initiates UCM 1200 install of CCM 300, file system filter driver 1220, secure media player 1210 on client system 210 in a manner clandestine to the user. Once installed, the user is prompted to enter an identification number that is, for example, associated with serial number 1380. If the user enters the correct identification number, the decryption keys stored in decryption key file 1390 are made available for decrypting the media content. In another embodiment, UCM 1200 initiates a communication session with web server 250/content server 251, where content server 251 can provide authorization for the user to experience the media on media storage device 999.

It is appreciated that many variations in the authentication process are possible in embodiments of the present invention. For example, UCM 1200 may initiate a communication session with web server 250/content server 251 and, upon registering with the server, the identification number associated with serial number 1380 is sent via network 1400. Alternatively, upon registering with the server, the first decryption key for decrypting first encryption 1351-1N and/or second encryption 2351-2N are sent via network 1400.

Accordingly, if the user, to whom demo media storage device 999 had been released, had demo media storage device 999 stolen, or if the user allowed alternative parties try to experience the content of media storage device 999, the unauthorized party must have both the identification number associated with media storage device 999 and a copy of media storage device having serial number 1380 disposed thereon. Otherwise, the unauthorized party would have to try to crack the encryption keys and the encryption of the actual content of media storage device 999, consuming non-trivial amounts of time.

Thus, UCM 1200 is able to control which recipients receive authorization to experience the media content on media storage device 999, how many times the recipient may experience the media, and UCM 1200 may also define a period of time until the media content may no longer be accessible. This may enable copyright holders to release the media content on an authorized media storage device, (e.g., 999), prior to pirated copies flooding the market.

It is noted that placing UCM 1200 on a media storage device, (e.g., 999), so as to enable installation of CCM 300 on client system 210 is one manner in which CCM 300 can be installed on client system 210. An alternative manner in which CCM 300 can be installed on client computer system 210 is through "cross-pollination." For example, webcasters broadcast the media file to the user. The media file has a CCM 300 coupled with the media file, and upon downloading the media file onto client computer system 210, embodiments of the present invention enable the installation of CCM 300 onto client computer system 210. In another manner, CCM 300 is incorporated into and becomes part of an operating system operational on client system 210. Alternatively, laws are passed that mandate the inclusion of CCM 300 on each client computer system 210.

FIG. 15 is an exemplary logic/bit path block diagram 1500 of a client computer system, (e.g., 210), configured with a usage compliance mechanism (e.g., 1200) for controlling presentation of content on a media storage device (e.g., 999), in accordance with one embodiment of the present invention. It is noted that usage compliance mechanism 1200 of FIG. 15 is analogous to usage compliance mechanism 1200 of FIG. 12. Therefore, CCM 300 of usage compliance mechanism 1200 is analogous to a copyright compliance mechanism 300 coupled with and installed on a client computer system, (e.g., 210), as described herein with reference to FIGS. 3, 4, 5A-5D, 6, 7A-7C, 8, 9, 10, 11 14, 15, and 16.

Diagram 1500 includes a media storage device drive (e.g., 1112) coupled with a media storage device file system driver 1510 via line 1571. Media storage device drive file system driver 1510 enables an operating system, (e.g., Windows by Microsoft, Apple, Linux, etc.), on a client computer system, (e.g., 210), to recognize and control the media storage device drive 1112. Coupled to media storage device drive file system driver 1510 is file system filter driver 1220, via line 1572. Coupled to file system filter driver 1220 is a secure media player 1210 via line 1573. Coupled with secure media player 1210 are an operating system media subsystem 503 via line 1577 and a media hardware output device 1370 via line 1574. UCM 1200 is coupled with operating system media subsystem 503 via line 1576.

Media storage device drive 1112 of FIG. 15 is analogous to media storage device drive 1112 of FIGS. 11 and 14. Media storage device drive 1112 is configured to receive a media storage device 999. In one embodiment, drive 1112 may be a CD drive and media storage device 999 would be a CD. In another embodiment, drive 1112 may be a DVD drive and accordingly, media storage device 999 would be a DVD, and so on. Therefore, media storage device drive 1112 can, when so configured, receive any media storage device 999 upon which data or content may be disposed.

File system filter driver 1220 can be an upper level and/or lower level filter for individual bus devices, (e.g., media storage device drive 1112), within client computer system 210, and is analogous to file system filter driver 1220 of FIG. 12. File system filter driver 1220 is able to hook onto access of media storage device drive 1112, (e.g., a CD drive) and intercept data reads associated with accessing the content, (e.g., media content 2001-N, on a media storage device, (e.g., media storage device 999). File system filter driver 1220 is also enabled, via decrypter 1221 and a decrypter key stored in decryption key file 1390 or on servers 250 and/or 251, to provide dynamic decryption of encrypted media content on media storage device 999 as the content is accessed and read by media storage device drive 1112.

By virtue of file system filter driver 1220 operating at a file system level instead of operating at a device drive class level, (e.g., a CD class level), it is able to recognize which files are being accessed from media storage device 999 for a particular operation. Advantageously, this obviates the need for a file system to be implemented within a driver for determining whether data that is being read needs decrypting.

Still referring to FIG. 15, secure media player 1210 is analogous to secure media player 1210 of FIG. 11. Secure media player 1210 can, in one embodiment, be a custom media device 310 that is an emulation of a custom media device driver 307, as described herein with reference to FIG. 3. In another embodiment, secure media player 1210 can be a proprietary player configured for utilization with demonstration and/or pre-release content (e.g., 2001-N) disposed on a media storage device, (e.g., 999). Other authorized content presentation mechanisms may also be used to present media content of a media storage device 999, provided the other presentation mechanisms can comply with usage restrictions and/or licensing agreements applicable to the media content and provided by secure media player 1210.

Media hardware output device 1370 is an appropriate output device for the media content of media storage device 999. If media content 2001-N are audio tracks or songs, then output device 1370 is an audio or sound card for outputting music via speakers. Alternatively, if media content 2001-N are video tracks, movies, literary works, software programs, etc., then output device 1370 is a graphics card for outputting movies, text, and the like via a display device, (e.g., 105 of FIG. 1).

Continuing with FIG. 15, media storage device 999 is received by media storage device drive 1112. Autorun protocol 910 initiates a process to determine the presence of a usage compliance mechanism 1200 and a secure media player, (e.g., 1210), operable on computer system 210. If either and/or both usage compliance mechanism 1200 and secure media player 1210 are not present on computer system 210, autorun protocol 910 initiates installation of the components, as described herein with reference to FIGS. 3, 4, 5A-5D, 6, 7A-7C, and 8-16. If UCM 1200 and secure media player 1210 are both present, autorun 910 bypasses the installation thereof. In one embodiment, UCM 1200 then prompts the user to enter the identification number that is associated with media storage device 999. If, for example, the identification number matches serial number 1380, decryption key files 1390 are made available for decrypting the content of media storage device 999. Media storage device file system driver 1510 accesses the content on media storage device, (e.g., media content 2001-N), and reads the data.

File system filter driver 1220 intercepts the read operation being performed by driver 1510 and dynamically decrypts a second encryption, (e.g., 2351-2N), applied to media content 2001-N via decrypter 1221 and a second decryption key stored in and retrieved from decryption key file 1390 or servers 250 and/or 251. In one embodiment, if file system filter driver 1220 is not communicatively coupled with server 250 and/or 251, thereby enabling retrieval of the second decryption key, presentation of the content of media storage device 999 is not permitted.

Continuing with FIG. 15, subsequent to the second encryptions 2351-2N being decrypted, media content 2001-N, is still encrypted with a first encryption, (e.g., 1351-N, respectively), is output to secure media player 1210 via line 1573. Secure media player 1210 in conjunction with UCM 1200 communicates with server 250 and/or 251 and determines if computer system 210 and the user thereof, are authorized to experience media content 2001-N. If system 210 and the user thereof are authorized to experience media content 2001-N, secure media player 1210 commences to render the media content for presentation via media hardware output device 1370.

In one embodiment of the present invention, concurrent with rendering media content 2001-N, secure media player 1210 retrieves the decryption keys stored in decryption key file 1390 associated with each encryption, (e.g., 1351-1N, and with decrypter 1211 of FIG. 12), dynamically decrypt each instance of media content, (e.g., 2001-N), as the content is being rendered and output via line 1574 to media hardware output device 1370. In another embodiment, concurrent with rendering media content 2001-N, secure media player 1210 can communicate with server 250 and/or 251 and retrieve the decryption key associated with each encryption, (e.g., 1351-N), and with decrypter 1211 of FIG. 12, in order to dynamically decrypt each instance of media, (e.g., media content 2001-N), as the content is being rendered and output via line 1574 to media hardware output device 1370.

Because rendered content is vulnerable to capture and/or imaging, and thus becoming subject to ripping, burning, copying, and the like, secure media player 1210 can watermark, (e.g., via watermarker 1212), the outgoing data stream that is output to media hardware output device 1370 via line 1574. In one embodiment, utilizing watermarker 1212, the outgoing data stream is watermarked concurrent with the rendering performed by secure media player 1210. Further, secure media player 1210 can attach a unique identifier, (e.g., 1380), with each rendered media content 2001-N. In one embodiment, the unique identifier 1380 is a serial number that is attached to each media content 2001-N, as it is being rendered and output to media hardware output device 1370. In this manner, if the rendered content being output is somehow captured, imaged, etc., by virtue of the association of unique identifier 1380, (e.g., serial number), with media storage device 999 and the media content disposed thereon, (e.g., content 2001-N), and the computer system 210 with which the recipient of media storage device 999 is associated, unauthorized presentation and reproduction of the media content is prevented.

Figure 16:
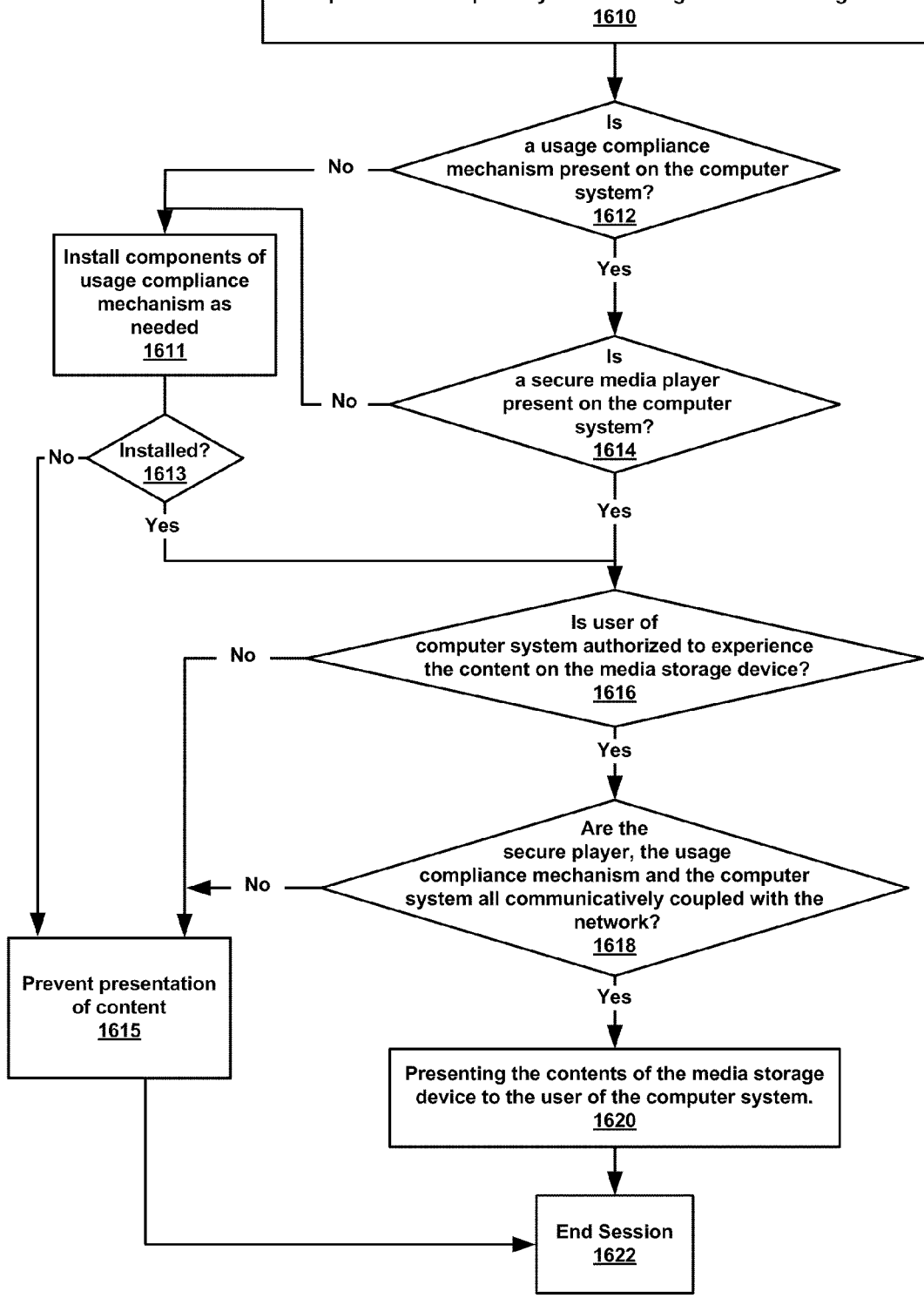
FIG. 16 is a flowchart of a process for controlling presentation of content disposed on a media storage device, in accordance with one embodiment of the present invention.

FIG. 16 is a flowchart 1600 of computer implemented steps performed in accordance with one embodiment of the present invention for controlling presentation of media content disposed on a media storage device. Flowchart 1600 includes processes of the present invention, which in some embodiments, are carried out by processors and electrical components under control of computer readable and computer executable instructions. The computer readable and computer executable instructions reside, for example, in data storage features such as computer usable volatile memory 104 and/or computer usable non-volatile memory 103 of FIG. 1. However, the computer readable and computer executable instructions may reside in any type of computer readable medium. Although specific steps are disclosed in flowchart 1600, such steps are exemplary. That is, the present embodiment is well suited to performing various other steps or variations of the steps recited in FIG. 16. Within the present embodiment, it should be appreciated that the steps of flowchart 1600 may be performed by software, by hardware or by any combination of software and hardware.

It is noted that flowchart 1600 is described in conjunction with FIGS. 2, 3, 4, 5A-5D, 6, 7A-7C, 8-15 to more fully describe the operation of the present embodiment. In step 1610, an autorun mechanism disposed on a media storage device 999, (e.g., autorun protocol 910), is activated in response to a computer system 210 receiving media storage device 999 in an appropriate device drive, (e.g., media storage device drive 1112).

In step 1612 of FIG. 16, a monitoring program within UCM 1200 disposed on media storage device 999 determines if a usage compliance mechanism, (e.g., UCM 1200), is installed on the computer system which received media storage device 999, (e.g., computer system 210). In one embodiment, agent programs 304 may perform the determination. However, in another embodiment, combinations of components of a CCM 300, as described herein with reference to FIGS. 3, 4, 7A-7C may be utilized.

If UCM 1200 is not present on computer system 210, the present method proceeds to step 1611. Step 1611 installs a usage compliance mechanism on computer system 210, as described herein with reference to FIGS. 3, 4, 5A-5D, 6, 7A-7C, and 8-15. Alternatively, if UCM 1200 is present on computer system 210, the present method proceeds to step 1614.

In step 1614, a monitoring mechanism within UCM 1200 disposed on media storage device 999 determines if a secure media player 1210 is present and operable on computer system 210. In one embodiment, agent program 304 of CCM 300 of FIG. 3 can provide the determination.

If a secure media player 1210 is not present and operable on computer system 210, the present method proceeds to step 1611. Step 1611 installs a secure media player 1210 on computer system 210, as described herein with reference to FIGS. 3, 4, 5A-5D, 6, 7A-7C, and 8-15. It is noted that if usage compliance mechanism 1200 and/or secure media player 1210 cannot be properly installed on computer system 210, the present method proceeds to step 1622, which ends the session and which prevents computer system 210 from presenting the content on media storage device 999. Alternatively, if a secure media player 1210 is present and operable on computer system 210, the present method proceeds to step 1616.

In step 1616, UCM 1200 determines whether computer system 210 and the user thereof are authorized to experience media content 2001-N on media storage device 999, as described herein with reference to FIGS. 3, 4, steps 704-708 of FIGS. 7A and 8-15. In one embodiment, the user is prompted to enter an identification number associated with the media storage device and UCM 1200 and determines whether computer system 210 and the user thereof are authorized to experience media content 2001-N on media storage device 999. In another embodiment, UCM 1200 communicates with servers 250 and/or 251 in networks 200, 400, 1000, and/or 1400 and determines whether computer system 210 and the user thereof are authorized to experience media content 2001-N on media storage device 999, as described herein with reference to FIGS. 3, 4, steps 704-708 of FIGS. 7A and 8-15. If computer system 210 and the user thereof are not authorized to experience the content on media storage device 999, the present method proceeds to step 1615. Step 1615 of FIG. 16 prevents presentation of content on a media storage device, (e.g., media content 2001-N on media storage device 999), to the user of computer system 210. Alternatively, if computer system 210 and the user thereof are authorized to experience the content on media storage device 999, the present method proceeds to step 1620.

In step 1620, media content 2001-N on media storage device 999 is read by media storage device drive 1112. File system filter driver 1220 intercepts the read operation being performed by media storage device file system driver 1510 and dynamically decrypts a second encryption applied to media content 2001-N, (e.g., encryptions 2351-2N of FIG. 13), via decrypter 1221 and a second decryption key stored in and retrieved from decryption key file 1390 or on servers 250 and/or 251. It is noted, in one embodiment, if file system filter driver 1220 is not communicatively coupled with server 250 and/or 251, enabling retrieval of the second decryption key, presentation of the content on a media storage device 999 is not permitted.

Continuing with step 1620 of FIG. 16, subsequent to second encryption 2351-2N being decrypted, media content 2001-N, still encrypted with a first encryption, (e.g., encryptions 1351-1N), respectively, is output to secure media player 1210. In one embodiment, secure media player 1210, in conjunction with UCM 1200, commences to render the media content for presentation via media hardware output device 1370. In another embodiment, secure media player 1210, in conjunction with UCM 1200, communicates with server 250 and/or 251 and commences to render the media content for presentation via media hardware output device 1370.

Concurrent with rendering media content 2001-N, secure media player 1210, can, in one embodiment, retrieve the decryption key associated with each encryption, (e.g., 1351-1N) from decryption key file 1390, and with decrypter 1211 of FIG. 12, dynamically decrypt each instance of media content, (e.g., 2001-N), as the content is being rendered and output the rendered content to media hardware output device 1370. In another embodiment, concurrent with rendering media content 2001-N, secure media player 1210, can, in one embodiment, communicate with server 250 and/or 251 and retrieve the decryption key associated with each encryption, (e.g., 1351-1N), and with decrypter 1211 of FIG. 12, dynamically decrypt each instance of media content, (e.g., 2001-N), as the content is being rendered and output the rendered content to media hardware output device 1370.

Since rendered content is vulnerable to capture and/or imaging, and thus becoming subject to ripping, burning, copying, and the like, secure media player 1210 can watermark, (e.g., via watermarker 1212), the outgoing data stream that is output to media hardware output device 1370. In one embodiment, the outgoing data stream is watermarked concurrent with the rendering performed by secure media player 1210. Further, secure media player 1210 attaches a unique identifier (e.g., 1380) with each rendered media content 2001-N. In one embodiment, a unique identifier 1380 (e.g., a serial number) is attached to each media content (e.g., 2001-N), as it is being rendered and output to media hardware output device 1370. In this manner, if the rendered content being output is somehow captured, imaged, etc., by virtue of the association of unique identifier 1380 with media storage device 999 and the media content (e.g., 2001-N) disposed thereon and the computer system 210 with which the recipient of media storage device 999 is associated, unauthorized presentation and reproduction of the media content is prevented.

Figure 17:
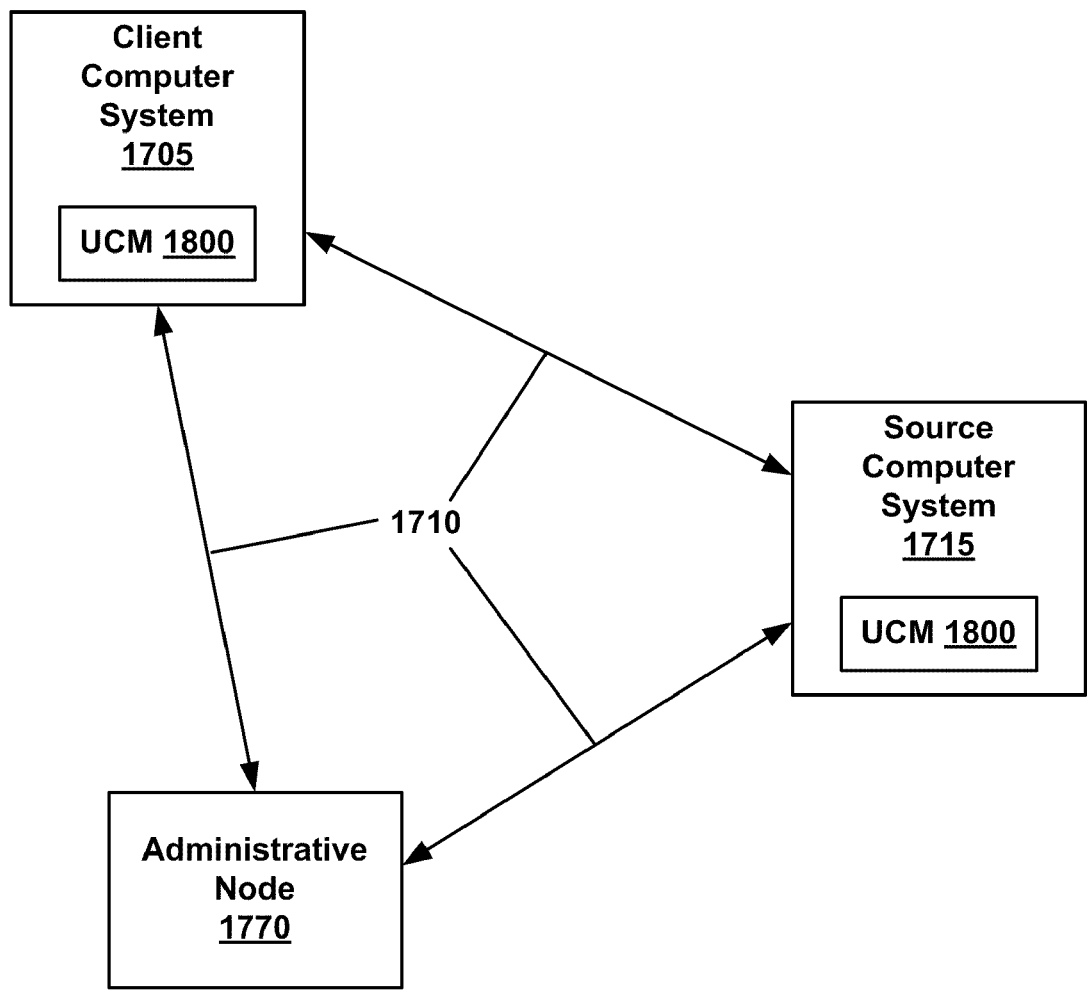
FIG. 17 is a block diagram of a network environment for sharing media content among nodes within the network in accordance with one embodiment of the present invention.

FIG. 17 is a block diagram of a network environment 1700 for sharing media content between nodes (e.g., computer systems) communicatively coupled therewith, in accordance with one embodiment of the present invention. Network 1700 includes a client node 1705, a source node 1715 and an administrative node 1770 which are communicatively coupled via communication link 1710. Communication link 1710 may be a wireline, wireless, or combination of wireline and wireless technologies and communication protocols that facilitate interaction between computer systems. Additionally, in the present embodiment, nodes 1705, 1715, and 1770 may each implemented in a similar manner to that described herein with reference to FIG. 1. Further, network environment 1700 may be implemented in a manner similar to that described herein with reference to network 200 of FIG. 2 and network 800 of FIG. 8.

In one embodiment, client node 1705 may be implemented in a manner similar to a client computer system 210 as described herein with reference to FIGS. 2, 4-8, 10, 11, 14, and 15. Source node 1715 may, in one embodiment, be a client computer system 1705 that makes available to network 1700 media content that may be stored therewithin. In another embodiment, source node 1705 may be a media distribution point (MDP) as described herein with reference to FIG. 8, configured to make available to network 1700 media content that may be stored therewithin. By virtue of the functionality inherent to a P2P network, source node 1715 can function as a client node while client node 1705 can function as a source node.

Still referring to FIG. 17, administrative node 1770 may, in one embodiment, be implemented in a manner similar to a web server 250 and/or content server 251, as described herein with reference to FIGS. 2 and 4. As such, administrative node 1770 may also be coupled to a database, (e.g., database 451 and/or 451 of FIG. 4). Accordingly, administrative node 1770 can, in one embodiment, be configured to provide management functionalities to a network, (e.g., network 1700 or network 800 of FIG. 8). Types of management functionalities that can be provided by administrative node 1770 can include, but is not limited to, network management, user management, encryption and decryption key management, authorization management, media management, transaction management, player application management, and cache management. Administrative node 1770 can also be implemented as a source node 1715 and/or as a media delivery point as described herein with reference to FIG. 8.

Network management can include, but is not limited to, determining the route through which an instance of media is transferred to another computer system in network 1700. For example, and referring to FIG. 8, an instance of media is located in a plurality of locations within network 800, (e.g., media delivery points 808 (San Jose), 816 (Tokyo), and 812 (New York City)). Client node 1705 located in Washington D.C. requests that particular instance of media content. Administrative node 1770 is able to determine, for this example, that the least amount of network resources needed to transfer the media content to requesting client node 1705 would be transferring the instance of media content from media delivery point 812 (New York City).

It is anticipated that many instances of a particular instance of media may be disposed throughout the network, (e.g., 1700), in which there may be varying degrees of quality among the instances media content. Further, it is known that differing source nodes (e.g., 1715) can have varying rates of transfer. For example, a source node 1715 may be coupled to network 1700 via a digital subscriber line (DSL), whereas another source node 1715 may be coupled to network 1700 via a 56K modem, which is substantially slower than a DSL connection. Additionally, transfer routes that would go through a network connection that may be experiencing downtime or technical difficulties can be rerouted. Advantageously, administrative node 1770 can incorporate quality of media content, connection health, and/or delivery speed information into its determination from which source node 1715 the instance of media is to be delivered.

Still referring to FIG. 17, user management, in one embodiment, can include, but is not limited to, maintaining and verifying current user information such as user name, password, billing address, valid credit card number, valid online payment or alternative electronic payment service, MAC (media access control) address, etc., as described herein with reference to FIGS. 3 and 4, and steps 704-710 of FIGS. 7A-7C.

In one embodiment, encryption and decryption key management includes, but is not limited to, storing an encryption key associated with a client computer system for use by the client computer system to encrypt media content thereon into an encryption local to that client computer system, managing a plurality of intermediate encryption and decryption keys for utilization with media content that is being transmitted to a client computer system, etc.

In one embodiment, encryption and decryption key management includes, but is not limited to, storing an encryption key associated with a client node (e.g., 1705) for use by the client node to encrypt media content thereon into an encryption local to that client node, managing a plurality of intermediate encryption and decryption keys for utilization with media content that is being transmitted to a client node, etc.

In one embodiment, authorization management may include verifying that a client node 1705 is authorized to be connected to network 1700, thus being associated with the network. Alternatively, authorization management may also include, but is not limited to, authorizing sharing of an instance of media with network 1700 that does comply with copyright restrictions and/or licensing agreements applicable to the particular instance of media. Furthermore, authorization management may include, but is not limited to, prohibiting sharing of an instance of media with network 1700 that does not comply with copyright restrictions and/or licensing agreements applicable to the particular instance of media.

Still referring to FIG. 17, media management can include, but is not limited to, storing a list of available instances of media content and its associated location within network 1700, storing information related to each instance of media, (e.g., title, artist, genre, length/duration of media content, bit pattern information related to a particular instance of media for identification, storing information regarding royalty fees (where applicable) that may be assessed to an instance of media content each time it is transmitted within the network), storing information to enable expiring the media content on a computer system when the computer system is no longer authorized to access and/or is no longer associated with network 1700, and the like.

Additionally, media management can also include utilizing an Ethernet filter and other mechanisms to obtain information related to transmitted and/or received instances of media, instances of media that have recently entered the network, and the like. In one embodiment, an Ethernet filter may be coupled to a network interface device (e.g., 104) coupled to the computer system receiving the instance of media content. It is noted that the network interface may include, but is not limited to, a modem, a NIC (network interface card), a wireless receiver, etc. Information obtained by an Ethernet filter can be used in identifying a particular instance of media, determining appropriate royalty fees, etc.

In one embodiment, transaction management can include generating a transaction for each successful transfer of media content from one node (e.g., source 1715) to another node (e.g., client 1705) in the network, in the network (e.g., 1700). In one embodiment, the receiving client node 1705 acknowledges successful receipt of the media content and accordingly, administrative node 1770 generates a transaction applicable to the receiving client node 1705 and which is associated with that particular instance of media. Since different instances of media content may have differing usage and/or royalty fees associated therewith, embodiments of the present invention can provide the mechanisms to account for each transfer such as generating a transaction for each transfer, generating a payment from the recipient of the instance of media, and/or delivering an appropriate remuneration to the media content copyright holder.

Advantageously, a royalty transaction can also be applied to a copyrighted instance of media where no royalty payment was previously possible. For example, assume that a bootleg copy of an artist's live performance has been freely available for years. This bootleg copy may have been made from a portable recorder brought into a live performance and was used to record the performance. In this example, a person acquires an analog bootleg copy and converts it to a digital format or acquires a digital format of the bootleg copy. The digital copy is then availed to network 1700 for sharing among the nodes coupled therewith. It is noted that when an instance of media enters network 1700, it becomes protected as described herein with reference to FIGS. 3, 4-9, 11, 12, and 15.

Accordingly, when a client node 1705 successfully receives the digital copy, a transaction is generated, thus invoking a royalty payment when no such royalty payment was previously possible. Advantageously, this can provide a means to distribute appropriate remunerations to copyright holders and licensees that would otherwise receive no payment.

Continuing, when an instance of media can be freely distributed, a transaction is still generated. This advantageously provides a record of the numbers of requests for a particular instance of media, the location from where those requests originated, and the like, thereby providing data which can be utilized in marketing studies and implementing marketing strategies, etc.

It is particularly noted that in an alternative implementation, embodiments of the present invention can be readily configured to provide a mechanism that can generate a sales/use tax transaction related to transfer of a instance of media. Embodiments of the present invention can be readily configured to calculate appropriate sales/use tax amounts relative to the location of the receiving client computer system. Advantageously, this would enable municipalities, counties, states, and other governmental agencies to increase revenue, thus possibly realizing a reduction in a deficit associated with a government. It is anticipated that generating sales/use tax transactions could provide from tens to hundreds of millions of dollars in previously untapped revenue to those governmental agencies.

Still referring to FIG. 17, player management, in one embodiment, can include, but is not limited to, maintaining secure player application integrity, adding additional player applications to a list of approved player applications, removing player applications that do not meet usage restriction requirements applicable to a media file, modification of a secure player application to improve its functionality, modification to counteract nefarious hacking attempts, disabling the secure player application when the computer system on which it is operable is no longer authorized to participate in or is associated with network 1700, etc.

Cache management, in one embodiment, can include, but is not limited to, maintaining protected media container file integrity, modification thereof to improve functionality or to counteract detected nefarious activities, disabling the protected media container file when the computer system upon which the protected media container file is disposed is not authorized to access and/or is no longer associated with network 1700.

In the present embodiment, client node 1705 and source node 1715 each have an instance of a usage compliance mechanism (UCM) 1800 coupled therewith. In the present embodiment, UCM 1800 of FIG. 17 and as described with detail in FIG. 18 is similar to a copyright compliance mechanism 300 and/or a usage compliance mechanism 900 and/or 1200, as described herein with reference to FIGS. 3, 4, 5A-5D, 6, and/or 9, 11, 12, and 15, respectively.

Figure 18:
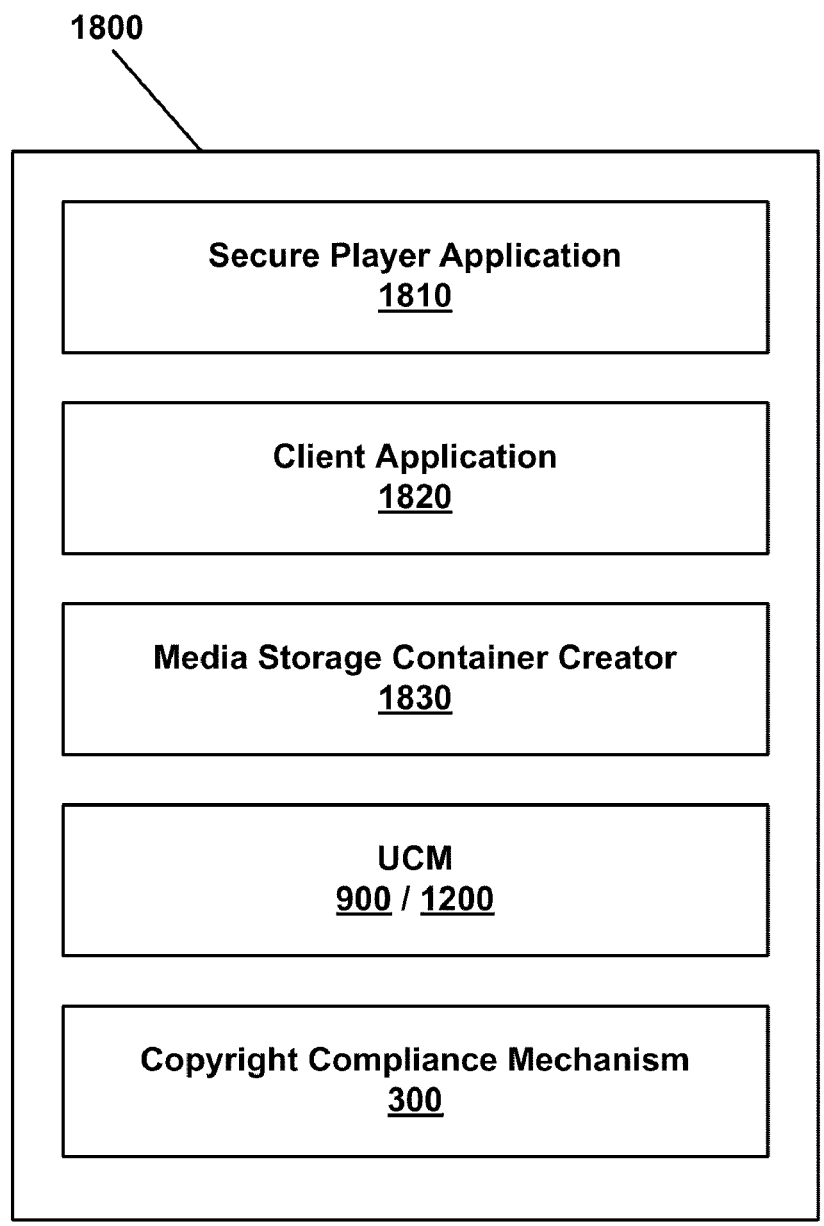
FIG. 18 is a block diagram of components within an exemplary usage compliance mechanism configured for utilization in a distributed network topology for controlling media sharing among computer systems in the network, in accordance with one embodiment of the present invention.

FIG. 18 is a block diagram of components in a usage compliance mechanism (UCM) 1800 that is configured to be installed and operable on a client node (e.g., 1705) and/or a source node (e.g., 1715) in accordance with an embodiment of the present invention. UCM 1800 includes a copyright compliance mechanism (e.g., 300) that can be analogous to a copyright compliance mechanism 300 as described herein with reference to FIGS. 3, 4, 5A-5D and 6. It is noted that UCM 1800 also includes those features and components as provided in a UCM 900 and a UCM 1200 as described herein with reference to FIGS. 9, 11, 12, and 15, respectively.

UCM 1800 further includes a secure player application 1810, a client communication application 1820, and a media storage container creator 1830. Media storage container creator 1830 is configured to allocate a portion of a memory unit coupled to the computer system in which UCM 1800 is installed, (e.g., 102 and/or 103) coupled to the computer system (e.g., 100) into which UCM 1800 is installed. Media storage container creator 1830 utilizes the allocated portion of a memory unit and creates a protected media container file (e.g., a custom file system) into which received and/or availed instances of media, (e.g., audio files, video files, multimedia files, documents, software, and the like) are stored. It is noted that in one embodiment, media content that is stored in a protected media container file (not shown) is, in addition to other encryptions applicable to the instance of media, encrypted local to the computer system on which the protected media file container is disposed. In an example, an instance of media is stored on both client node 1705 and source node 1715 of FIG. 17. Accordingly, media content is uniquely encrypted local to node 1705 and is uniquely encrypted local to node 1715. Additionally, in the context of the present invention, the term availed and/or availing refers to making available to a network, (e.g., 1700), an instance of media that may be stored in a protected media container file.

Still referring to FIG. 18, UCM 1800 also includes, in one embodiment, a client communication application 1820. Client communication application is a custom client communication application configured to provide communication functionality between the nodes in a decentralized distributed network, (e.g., 1700). Alternatively, client communication application 1820 is also well suited to be implemented in nearly any network, including, but not limited to, network 1700. Client communication application 1820 can be a well known and readily available communication application and which may be written in a commonly utilized programming language including, but not limited to, C, C++, Java, Fortran, etc.

In one embodiment, client communication application 1820 is configured to decrypt media content from an encryption local to a computer system on which application 1820 is operable. Client communication application 1820 can also be configured to encrypt media content into an intermediate encryption for transferring the media content to another computer system communicatively coupled with a network, (e.g., 1700). Application 1820 is additionally configured to decrypt media content that is received in an intermediate encryption from a computer system coupled with network 1700. Client communication application 1820 is further configured to encrypt the media content into an encryption local to the computer system on which application 1820 is operable.

In one embodiment, client communication application 1820 can utilize an intermediate encryption key provided by an administrative node (e.g., 1770) to encrypt the media content into the intermediate encryption for transfer. Application 1820 can also utilize an intermediate decryption key, also provided by administrative node 1770, to decrypt media content that is received in an intermediate encryption from a computer system coupled with network 1700.

In one embodiment, client communication application 1820 can transmit an indicator or an acknowledge signal indicating that the media content delivered from another computer system in network 1700 was successfully received. In one embodiment, an acknowledge signal received by administrative node 1770 can generate a transaction applicable to the computer system receiving the media content and which is associated with the media content that was received.

Still referring to FIG. 18, UCM 1800 further includes a secure player application 1810 that can be configured to access contents of a protected media container file, (e.g., an instance of media) and provide presentation of the media content to the computer system on which the media content is stored. Secure player application 1810 can be further configured to utilize its access to the protected media container file and make available to the network the contents thereof. In one embodiment, secure player application 1810 can present the media content to the computer system on which it is operable while the computer system is offline, (e.g., not coupled with network 1700 but still associated therewith).

Secure player application 1810 can be media type specific, such as a secure audio player application for audio files, a secure video player application for video files, a secure alphanumeric application for text files, a secure software player application for software files, and so on. It is noted that secure player application 1810 can be configured to interact with nearly any media type.

In one embodiment, secure player application 1810 can be a custom media device 310 which can be an emulation of a custom media device driver (e.g., 307) as described herein with reference to FIGS. 3, 4, and FIGS. 5A-5D. In another embodiment, secure player application 1810 can be an approved player application as described herein with reference to FIG. 3.

Figure 19:
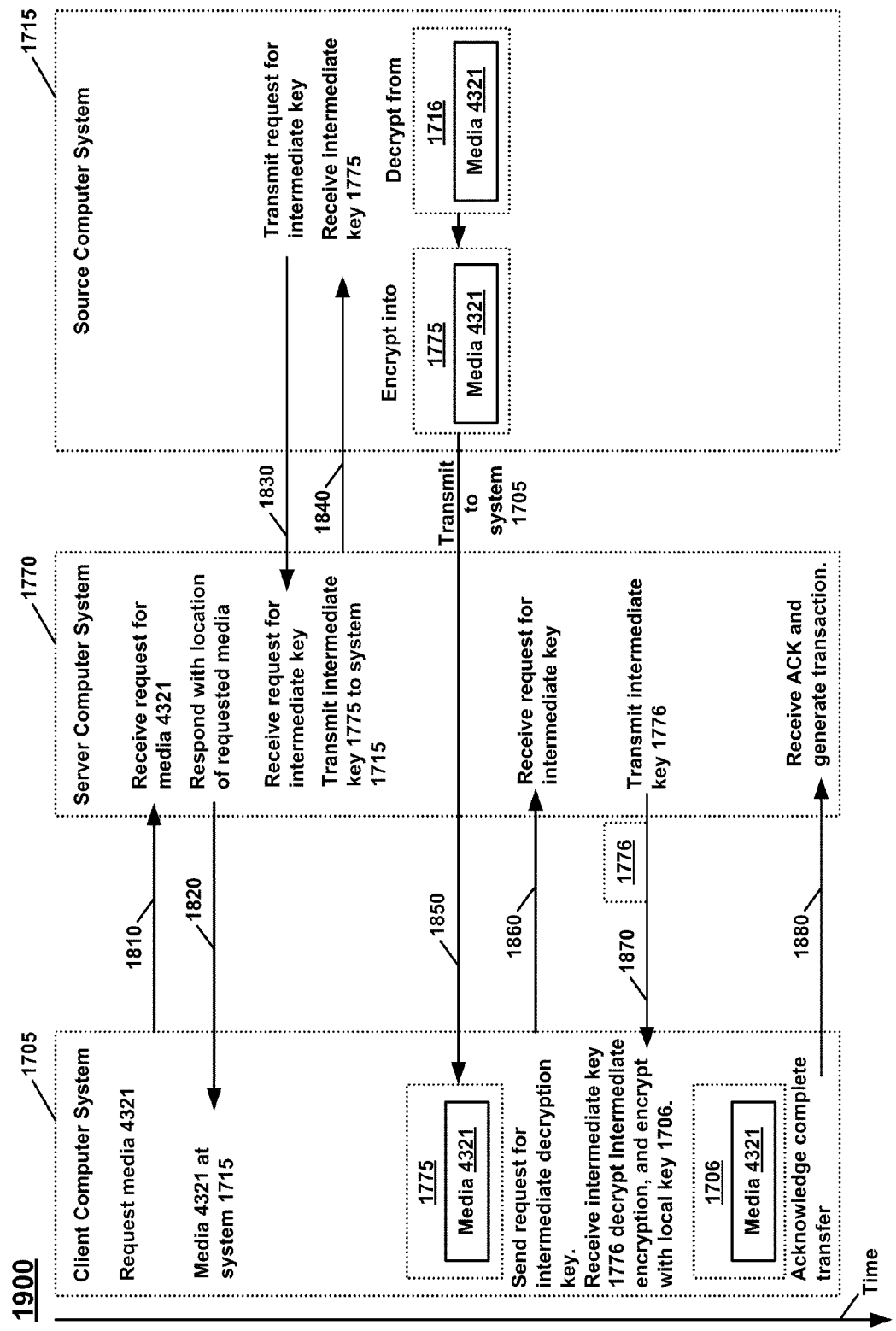
FIG. 19 is an illustrated data flow of an exemplary system for controlling media sharing among multiple computer systems communicatively coupled in a network in accordance with one embodiment of the present invention.

FIG. 19 is an exemplary system 1900 for controlling media sharing among multiple computer systems communicatively coupled in a network in accordance with one embodiment of the present invention. System 1900 includes client node 1705, a source node 1715, and an administrative node 1770. Nodes 1705, 1715 and 1770 are implemented in and communicatively coupled to a network 1700 in one embodiment of the present invention. In one embodiment, network 1700 is a decentralized distributed network, (e.g., network 800 of FIG. 8).

In an embodiment, source node 1715 and client node 1705 have logged on to network 1700, as described herein with reference to FIG. 4, and steps 702-716 of FIG. 7A. Client node 1705 requests an instance of media from network 1700, (e.g., 4321), shown as communication 1910. Network 1700 transfers the request to administrative node 1770 which determines the location of an instance of media 4321. Administrative node 1770 responds to client node 1705 with the location of instance of media 4321, shown as communication 1920.

In this example, server computer system 1770 is cognizant that source node 1715 has an instance of media 4321 disposed therein. In the present embodiment, instance of media content 4321 is stored in a protected media container file by memory coupled to source node 1715. Additionally, instance of media 4321 is encrypted local to source node 1715, shown as dotted line 1716 encompassing media 4321.

Within FIG. 19, source node 1715 sends a request to administrative node 1770 for an intermediate encryption key to encrypt instance of media 4321 for transfer to client node 1705, shown as communication 1930. Administrative node 1770 transmits an intermediate encryption key, (e.g. key 1775), to source node 1715. Upon receipt of intermediate encryption key 1775 by source node 1715, a client communication application 1820 operable on source node 1715 decrypts media 4321 from its encryption local thereto, (e.g., encryption 1716), and encrypts media 4321 into an intermediate encryption, as indicated by dotted line 1775 encompassing media 4321.

Still referring to FIG. 19, once client communication application 1820 on source node 1715 encrypts media 4321 into intermediate encryption 1775, client communication application 1820 transmits media 4321 in intermediate encryption 1775 to client node 1705, shown as communication 1950. Upon client node 1705 receiving media 4321 in intermediate encryption 1775, client node 1705 sends a request to administrative node 1770 for an intermediate decryption key (e.g., key 1776), shown as communication 1960. Intermediate decryption key 1776 enables a client communication application 1820 operable on client node 1705 to decrypt media 4321 from its intermediate encryption 1775. It is noted that until intermediate encryption 1775 is decrypted, secure player 1810 operable on client node 1705 is unable to present media 4321 to system 1705. It is further noted that if another computer system in network 1700 has intercepted media 4321 during transfer, the intermediate encryption 1775 prevents use of media 4321 by the intercepting computer system.

Continuing, administrative node 1770 responds to client node 1705's request for an intermediate decryption key and transmits key 1776 to client node 1705, shown as communication 1970. Once key 1776 is received by client node 1705, a client communication application 1820 operable on system 1705 decrypts media 4321 out of intermediate encryption 1775 and encrypts media 4321 into an encryption local to client computer system, (e.g., encryption 1706 encompassing media 4321).

When media 4321 has been successfully received by and encrypted into an encryption local to client node 1705, (e.g., media 4321 with encryption 1706), client node 1705 transmits an acknowledge indicator indicating successful receipt of media 4321, shown as communication 1980. Accordingly, upon receipt of an acknowledge indictor, administrative node 1770 generates a transaction applicable to client node 1705 and which is associated with media 4321.

Advantageously, embodiments of the present invention provide components that enable controlled media sharing in a decentralized distributed network such as a p2p network, (e.g., network 800 of FIG. 8 and/or network 1700 of FIG. 17). Further advantageous is that embodiments of the present invention can also track the sharing, generate royalties applicable to a receiving computer system and associated with a particular instance of media. Also advantageous is that embodiments of the present invention allow for outside instances of media to enter the network and provide compliance with copyright restrictions and licensing agreements associated with the instance of media.

It is noted that one or more embodiments in accordance with the present invention described herein can be utilized in combination with a delivery system similar to delivery system 800 of FIG. 8. For example, any network of one or more of the embodiments in accordance with the present invention can be substituted with a delivery system similar to delivery system 800. Alternatively, a delivery system similar to delivery system 800 may be implemented to include any combination of source nodes (e.g., 1715), client nodes (e.g., 1705), and/or administrative nodes (e.g., 1770) that operate in any manner similar to that described herein, but are not limited to such.

The foregoing disclosure regarding specific embodiments of the present invention have been presented for purposes of illustration and description. They are not intended to be exhaustive or to limit the invention to the precise forms disclosed, and many modifications and variations are possible in light of above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for controlling presentation of a computer readable media of a media storage device, said method comprising:

receiving a media storage device at a computer system;

using an autorun mechanism disposed on said media storage device to clandestinely install a usage compliance mechanism on said computer system in response to said computer system receiving said media storage device, said usage compliance mechanism comprising a file system filter driver for controlling data reads associated with said computer readable media;

performing a first decryption of said computer readable media with said file system driver;

verifying the presence of a media presentation mechanism on said computer system, said media presentation mechanism communicatively coupled with said usage compliance mechanism; and performing a second decryption of said computer readable media and presenting said computer readable media with said media presentation mechanism, said second decryption different from and unrelated to said first decryption.

2. The method as recited in claim 1 further comprising:
installing said media presentation mechanism on said computer system when said media presentation mechanism is not present on said computer system.

3. The method as recited in claim 2 further comprising:
using said autorun mechanism to clandestinely install said media presentation mechanism on said computer system in response to said computer system receiving said media storage device.

4. The method as recited in claim 1 further comprising:
affixing a unique identifier to said media storage device.

5. The method as recited in claim 4 wherein said unique identifier is a serial number and comprising:
generating said serial number before or during disposition of said computer readable media on said media storage device.

6. The method as recited in claim 5 further comprising:
watermarking said computer readable media via said media presentation mechanism during decryption of a first encryption applied to said computer readable media, said media presentation mechanism further causing said unique identifier to be watermarked onto an outgoing data stream containing said computer readable media.

7. The method as recited in claim 1 further comprising:
encrypting said computer readable media prior to disposal of said computer readable media on said media storage device.

8. The method as recited in claim 7 wherein said encrypting comprises:
applying a first encryption to said computer readable media; and
applying a second encryption to said first encryption of said computer readable media.

9. The method as recited in claim 8 further comprising:
decrypting said second encryption with said file system filter driver using a second decryption key stored by said media storage device.

10. The method as recited in claim 8 further comprising:
decrypting said first encryption with said media presentation mechanism using a first decryption key stored by said media storage device before or concurrent with said presenting.

11. The method as recited in claim 8 further comprising:
communicatively coupling said computer system with a server; and
decrypting said second encryption with said file system filter driver using a second decryption key stored by said server.

12. The method as recited in claim 8 further comprising:
communicatively coupling said computer system with a server; and
decrypting said first encryption with said media presentation mechanism using a first decryption key stored by said server.

13. The method as recited in claim 7 wherein said encrypting comprises:
applying a first unique encryption to each instance of said computer readable media when a plurality of computer readable media is disposed on said media storage device; and
applying a second unique encryption to each said first unique encryption of said computer readable media.

14. The method as recited in claim 1 further comprising:
communicatively coupling said computer system with a network;
availing to said network an instance of said computer readable media for sharing among a plurality of nodes of said network by said computer system;
decrypting said instance of said computer readable media from an encryption local to said computer system;
encrypting said instance of said computer readable media into an intermediate encryption; and
transferring said instance of said computer readable media in said intermediate encryption to a node of said network, wherein said decrypting and said encrypting and said transferring are in response to receiving a request for said instance of said computer readable media from said node.

15. The method as recited in claim 14 further comprising:
receiving an intermediate encryption key by said computer system, said intermediate encryption key for said encrypting said instance of said computer readable media into said intermediate encryption.

16. The method as recited in claim 15 further comprising:
generating a request by said computer system for said intermediate encryption key; and
receiving said intermediate encryption key from an administrative node of said network.

17. The method as recited in claim 14 further comprising:
using a client application coupled with said computer system to perform said decrypting and said encrypting.

18. The method as recited in claim 14 further comprising:
using said media presentation mechanism to perform said availing to said network said instance of said computer readable media.

19. The method as recited in claim 14 further comprising:
updating said media presentation mechanism and said usage compliance mechanism via said network.

20. The method as recited in claim 14 further comprising:
storing said instance of said computer readable media in a custom file system of memory coupled with said computer system, said custom file system accessible to a media presentation mechanism.

21. A system for controlling presentation of a computer readable media of a media storage device comprising:
a detecting component for detecting the presence of a usage compliance mechanism on a computer system;
an autorun component disposed on said media storage device for automatically installing said usage compliance mechanism in a clandestine manner when said usage compliance mechanism is not detected on said computer system, said autorun component invoked in response to said computer system receiving said media storage device;
said usage compliance mechanism comprising a file system filter driver for controlling data reads associated with said computer readable media and for performing a first decryption of said computer readable media;
a media presentation mechanism communicatively coupled with said usage compliance mechanism for performing a second decryption of said computer readable media and presenting said computer readable media, said second decryption different from and unrelated to said first decryption;
said detecting component for additionally detecting the presence of said media presentation mechanism on said computer system; and
an authorizing component for authorizing a recipient of said media storage device to experience said computer readable media provided said usage compliance mechanism is installed on said computer system.

22. The system as recited in claim 21 further comprising:
an autorun component disposed on said media storage device for automatically installing said media presentation mechanism on said computer system when said media presentation mechanism is not detected on said computer system, said autorun component invoked in response to said computer system receiving said media storage device.

23. The system as recited in claim 21 further comprising:
an encrypting component for encrypting said computer readable media prior to disposition of said computer readable media on said media storage device, wherein said encrypting comprises a first encryption applied to said computer readable media and a second encryption applied to said first encryption of said computer readable media.

24. The system as recited in claim 23 wherein said encrypting component applies a first unique encryption to each instance of said computer readable media disposed upon said media storage device and a second unique encryption to each said first unique encryption and associated computer readable media.

25. The system as recited in claim 23 wherein said file system filter driver comprises:
a first decryption component for decrypting said second encryption with a second decryption key stored by said media storage device.

26. The system as recited in claim 23 wherein said media presentation mechanism further comprises:
a second decryption component for decrypting said first encryption with a first decryption key stored by said media storage device.

27. The system as recited in claim 21 further comprising:
an identification component for providing a unique identification for said media storage device, and wherein said unique identification is disposed on said media storage device.

28. The system as recited in claim 27 wherein said media presentation mechanism further comprises:
a watermarking component for watermarking said computer readable media, and for causing said unique identification to be watermarked onto an outgoing data stream containing said computer readable media.

29. The system as recited in claim 21 further comprising:
a network communicatively coupled with said computer system, wherein said computer system is configured to transfer an instance of said computer readable media to a node of said network in response to a request from said node, said instance of said computer readable media decrypted from an encryption local to said computer system and encrypted into an intermediate encryption for transfer to said node.

30. The system as recited in claim 29 further comprising:
a custom file system disposed on memory coupled with said computer system, said custom file system for storing said instance of said computer readable media.

31. The system as recited in claim 29 further comprising:
a client application configured to request an intermediate encryption key from an administrative node of said network, said intermediate encryption key for enabling said client application to encrypt said instance of said computer readable media into said intermediate encryption.

32. The system as recited in claim 31, wherein said client application is further configured to decrypt said instance of said computer readable media from said encryption local to said computer system and to encrypt said instance of computer readable media into said intermediate encryption subsequent to receiving said intermediate encryption key.

33. The system as recited in claim 29 wherein said file system filter driver comprises:
a first decryption component for performing said second decryption with a second decryption key stored on a node of said network.

34. The system as recited in claim 29 wherein said media presentation mechanism further comprises:
a second decryption component for performing said first decryption with a first decryption key stored on a node of said network.

35. The system as recited in claim 29 further comprising:
an updating component for updating said usage compliance mechanism and said media presentation mechanism, said updating component communicatively coupled with said computer system and said network.

36. The system as recited in claim 21 further comprising:
an uninstalling component for automatically removing said usage compliance mechanism and said media presentation mechanism from said computer system when said media storage device is uncoupled from said computer system.

37. A non-transitory computer readable medium for storing computer implemented instructions, said instructions for causing a computer system to perform a method for controlling presentation of a computer readable media on a media storage device, said method comprising:
accessing a media storage device with a computer system;
using an autorun mechanism disposed on said media storage device to clandestinely install a usage compliance mechanism on said computer system in response to said computer system accessing said media storage device, said usage compliance mechanism comprising a file system filter driver for controlling data reads associated with said computer readable media;
performing a first decryption of said computer readable media with said file system driver;
verifying the presence of a media presentation mechanismon on said computer system, said media presentation mechanism communicatively coupled with said usage compliance mechanism; and
performing a second decryption of said computer readable media and presenting said computer readable media with said media presentation mechanism, said second decryption different from and unrelated to said first decryption.

38. The non-transitory computer readable medium of claim 37 wherein said method further comprises:
installing said media presentation mechanism on said computer system when said media presentation mechanism is not present on said computer system.

39. The non-transitory computer readable medium of claim 38 wherein said method further comprises:
using said autorun mechanism to clandestinely install said media presentation mechanism on said computer system in response to said computer system accessing said media storage device.

40. The non-transitory computer readable medium of claim 37 wherein said method further comprises:
affixing a unique identifier to said media storage device.

41. The non-transitory computer readable medium of claim 40 wherein said unique identifier is a serial number generated before or during disposition of said computer readable media on said media storage device.

42. The non-transitory computer readable medium of claim 41 wherein said method further comprises:
   watermarking said unique identifier onto an outgoing data stream containing said computer readable media using said media presentation mechanism.

43. The non-transitory computer readable medium of claim 37 wherein said method further comprises:
   encrypting said computer readable media prior to disposal of said computer readable media on said media storage device.

44. The non-transitory computer readable medium of claim 43 wherein said encrypting comprises:
   a first unique encryption applied to each instance of said computer readable media when a plurality of said computer readable media is disposed on said media storage device, and
   a second unique encryption applied to each said first unique encryption and associated computer readable media.

45. The non-transitory computer readable medium of claim 43 wherein said encrypting comprises a first encryption applied to said computer readable media and a second encryption applied to said first encryption of said computer readable media.

46. The non-transitory computer readable medium of claim 45 wherein said method further comprises:
   decrypting said second encryption with said file system filter driver using a second decryption key stored by said media storage device.

47. The non-transitory computer readable medium of claim 45 wherein said method further comprises:
   decrypting said first encryption with said media presentation mechanism using a first decryption key stored by said media storage device before or concurrent with said presenting.

48. The non-transitory computer readable medium of claim 45 wherein said method further comprises:
   communicatively coupling said computer system with a server; and
   decrypting said second encryption with said file system filter driver using a second decryption key stored by said server.

49. The non-transitory computer readable medium of claim 45 wherein said method further comprises:
   communicatively coupling said computer system with a server; and
   decrypting said first encryption with said media presentation mechanism using a first decryption key stored by said server.

50. The non-transitory computer readable medium of claim 37 wherein said method further comprises:
   communicatively coupling said computer system with a network;
   availing to said network an instance of said computer readable media for sharing among a plurality of nodes of said network by said computer system;
   decrypting said instance of said computer readable media from an encryption local to said computer system;
   encrypting said instance of said computer readable media into an intermediate encryption; and
   transferring said instance of said computer readable media in said intermediate encryption to a node of said network, wherein said decrypting and said encrypting and said transferring are in response to receiving a request for said instance of computer readable media from said node.

51. The non-transitory computer readable medium of claim 50 wherein said method further comprises:
   receiving by said computer system an intermediate encryption key for said encrypting said instance of said computer readable media into said intermediate encryption.

52. The non-transitory computer readable medium of claim 51 wherein said intermediate encryption key is received by said computer system in response to requesting said intermediate encryption key from an administrative node of said network.

53. The non-transitory computer readable medium of claim 50 wherein said decrypting and said encrypting are performed by a client application coupled to said computer system.

54. The non-transitory computer readable medium of claim 50 wherein said media presentation mechanism performs said availing to said network said instance of said computer readable media.

55. The non-transitory computer readable medium of claim 50 wherein said method further comprises:
   updating said media presentation mechanism and said usage compliance mechanism via said network.

56. The non-transitory computer readable medium of claim 50 wherein said method further comprises:
   storing said instance of said computer readable media in a custom file system of memory coupled to said computer system, said custom file system accessible by a media presentation mechanism.

* * * * *

UNITED STATES PATENT AND TRADEMARK OFFICE
CERTIFICATE OF CORRECTION

PATENT NO. : 8,108,671 B2  
APPLICATION NO. : 12/861226  
DATED : January 31, 2012  
INVENTOR(S) : Hank Risan and Edward Vincent Fitzgerald Page 1 of 1

It is certified that error appears in the above-identified patent and that said Letters Patent is hereby corrected as shown below:

Column 72, Claim 37, Line 41-42: Delete, "mechanismon"  
Insert, --mechanism--

Signed and Sealed this  
Twenty-sixth Day of June, 2012

David J. Kappos  
*Director of the United States Patent and Trademark Office*